United States Patent [19]
Bahn

[11] Patent Number: 5,485,047
[45] Date of Patent: Jan. 16, 1996

[54] RELUCTANCE-TYPE MOTOR AND A ROTOR FOR A RELUCTANCE-TYPE HIGH-SPEED MOTOR

[75] Inventor: Itsuki Bahn, Tokyo, Japan

[73] Assignee: Kabushikigaisha Sekogiken, Tokyo, Japan

[21] Appl. No.: 119,146

[22] PCT Filed: Jan. 27, 1992

[86] PCT No.: PCT/JP93/00066

§ 371 Date: Sep. 22, 1993

§ 102(e) Date: Sep. 22, 1993

[87] PCT Pub. No.: WO93/15550

PCT Pub. Date: Aug. 5, 1993

[30] Foreign Application Priority Data

| Jan. 27, 1992 | [JP] | Japan | 4-051051 |
| Feb. 27, 1992 | [JP] | Japan | 4-088422 |
| Aug. 3, 1992 | [JP] | Japan | 4-247046 |
| Nov. 16, 1992 | [JP] | Japan | 4-350058 |

[51] Int. Cl.$^6$ ............ H02K 17/02; H02K 1/24; H02K 3/28; H02P 7/36
[52] U.S. Cl. .......... 310/166; 310/261; 310/180; 318/701
[58] Field of Search ............ 310/68 R, 68 B, 310/166, 261, 168, 193, 179, 180; 318/701

[56] References Cited

U.S. PATENT DOCUMENTS

| 3,062,979 | 11/1962 | Jarret et al. | 310/168 |
| 3,678,352 | 7/1972 | Bedford | 318/138 |
| 3,956,678 | 5/1976 | Byrne et al. | 310/168 |
| 4,321,518 | 3/1982 | Akamatsu | 318/701 |
| 4,942,345 | 7/1990 | Horst | 318/254 |
| 5,111,091 | 5/1992 | Bahn | 310/166 |
| 5,168,190 | 12/1992 | Bahn | 310/166 |
| 5,239,217 | 8/1993 | Horst | 310/168 |
| 5,274,287 | 12/1993 | Bahn | 310/166 |
| 5,294,856 | 3/1994 | Horst | 310/168 |
| 5,341,076 | 8/1994 | Bahn | 310/166 |
| 5,376,851 | 12/1994 | Lipo et al. | 310/179 |

FOREIGN PATENT DOCUMENTS

| 441970 | 8/1991 | European Pat. Off. |
| 1-295656 | 11/1989 | Japan |
| 2-237493 | 9/1990 | Japan |
| 3-117394 | 5/1991 | Japan |

*Primary Examiner*—Clayton E. La Balle
*Attorney, Agent, or Firm*—Staas & Halsey

[57] ABSTRACT

An object of the present invention is to obtain a reluctance-type motor which is small in diameter and has good efficiency in a high speed region, or generates a large output torque without causing vibration, and allows regenerative braking as occasion demands. A magnetic rotor has two salient poles. A fixed armature has eight slots disposed at regular intervals. These eight slots are associated with No. 1-, No. 2-, No. 3- and No. 4-phase armature coils of two-phase full-wave current supply mode, so as to constitute a compact small-diameter motor. Each armature coil is supplied with current by an amount of 90-degree electric angle in response to a position detecting signal. Thus, a maximum torque can be obtained with good efficiency. Using electrostatic energy of a small-capacitance capacitor, transformation of magnetic energy of each armature coil can be completed in a short time. As a result, the motor can rotate at a higher speed.

9 Claims, 28 Drawing Sheets

RELUCTANCE-TYPE MOTOR AND A ROTOR FOR A RELUCTANCE-TYPE HIGH-SPEED MOTOR

TECHNICAL FIELD

The present invention relates to a reluctance type motor which is used as a driving source for a drill machine, a compact driving source requiring high-speed rotation, and a large-output driving source requiring no precise control such as an electric car and a crane vehicle.

BACKGROUND ART

A reluctance type motor has so numerous disadvantages including vibration that few reluctance type motor has ever been practically utilized, although its output torque is large and no magnet rotor is required. Attaining both size reduction and speedup of motor rotation is very difficult to practically realize. Although rotational torque is obtained by magnetic attraction force acting between magnetic poles of the fixed armature and salient poles of the rotor, the magnetic attraction force is directed toward a center thereof. Thus, mechanical vibration is generated.

Such conventional motors require armature coils that are controlled by switching elements connected to both ends thereof for activating or deactivating these armature coils. Hence, expensive power elements increase in number and, therefore, the cost increases.

Furthermore, switching elements provided at a positive terminal side of an electric power source tend to be expensive as they require input electric signals supplied from another electric power source for controlling currents supplied to the armature coils.

A reluctance type motor has a rotor equipped with numerous salient poles and, therefore, its inductance is large. This increases magnetic energy amount stored into or discharged from magnetic poles or salient poles. And also increased is repetition frequency of such energy storage and discharge during one complete revolution of the rotor. It is, therefore, a problem that the reluctance type motor cannot rotate in a high-speed region nevertheless its large output torque. Also, it is another problem that the size of the reluctance type motor cannot be reduced due to a large number of salient poles.

Here, a low speed should be considered to be around 300 r.p.m and a high speed around 60 thousands rpm.

If compared with a DC motor having a magnet rotor, an extraordinary large inductance of the armature coil will cause a slow building-up of exciting current at an initial stage of the current supply period, as well as a slow trailing-edge at a terminating stage of the current supply period. The former will cause a smaller output torque, and the latter cause a counter torque.

In order to make building-up of armature current sharp in the initial stage of the current supply period, a voltage of an electric power source is increased. However, such building-up of the armature current will be too much sharp in a region after the magnetic saturation point. For this reason, the motor causes vibrations and electric noises. And, as above-described building-up section of the armature current corresponds to a section where the torque is small, only disadvantages will be enhanced. Thus, there is a problem such that a high-speed rotation cannot be realized due to the above-described torque reduction and counter torque. As the number of the salient poles is too much, magnetic energy is so numerous times transferred between armature coils. This increases iron loss. Accordingly, there is a problem that efficiency is lowered in a high-speed region.

If the applied voltage is increased in order to speed up the rotational speed, more than 600 volts will be required. This means no practical motor will be obtained.

If the building-up and trailing-edge of the armature current are sharpened in order to realize the speedup of the motor, iron loss will be correspondingly increased. It will be ideal to use a half-wave of sine waveform. This will not be easily obtained for some reasons.

Furthermore, salient poles of the rotor are generally required at least 4. Therefore, repetition frequency of energy storage and discharge during one complete revolution of the rotor will increase between the magnetic poles and the salient poles. Thus, efficiency is lowered and it becomes difficult to speed up the motor speed.

Moreover, a large magnetic attraction force, which does not contribute the torque generation, is generated between the magnetic poles and salient poles. Although magnetic poles are provided symmetrically about an axis in order to eliminate this force, this magnetic attraction force is not completely erased because of difference of air gap length between the magnetic poles and salient poles. This becomes a cause of vibration. Even if the air gap length is finely adjusted, it will be soon changed due to wear occurring during use of motor.

FIG. 26 shows a plan view showing a well-known three-phase half-wave current supply mode reluctance type motor. A reference numeral 16 represents a fixed armature which is made of well-known laminated silicon steel sheets. Magnetic poles 16a, 16b,—are associated with armature coils 17a, 17b,—. A rotor 1 rotates in a direction of an arrow A. A reference numeral 5 represents a rotational shaft 5. When armature coils 17b, 17e are activated, the rotor 1 rotates in the direction of the arrow A. After 120-degree rotation, these armature coils are deactivated. Next, armature coils 17c, 17f are activated. After 120-degree rotation, these armature coils are deactivated.

As described above, the rotor 1 rotates in the order of the armature coils 17a, 17d—17b, 17e—17c, 17f along the arrow A. Only two salient poles contribute the generation of above-described rotational torque, and remaining four salient poles have no relation to this generation of rotational torque. If all the six salient poles generate torque simultaneously, a generated torque will be three times. However, this is not attainable.

Furthermore, when the armature coils 17a, 17d are activated, the magnetic poles 16a, 16d are magnetically attracted radially toward the salient poles 1a, 1e. Thus, the fixed armature 16 suffers deformation due to this attraction force. When the rotor rotates, the fixed armature suffers deformation due to another attraction forces generated by the magnetic poles 16b, 16e and 16c, 16f and their confronting salient poles. These deformation mechanism induces the vibration of the motor.

As it is technically difficult to equalize air gap length between the salient poles and magnetic poles, an attraction force received by the rotor 1 changes its direction as the rotor 1 rotates. Thus, the rotor 1 causes vibration in the radial direction. Accordingly, vibration noise is generated. And, the durability of the bearing, provided for the rotational shaft of the rotor 1, is worsened. In case of a large-output motor, the above-described problems cannot be solved.

Accordingly, the present invention has an object to provide a reluctance-type motor which is small in diameter size and having good efficiency in a high-speed region, and also to provide a reluctance-type motor which is capable of generating a large output torque, suppressing vibration, and performing regenerative braking as occasion demands.

DISCLOSURE OF INVENTION

Accordingly, it is an object of the present invention to provide a high-speed motor having good efficiency and high torque in a high-speed region.

In order to accomplish the above purpose, a first aspect of the present invention provides a high-speed motor in a three-phase half-wave reluctance type DC motor with a fixed armature and a magnetic rotor comprising:

two salient poles having the same width, disposed on an outer peripheral surface of the magnetic rotor and being mutually spaced at regular intervals of the same angle;

twelve, No. 1 to No. 12, slots disposed on an inner peripheral surface of the fixed armature at regular intervals;

a No. 1-phase armature coil consisting of a coil associated with the No. 1 and No. 4 slots and another coil associated with the No. 7 and No. 10 slots, two coils of said No. 1-phase armature coil being connected in series or in parallel with each other;

a No. 2-phase armature coil consisting of a coil associated with the No. 3 and No. 6 slots and another coil associated with the No. 9 and No. 12 slots, two coils of said No. 2-phase armature coil being connected in series or in parallel with each other;

a No. 3-phase armature coil consisting of a coil associated with the No. 5 and No. 8 slots and another coil associated with the No. 11 and No. 2 slots, two coils of said No. 3-phase armature coil being connected in series or in parallel with each other;

a position detecting device for detecting rotational positions of said salient poles and generating No. 1-phase position detecting signals having 120-degree width and mutually spaced at regular intervals of 240 degrees in term of electric angle, No. 2-phase position detecting signals being delayed 120 degrees from said No. 1-phase position detecting signals, and No. 3-phase position detecting signals being delayed 120 degrees from said No. 2-phase position detecting signals;

only one switching element interposed between a negative terminal of a DC electric power source and each of said No. 1-, No. 2- and No. 3-phase armature coils;

only one first diode interposed at a positive voltage side of each armature coil in a forward direction;

said DC electric power source supplying electric power to a serial joint unit consisting of said first diode, said armature coil, and said switching element;

a current supply control circuit for supplying current to said No. 1-, No. 2- and No. 3-phase armature coils by turning on corresponding switching elements connected to said No. 1-, No. 2- and No. 3-phase armature coils in response to said No. 1-, No. 2- and No. 3-phase position detecting signals by an amount of signal width of each position detecting signal, so as to obtain output torque;

a first electric circuit for transferring magnetic energy stored in the armature coil through a second diode into a small-capacitance capacitor from a connecting point of said switching element and said armature coil and holding it to quickly reduce exciting current of said armature coil when said switching element is turned off at a terminal end of said position detecting signal;

a second electric circuit for discharging electrostatic energy stored in said small-capacitance capacitor into the armature coil being next activated through the simultaneously activated semiconductor element from a connecting point of said first diode and said armature coil element to quickly build up exciting current at the time when said armature coil is activated in response to said position detecting signal after said magnetic rotor rotates a predetermined angle;

a detecting circuit obtaining a detection electric signal when exciting current of said armature coil exceeds a predetermined value; and a chopper circuit for deactivating said armature coil in response to said detection electric signal and in turn activating said armature coil after a predetermined time has passed, A second aspect of the present invention provides a high-speed motor in a two-phase full-wave reluctance type DC motor with a fixed armature and a magnetic rotor comprising:

two salient poles having the same width, disposed on an outer peripheral surface of the magnetic rotor and being mutually spaced at regular intervals of the same angle;

eight, No. 1 to No. 8, slots disposed on an inner peripheral surface of the fixed armature at regular intervals;

a No. 1-phase armature coil consisting of a coil associated with the No. 1 and No. 3 slots and another coil associated with the No. 5 and No. 7 slots, two coils of said No. 1-phase armature coil being connected in series or in parallel with each other;

a No. 2-phase armature coil consisting of a coil associated with the No. 2 and No. 4 slots and another coil associated with the No. 6 and No. 8 slots, two coils of said No. 2-phase armature coil being connected in series or in parallel with each other;

a No. 3-phase armature coil consisting of a coil associated with the No. 3 and No. 5 slots and another coil associated with the No. 7 and No. 1 slots, two coils of said No. 3-phase armature coil being connected in series or in parallel with each other;

a No. 4-phase armature coil consisting of a coil associated with the No. 4 and No. 6 slots and another coil associated with the No. 8 and No. 2 slots, two coils of said No. 3-phase armature coil being connected in series or in parallel with each other;

a position detecting device for detecting rotational positions of said salient poles and generating No. 1-phase position detecting signals having 90-degree width and mutually spaced at regular intervals of 360 degrees in term of electric angle, No. 2-phase position detecting signals being delayed 90 degrees from said No. 1-phase position detecting signals, No. 3-phase position detecting signals being delayed 90 degrees from said No. 2-phase position detecting signals, No. 4-phase position detecting signals being delayed 90 degrees from said No. 3-phase position detecting signals;

only one switching element interposed between a negative terminal of a DC electric power source and each of said No. 1-, No. 2-, No. 3- and No. 4-phase armature coils;

only one first diode interposed at a positive voltage side of each armature coil in a forward direction;

said DC electric power source supplying electric power to
a serial joint unit consisting of said first diode, said armature coil, and said switching element;

a current supply control circuit for supplying current to said No. 1-, No. 2-, No. 3- and No. 4-phase armature coils by turning on corresponding switching elements connected to said No. 1-, No. 2-, No. 3- and No. 4-phase armature coils in response to said No. 1-, No. 2-, No. 3- and No. 4-phase position detecting signals by an amount of signal width of each position detecting signal, so as to obtain maximum output torque;

a first electric circuit for transferring magnetic energy stored in the armature coil through a second diode into a small-capacitance capacitor from a connecting point of said switching element and said armature coil and holding it to quickly reduce exciting current of said armature coil when said switching element is turned off at a terminal end of said position detecting signal;

a second electric circuit for discharging electrostatic energy stored in said small-capacitance capacitor into the armature coil being next activated through the simultaneously activated semiconductor element from a connecting point of said first diode and said armature coil element to quickly build up exciting current at the time when said armature coil is activated in response to said position detecting signal after said magnetic rotor rotates a predetermined angle;

a detecting circuit obtaining a detection electric signal when exciting current of said armature coil exceeds a predetermined value; and a chopper circuit for deactivating said armature coil in response to said detection electric signal and in turn activating said armature coil after a predetermined time.

Furthermore, a third aspect of the present invention provides a high-speed motor in a two-phase full-wave reluctance type DC motor with a fixed armature and a magnetic rotor comprising:

two salient poles having the same width, disposed on an outer peripheral surface of the magnetic rotor and being mutually spaced at regular intervals of the same angle;

eight, No. 1 to No. 8, slots disposed on an inner peripheral surface of the fixed armature at regular intervals;

a No. 1-phase armature coil consisting of a coil associated with the No. 1 and No. 3 slots and another coil associated with the No. 5 and No. 7 slots, coils of said No. 1-phase armature coil being connected in series or in parallel with each other;

a No. 2-phase armature coil consisting of a coil associated with the No. 2 and No. 4 slots and another coil associated with the No. 6 and No. 8 slots, two coils of said No. 2-phase armature coil being connected in series or in parallel with each other;

a No. 3-phase armature coil consisting of a coil associated with the No. 3 and No. 5 slots and another coil associated with the No. 7 and No. 1 slots, two coils of said No. 3-phase armature coil being connected in series or in parallel with each other;

a No. 4-phase armature coil consisting of a coil associated with the No. 4 and No. 6 slots and another coil associated with the No. 8 and No. 2 slots, two coils of said No. 3-phase armature coil being connected in series or in parallel with each other;

a position detecting device for detecting rotational positions of said salient poles and generating No. 1-phase position detecting signals having 90-degree width and mutually spaced at regular intervals of 360 degrees in term of electric angle, No. 2-phase position detecting signals being delayed 90 degrees from said No. 1-phase position detecting signals, No. 3-phase position detecting signals being delayed 90 degrees from said No. 2-phase position detecting signals, No. 4-phase position detecting signals being delayed 90 degrees from said No. 3-phase position detecting signals;

a DC electric power source supplying electric power to a serial joint unit consisting of said armature coil and said switching element;

a current supply control circuit for supplying current to said No. 1-, No. 2-, No. 3- and No. 4-phase armature coils by turning on corresponding switching elements connected to said No. 1-, No. 2-, No. 3- and No. 4-phase armature coils in response to said No. 1-, No. 2-, No. 3- and No. 4-phase position detecting signals by an amount of signal width of each position detecting signal from an initial end of a positive torque generation section, so as to obtain output torque;

only one switching element interposed between a negative terminal of said DC electric power source and each of said No. 1-, No. 2-, No. 3- and No. 4-phase armature coils;

a first group of diodes, each of said first group of diodes being inversely connected to a serial joint unit consisting of one of said No. 1-, No. 2-, No. 3- and No. 4-phase armature coils and corresponding one of said switching elements;

a first electric circuit for transferring magnetic energy stored in the armature into a capacitor through a second group diodes and said first group of diodes, each of said second group of diodes being connected to a connecting point of said switching element and said armature coil;

a second electric circuit, interposed between a positive side of said capacitor and a positive terminal of said electric power source, for comparing a voltage of said capacitor and a voltage of said electric power source and equalizing them; and a chopper circuit for suppressing exciting current of said armature coil so as not to cause a burnout of said armature coil.

Still further, a fourth aspect of the present invention provides a rotor for a reluctance-type high-speed motor comprising:

a column-shaped magnetic rotor made of laminated silicon steel sheets;

a rotational shaft fixed on a central axis of said magnetic rotor;

bearings for supporting both ends of said rotational shaft so that the rotational shaft can rotate;

first and second salient poles having 90-degree width, disposed on an outer peripheral surface of the magnetic rotor and being mutually spaced at regular intervals of 90 degrees;

a fixed armature of cylindrical shape being made of laminated silicon steel sheets and having slots on an inner peripheral surface thereof, said slots being associated with two- or three-phase armature coils;

means for maintaining air gap between an outer peripheral surface of said first and second salient poles and said inner peripheral surface of said fixed armature, said air gap being smaller between said outer peripheral surface of said first salient pole and said inner peripheral surface of said fixed armature than between said outer peripheral surface of said second salient pole and said inner peripheral surface of said fixed armature; and a balance weight fixed on said rotor near said second salient pole so as to maintain rotational balance of the rotor.

Yet further a fifth aspect of the present invention provides a three-phase reluctance type DC motor with a fixed armature and a magnetic rotor comprising:

n (n: positive integer equal to or more than 3) salient poles having the same width, disposed on an outer peripheral surface of the magnetic rotor and being mutually spaced at regular intervals of the same angle;

6n slots disposed on an inner peripheral surface of the fixed armature at regular intervals;

No. 1-, No. 2- and No. 3-phase armature coils being associated with said slots and disposed to have a mutual phase difference of 120-degree electric angle one another;

a position detecting device for detecting rotational positions of said salient poles and generating No. 1-phase position detecting signals having 120-degree width and mutually spaced at regular intervals of 240 degrees in term of electric angle, No. 2-phase position detecting signals being delayed 120 degrees from said No. 1-phase position detecting signals, and No. 3-phase position detecting signals being delayed 120 degrees from said No. 2-phase position detecting signals;

semiconductor switching elements connected in series with said No. 1-, No. 2- and No. 3-phase armature coils;

a DC electric power source supplying electric power to said No. 1-, No. 2- and No. 3-phase armature coils and said semiconductor switching elements being serially connected with said No. 1-, No. 2- and No. 3-phase armature coils;

a current supply control circuit for supplying current to said No. 1-, No. 2- and No. 3-phase armature coils by turning on corresponding semiconductor switching elements connected to said No. 1-, No. 2- and No. 3-phase armature coils in response to said No. 1-, No. 2- and No. 3-phase position detecting signals by an amount of signal width of each position detecting signal;

a first electric circuit for transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

a second electric circuit for discharging electrostatic energy stored in said small-capacitance capacitor into the armature coil being next activated to quickly build up exciting current at the time when said armature coil is activated in response to said position detecting signal after said magnetic rotor rotates a predetermined angle;

a detecting circuit obtaining a detection signal when exciting current of said No. 1-, No. 2- and No. 3-phase armature coils exceeds a predetermined value; and a chopper circuit for deactivating said armature coil in response to said detection signal and in turn activating said armature coil after said armature current has decreased a predetermined amount.

Moreover, a sixth aspect of the present invention provides a three-phase full-wave reluctance type DC motor comprising:

n (n: positive integer equal to or more than 3) first and second salient poles having the same width, disposed on an outer peripheral surface of a magnetic rotor at both ends thereof and being mutually spaced at regular intervals of the same angle;

6n slots disposed at regular intervals on an inner peripheral surface of a cylindrical first fixed armature;

No.1-, No. 2- and No. 3-phase armature coils being associated with said 6n slots and disposed to have a mutual phase difference of 120 degrees one another;

a second fixed armature having substantially the same construction as said first fixed armature, slots of said second fixed armature being associated with No. 1-, No. 2- and No. 3-phase armature coils;

means for offsetting a first position where said slots of said first fixed armature confront with said first salient poles by 180-degree electric angle from a second position where said slots of said second fixed armature confront with said second salient poles;

a position detecting device for detecting rotational positions of said first salient poles and generating No. 1-phase position detecting signals having 120-degree width and mutually spaced at regular intervals of 240 degrees in term of electric angle, No. 2-phase position detecting signals being delayed 120 degrees from said No. 1-phase position detecting signals, and No. 3-phase position detecting signals being delayed 120 degrees from said No. 2-phase position detecting signals, and further generating No. 1-phase position detecting signals being delayed 180 degrees from said No. 1-phase position detecting signals, No. 2-phase position detecting signals being delayed 180 degrees from said No. 2-phase position detecting signals, and No. 3-phase position detecting signals being delayed 180 degrees from said No. 2-phase position detecting signals;

semiconductor switching elements connected in series with said No. 1-, No. 2-, No. 3-, No.1-, No. 2- and No. 3-phase armature coils;

a DC electric power source supplying electric power to said armature coils and said semiconductor switching element being serial connected with said armature coils;

a current supply control circuit for supplying current to said No. 1-, No. 2-, No. 3-, No. 1-, No. 2- and No. 3-phase armature coils by turning on corresponding semiconductor switching elements connected in series to said No. 1-, No. 2-, No. 3-, No. 1-, No. 2- and No. 3-phase armature coils in response to said No. 1-, No. 2-, No. 3-, No. 1-, No. 2- and No. 3-phase position detecting signals by an amount of signal width of each position detecting signal;

a first electric circuit for transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

a second electric circuit for discharging electrostatic energy stored in said small-capacitance capacitor into the armature coil being next activated to quickly build up exciting current at the time when said armature coil is activated in response to said position detecting signal after said magnetic rotor rotates a predetermined angle;

a detecting circuit obtaining a detection signal when exciting current of said No. 1-, No. 2- and No. 3-phase armature coils exceeds a predetermined value;

a first chopper circuit for deactivating said armature coil in response to said detection signal and in turn activating said armature coil after said armature current has decreased a predetermined amount; and a second chopper circuit having substantially the same construction as said first chopper circuit for maintaining armature current of said No. 1-, No. 2 and No. 3-phase armature coils at a predetermined value.

In accordance with the present invention, when armature coils are deactivated, magnetic energy stored in the armature coils is transferred to a small-capacitance capacitor to be charged. Accordingly, a time period for extinguish magnetic energy becomes so small that no counter torque is generated. Furthermore, as a high voltage of the capacitor is applied to the next activated armature coil, exciting current of this armature coil builds up sharply. Accordingly, no torque reduction occurs. This enables the motor to rotate at a high speed.

As the number of the salient poles is two, repetition times of transferring magnetic energy per revolution of rotor becomes small. Thus, iron loss in a high speed rotation can be suppressed within a small value, thereby preventing efficiency from being lowered. Furthermore, a diameter of the motor can be shortened.

Providing a chopper circuit brings the following functions as well as an ordinary function of maintaining the current of the armature coil at a predetermined value.

When current value of an armature coil exceeds a predetermined value, a switching element associated with this armature coil turns off. A part of magnetic energy stored in the armature coil is transferred into a small-capacitance capacitor as electrostatic energy. Accordingly, electrostatic energy in proportion to chopper frequency is charged and held. Furthermore, magnetic energy is added to the small-capacitance capacitor when the armature coil is deactivated at the terminal end of the position detecting signal.

This electrostatic energy makes armature current of the next activated armature coil build up further quickly.

Although the increase of exciting current is blunted at an intermediate portion of its building-up curve due to iron loss of magnetic poles and copper loss of armature coils occurring when magnetic energy transfers between armature coils, above-described countermeasure can make waveform of building-up current rectangular so as to overcome this problem. It is especially effective in the case where the electric power source voltage is low. Moreover, the number of expensive circuit components can be reduced down to half since only one switching element is provided at a negative terminal side of the electric power source for actuating each armature coil. Still further, as the switching element is provided at the negative terminal side of the electric power source, circuit configuration of the current supply control circuit can be simplified. Moreover, a waveform of the exciting current of the armature coil can be formed in a shape similar to a half-wave of a sine wave. Furthermore, counter torque can be prevented. Thus, the motor can rotate at a high speed.

Still further, in accordance with the present invention, repetition times of transferring magnetic energy per revolution of rotor becomes small since the number of the salient poles is two. Thus, iron loss in a high speed rotation can be suppressed within a small value, thereby preventing efficiency from being lowered. Furthermore, a diameter of the motor can be shortened.

In FIG. 20, an air-gap length between an outer peripheral surface of a salient pole 1a and an inner peripheral surface of a fixed armature 16 is set smaller than an air-gap length between an outer peripheral surface of a salient pole 1b and an inner peripheral surface of the fixed armature 16 by a set value. Accordingly, during rotation of the motor, a magnetic attraction force by which the salient pole 1a is attracted toward the fixed armature becomes larger than another magnetic attraction force by which the salient pole 1b is attracted toward the fixed armature. A vector B represents a difference of these two magnetic attraction force. As the vector B rotates synchronously together with the rotor 1, a rotational shaft 5 rotates while being pressed against bearings. Hence, vibration can be suppressed.

The above-mentioned pressing force is selected within a range that the bearings can not be damaged.

However, because of the above-described arrangement, centrifugal force of the rotor 1 is unbalanced with respect to the rotational shaft 5. In order to resolve this problem, metallic plates 1c are fixed on both sides of the rotor 1 as a balance weight as shown in the drawings. Hence, vibration can be suppressed.

Furthermore, in accordance with the present invention, all the salient poles of the rotor constantly generate output torque. Therefore, a large output torque can be obtained. A value of the output torque will be three times as large as the conventional motor shown in FIG. 26. Although the apparatus according to the present invention is not adaptable to a small motor because of its a great number of coils, it can be used for a large motor such as an electric car having an output of 10 Kw or more.

As a result of differentiating an air-gap length between the magnetic poles and the salient pole located one side of the rotor from another air-gap length between the magnetic poles and the salient pole located the other side of the rotor, a vector of magnetic attraction force acting on a radial direction of the rotor always rotates directing outward. Thus, vibration and the bearings can be prevented from being wornout.

With the above arrangement, forces received by the fixed armature through magnetic poles and facing salient poles can also balance in the radial direction. Thus, deformation of the armature coil can be prevented. Two fixed armatures can be placed at both sides of one rotor, thereby realizing a three-phase full-wave motor. Accordingly, it becomes possible to obtain a large-output motor having less ripple torque.

When the armature coil is deactivated, magnetic energy stored in this armature coil is transferred into a small-capacitance capacitor. Therefore, exciting current of the armature coil decreases promptly. Next, a high voltage of this small-capacitance capacitor is applied to the next activated armature coil so as to build up exciting current sharply. Therefore, torque reduction and counter torque can be suppressed. The motor can rotate at a high speed (20,000 rpm) and therefore is practically used.

As explained above, the present invention has the following advantageous effects.

As the number of the salient poles is two, it becomes possible to provide a motor which is small in diameter and capable of reducing iron loss in a high speed region. In a high speed region, vibration can also be prevented.

Furthermore, as the activation of each armature coil can be controlled by only one power element provided at a negative terminal side of the electric power source, an overall cost of the current supply control circuit can be reduced to a cheap value.

It becomes possible to obtain a motor capable of rotating at a high speed (up to approximately 100 thousands rpm) without causing torque reduction and counter torque.

Still further, the chopper circuit not only maintains armature current at a predetermined level or allows a constant speed control but compensates copper losses of the armature coils and iron losses of the magnetic cores occurring when the magnetic energy transfers between the armature coils by use of magnetic energy stored in the armature coil. Therefore, it is possible to make building-up and trailing-edge of the armature current remarkably sharp. Thus, a motor having large output torque in a high-speed region can be obtained. Moreover, it is possible to drive a motor by a low-voltage electric power source.

The armature current can be formed similar to sine wave as shown by curves 31a, 31b,—of FIG. 18; therefore, iron loss can be reduced and efficiency of the motor can be increased. Furthermore, all the salient poles on the rotor always generate output torque during rotation. Therefore, a large output torque can be obtained. Therefore, this can especially be useful means for a large-diameter motor. The above-described arrangement enables to suppress vibration of the fixed armature derived from its deformation and vibration of the rotor occurring in a radial direction, and also enables to carry out a regenerative braking, if required.

BEST MODE FOR CARRYING OUT THE INVENTION

Figure 1:
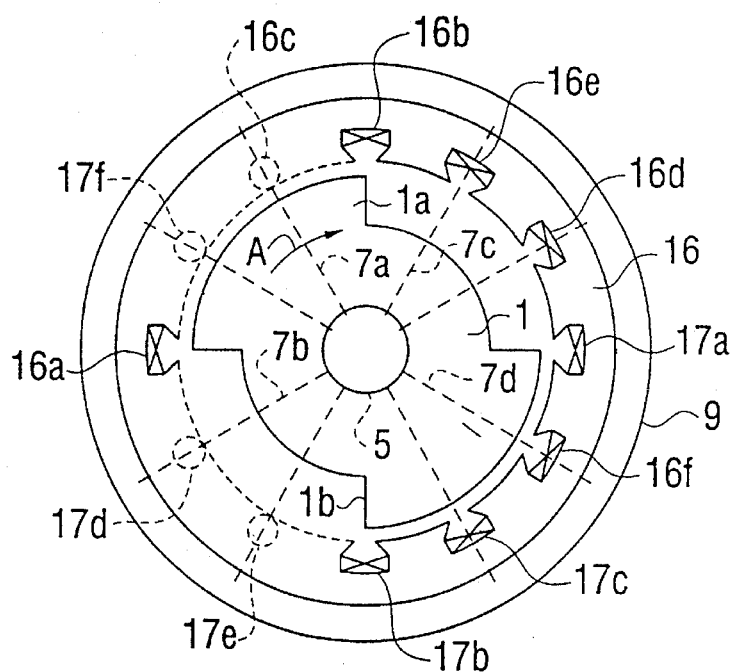
FIG. 1 is a plan view showing a three-phase half-wave reluctance type motor in accordance with the present invention.

With reference to FIG. 1 and the following drawings, preferred embodiments of the present invention will be explained. The same reference numerals in respective drawings denote the like components and thus will not be explained duplicately. In the following explanation, all the angles are expressed by electric angles.

An explained first of all is a constitution of a three-phase half-wave reluctance type motor embodying the present invention. FIG. 1 is a plan view showing a fixed armature and a rotor.

In FIG. 1, reference numeral 1 represents a rotor which is equipped with a plurality of salient poles 1a, 1b,—having the same width of 180 degrees (i.e. 90 degrees in terms of mechanical angle) and mutually spaced at regular intervals of 380 degrees.

The rotor 1 is made of well-known laminated silicon steel sheets, and has a rotational shaft 5. A fixed armature 16 is provided with 12 slots 16a, 16b, —, and 17a, 17b, —, being mutually spaced at regular intervals. A reference numeral 9 represents a cylinder serving as an outer casing.

The slots 16a, 16b and 17a, 17b are respectively wound by one coil. Two coils are connected in series or parallel to constitute a No. 1-phase armature coil. This embodiment connects these two coils in series.

The slots 16c, 16d and 17c, 17d are respectively wound by one coil. These two coils are connected in series to constitute a No. 2-phase armature coil. And, the slots 16e, 16f and 17e, 17f are respectively wound by one coil. These two coils are connected in series to constitute a No. 3-phase armature coil.

Slots 17e, 17d, 17f and 16c are schematically circled by a dotted line. An angle between two dotted lines 7a, 7b is 90 degrees in terms of mechanical angle, and an angle between another dotted lines 7c, 7d is also 90 degrees in terms of mechanical angle.

An arrow A denotes a rotational direction of the rotor 1. Salient poles 1a, 1b have an angular width of 90 degrees in terms of mechanical angle, and are spaced with each other at the same interval.

Figure 2:
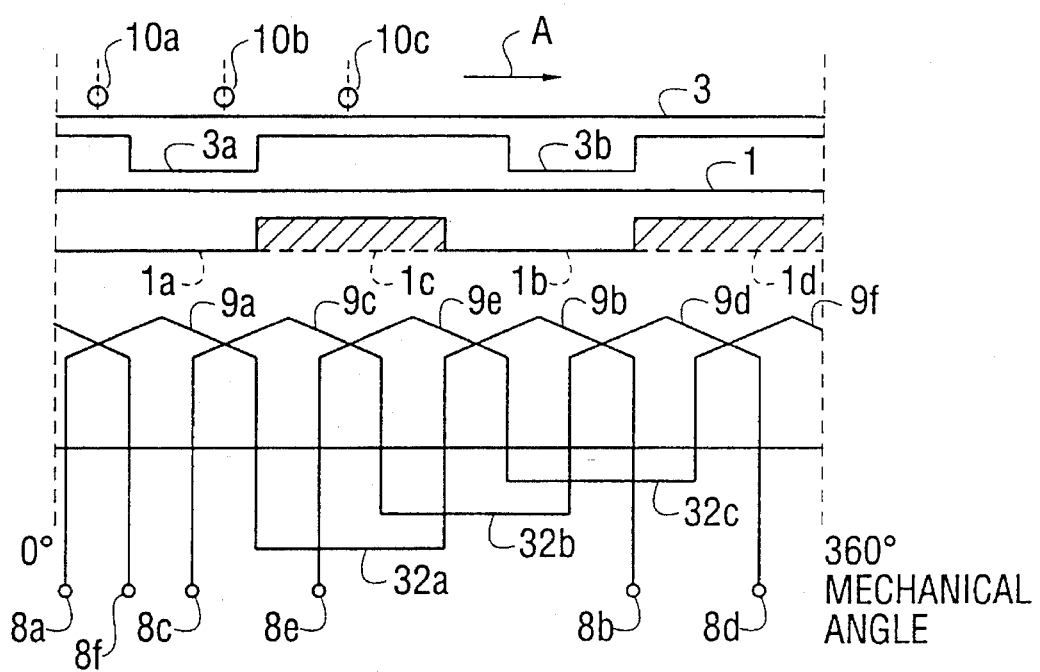
FIG. 2 is a development showing a fixed armature and a rotor of the motor of FIG. 1.

FIG. 2 is a development showing the rotor 1 and the armature coils. In FIG. 2, armature coils 9a, 9b serve as the No. 1-phase armature coil previously described. Armature coils 9c, 9d and armature coils 9e, 9f serve as the No. 2- and No. 3-phase armature coils previously described.

Reference numerals 8a, 8b, and 8c, 8d, and 8e, 8f represent extracted terminals for the No. 1-, No. 2- and No. 3-phase armature coils.

The fixed armature is made of well-known laminated silicon steel sheets as well as the rotor 1.

Portions shaded by dotted lines 1c, 1d are filled with plastic material in order to reduce frictional loss of air in a high-speed rotational region.

Hereinafter, No. 1-, No. 2- and No. 3-phase armature coils are referred to as armature coils 32a, 32b and 32c, respectively.

When the armature coil 32b is activated, the salient poles 1a, 1b are magnetically attracted and the rotor 1 rotates in a direction A. When the rotor 1 rotates 120 degrees, the armature coil 32b is deactivated and the armature coil 32c is activated. When the rotor 1 further rotates 120 degrees, the armature coil 32c is deactivated and the armature coil 32a is activated.

A current supply mode is cyclically alternated every 120-degree rotation in the order of the armature coil 32a -the armature coil 32b -the armature coil 32c, so that the motor can be driven as a three-phase half-wave motor.

In this case, symmetrically disposed magnetic poles are magnetized to N-poles and S-poles as shown in the drawing. Since two magnetic poles excited simultaneously are always magnetized to have opposite polarities, leaking magnetic fluxes passing non-excited magnetic poles become mutually opposite and, therefore, counter torque is prevented from being generated.

Coils 10a, 10b and 10c are position detecting elements for detecting positions of the salient poles 1a, 1b, and are fixed on the armature 16 as shown in the drawings. Their coil surfaces face to side surfaces of the salient poles 1a, 1b over air gap. The coils 10a, 10b and 10c are spaced one another by an amount of 120 degrees. The coil is of a 100-turn air-core having a diameter of 5 mm.

Figure 3:
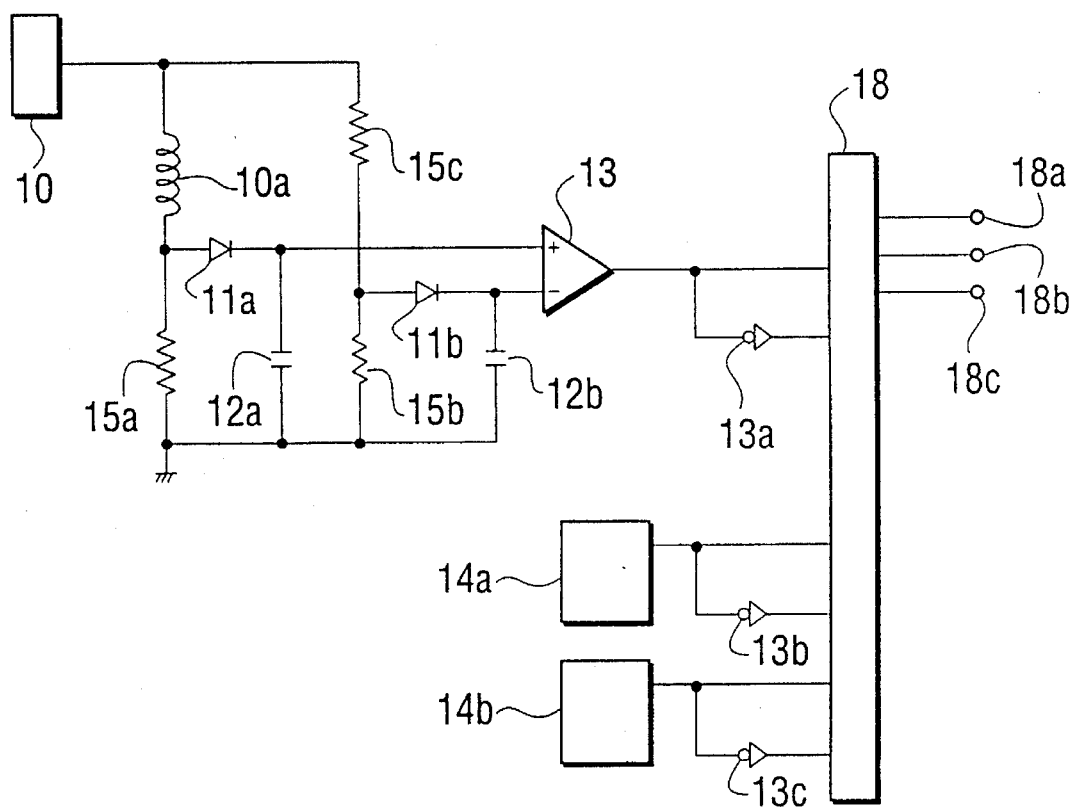
FIG. 3 is a circuit diagram showing a position detecting device.

FIG. 3 shows a device for obtaining position detecting signals from the coils 10a, 10b and 10c. In FIG. 3, the coil 10a and resistances 15a, 15b and 15c constitute a bridge circuit. This bridge circuit is adjusted to balance when the coil 10a does not directly confront with the salient poles 1a, 1b. Accordingly, an output of a low-pass filter consisting of a diode 11a and a capacitor 12a and an output of a low-pass filter consisting of a diode 11b and a capacitor 12b are equal with each other and, therefore, an output of the operational amplifier 13 becomes a LOW-level.

An oscillator 10 causes approximately 1 MHz oscillations. When the coil 10a directly confront with the salient poles 1a, 1b, —, an impedance is reduced due to iron loss (i.e. eddy loss and hysteresis loss). Therefore, a voltage drop in the resistance 15a becomes large and therefore the output of the operational amplifier 13 becomes a HIGH-level.

Figure 10:
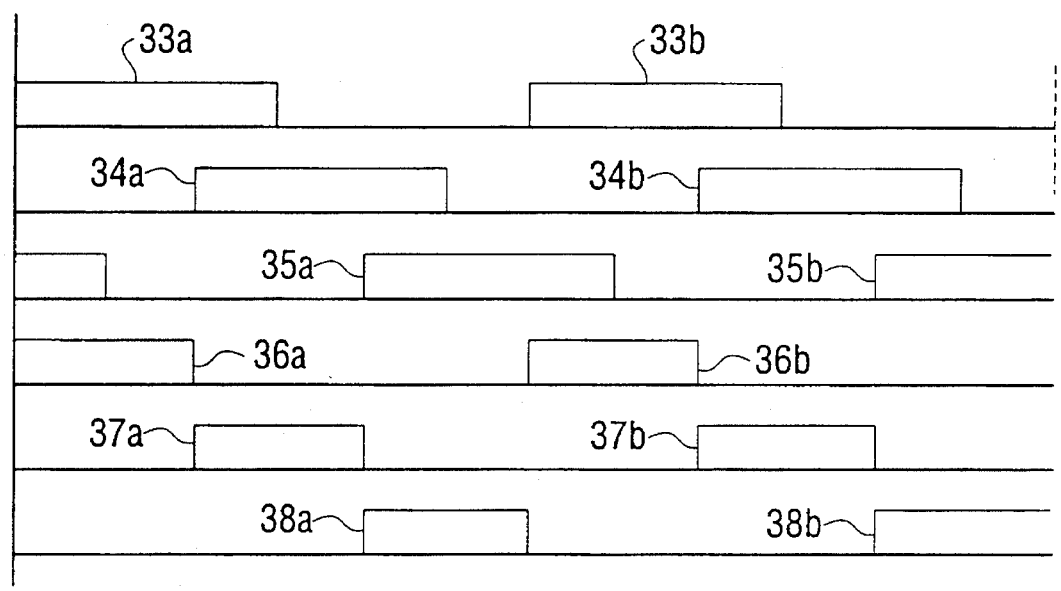
FIG. 10 is a time chart showing position detecting signals.

Inputs to the block circuit 18 are shown by curves 33a, 33b, — in a time chart of FIG. 10, and inputs supplied through an inversion circuit 13a are identical with inverted curves of the curves 33a, 33b,—. Block circuits 14a, 14b in FIG. 3 have the same constitutions as the above-described block circuits including the coils 10b, 10c, respectively. The oscillator 10 can be utilized commonly among these block circuits.

An output of the block circuit 14a and an output of the inversion circuit 13b are inputted into the block circuit 18, and their output signals become curves 34a, 34b,— as shown in FIG. 10 and inverted curves of the curves 34a, 34b.

An output of the block circuit 14b and an output of the inversion circuit 13c are inputted into the block circuit 18, and their output signals become curves 35a, 35b,— as shown in FIG. 10 and inverted curves of the curves 35a, 35b. The curves 34a, 34b,— are delayed 120 degrees in their phases with respect to the curves 33a, 33b,—. In the same way, the curves 35a, 35b,— are delayed 120 degrees in their phases with respect to the curves 34a, 34b,—.

The block circuit 18 is a circuit conventionally utilized in a control circuit of a three-phase Y-type semiconductor motor. That is, the block circuit 18 is a logic circuit generating 120-degree width rectangular-waveform electric signals from terminals 18a, 18b, 18c in response to the above-described position detecting signals. Outputs from the terminals 18a, 18b and 18c are shown by curves 36a, 36b,—, curves 37a, 37b,—, and curves 38a, 38b,— in FIG. 10, respectively. The same effect can be obtained when an aluminum plate, synchronously rotating together with the rotor 1 of FIG. 1 and having the same configuration, is used instead of the salient poles 1a, 1b, — facing to the coils 10a, 10b and 10c.

These position detecting signals can also be obtained by a means using only two coils 10a and 10b, which will be next explained.

In FIG. 2, an aluminum disk 3, having protrusions 3a, 3b (having 120-degree width) on an outer peripheral portion thereof, rotates integrally with the rotor 1. Coils 10a, 10b confront with surfaces of the protrusions 3a, 3b over air gap.

When the coil 10a confronts with the protrusions, an output of the operational amplifier 13 becomes curves 36a, 36b— of FIG. 10.

When the coil 10b confronts with the protrusions, the output of the operational amplifier 13 becomes curves 37a, 37b, — of FIG. 10.

The output of the operational amplifier 13 and the output of the block circuit 14a are added with each other in an AND circuit. By inverting an output of the AND circuit by an invertor circuit, electric signals of curves 38a, 38b,— are obtained. Accordingly, it becomes possible to obtain No. 1-, No. 2- and No. 3-phase position detecting signals. Thus, the same purpose can be accomplished.

Next, current supply control to the armature coils will be explained with reference to FIG. 5. Lower ends of the armature coils 32a, 32b and 32c are connected with transistors 20a, 20b and 20c. The transistors 20a, 20b, 20c serve as semiconductor switching elements and can be substituted by other semiconductor elements having the same effect. A DC electric power source supplies electric power from its positive and negative terminals 2a, 2b.

This embodiment is characterized by a simplified circuit configuration in which only one transistor (transistor 20a, 20b or 20c) is provided at a lower end of each armature coil, i.e. a negative terminal side of the DC electric power source.

Figure 4:
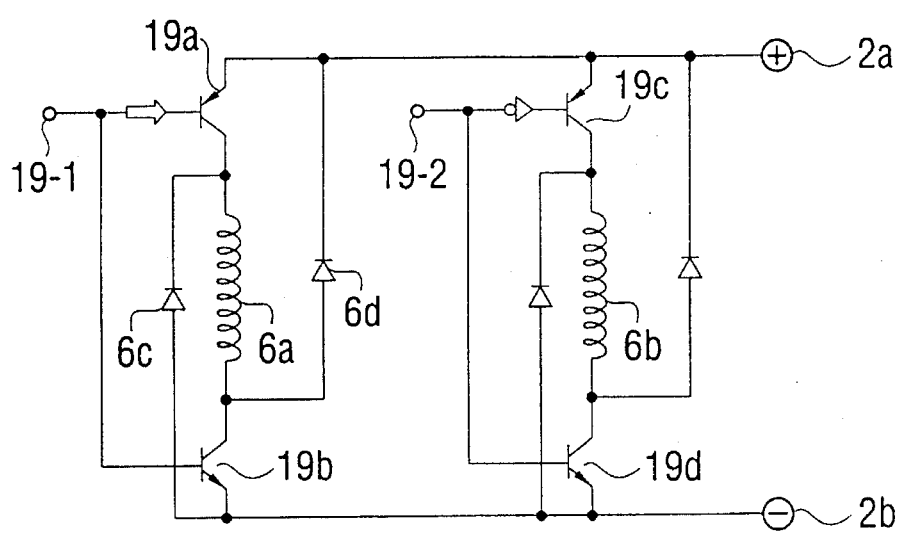
FIG. 4 is a circuit diagram showing a conventional current supply control circuit for activating/deactivating armature coils.

FIG. 4 shows a conventional circuit, in which transistors 19a, 19b,— are provided at both ends of armature coils 6a and 6b. Accordingly, a number of transistors is twice as much as the number of coil. As the transistors 19a, 19b, — serve as power elements, this conventional circuit becomes expensive. The transistors 19a, 19b, provided at positive terminal side, will require another electric power source to perform current supply control in response to input signals of terminals 19-1, 19-2. This becomes another cause of increasing cost of circuit. That is, these are two kinds of disadvantages will occur in such a conventional circuit.

The circuit embodying the present invention is, on the contrary, able to reduce the cost of circuit. When an armature coil is activated, its exciting current builds up slowly due to large inductance. Although magnetic energy stored in the armature coil is returned through diodes ec, ed to the DC electric power when deactivated, reduction of current is also slow in this case. Accordingly, both rotational speed and efficiency are lowered. Although such disadvantages may be resolved by increasing the voltage of a DC electric power source, rotating a motor at 10 thousands r.p.m. with 1 Kw output would require too high voltage, e.g. more than 1000 volts, causing an obstacle to practical use. The present invention can also remove such an obstacle.

Details of FIG. 5 will be explained below. Position detecting signals of curves 36a, 36b,—, curves 37a, 37b,—, and curves 38a, 38b,— in FIG. 10 are inputted from terminals 42a, 42b, and 42c. In response to these input signals fed through AND circuits 24a, 24b, 24c, transistors 20a. 20b, 20c are turned on to activate armature coils 32a, 32b, 32c.

From terminal 40, a reference voltage specifying an armature current is supplied. By changing a voltage of the terminal 40, an output torque can be changed. When an electric power switch (not shown) is turned on, an output of an operational amplifier 40a becomes a LOW-level since an input of a positive terminal of the operational amplifier 40a is lower than that of its negative terminal. As an input of an inversion circuit 28b is a LOW-level, too, an output of the inversion circuit 28b becomes a HIGH-level. Accordingly, the transistor 20a turns on to activate the armature coil 32a. A resistor 22a is provided for detecting armature current flowing the armature coils 32a, 32b and 32c.

Block circuits G, H represent electric circuits for controlling activation/deactivation of the armature coils 32b, 32c, respectively. These circuits include transistors 20b. 20c corresponding to the transistor 20a and diodes 49b, 49c corresponding to the diode 49a.

Figure 9:
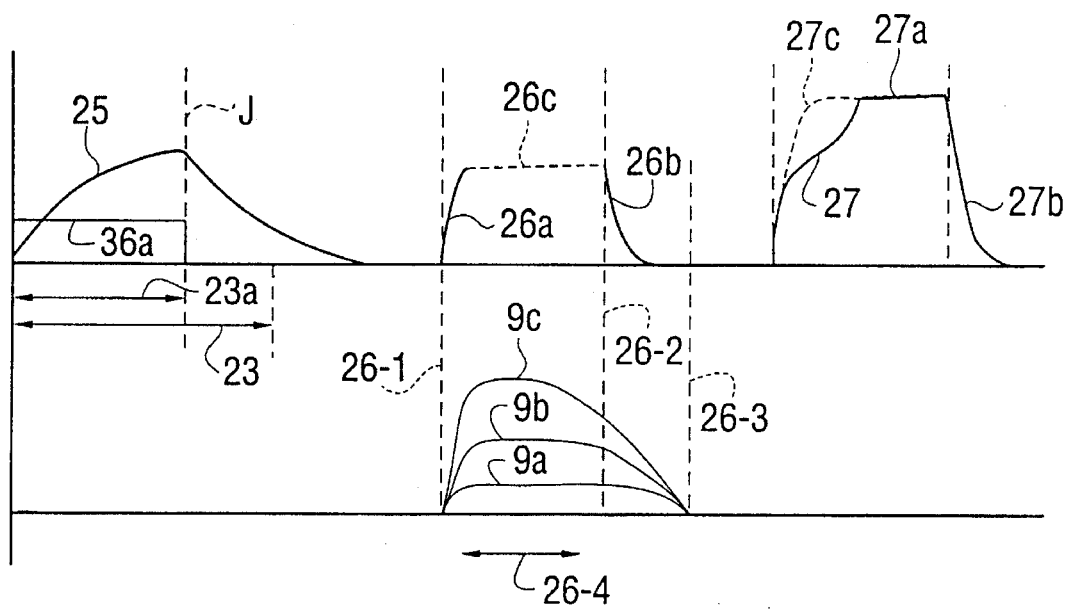
FIG. 9 is a time chart showing armature currents.

One of above-described position detecting signal curves is shown as a curve 36a in a time chart of FIG. 9. The armature coil 32a is supplied with an exciting current during a time period corresponding to this curve 36a in FIG. 4. An arrow 23a shows a current supply angle of 120 degrees.

In an initial stage of the current supply period, building-up of the exciting current is delayed due to inductance of the armature coil. If the current is stopped, magnetic energy stored in the armature coil is discharged though diodes 6c, 6d in case of FIG. 4 to return to the electric power source. Therefore, the current decreases as shown by a second half portion of the curve 25; i.e. a right side of the dotted line J.

A section where positive torque generates is a 180-degree section shown by an arrow 23. Therefore, counter torque is generated, so that both output torque and efficiency are reduced. This phenomenon becomes remarkable as the speed increases. It is therefore feared that the motor cannot be practically used in a high-speed region This is because a time width of a positive torque generating section 23 becomes small in proportion to an increase of the rotational speed, while a time width of a counter torque generating section does not vary even if the motor speed becomes a high speed.

The same explanation is applied to the current supply operation of the armature coils based on other position detecting signals 37a, 38a.

Since a building-up portion of the curve 25 is also delayed, an output torque is decreased. That is, torque reduction is generated. This is because the magnetic poles and the salient poles interact to close the magnetic path to have a large inductance.

The reluctance type motor has a disadvantage in that it cannot increase its rotational speed notwithstanding an advantage of large output torque. Such a disadvantage derives from above-described counter torque and torque reduction.

Figure 5:
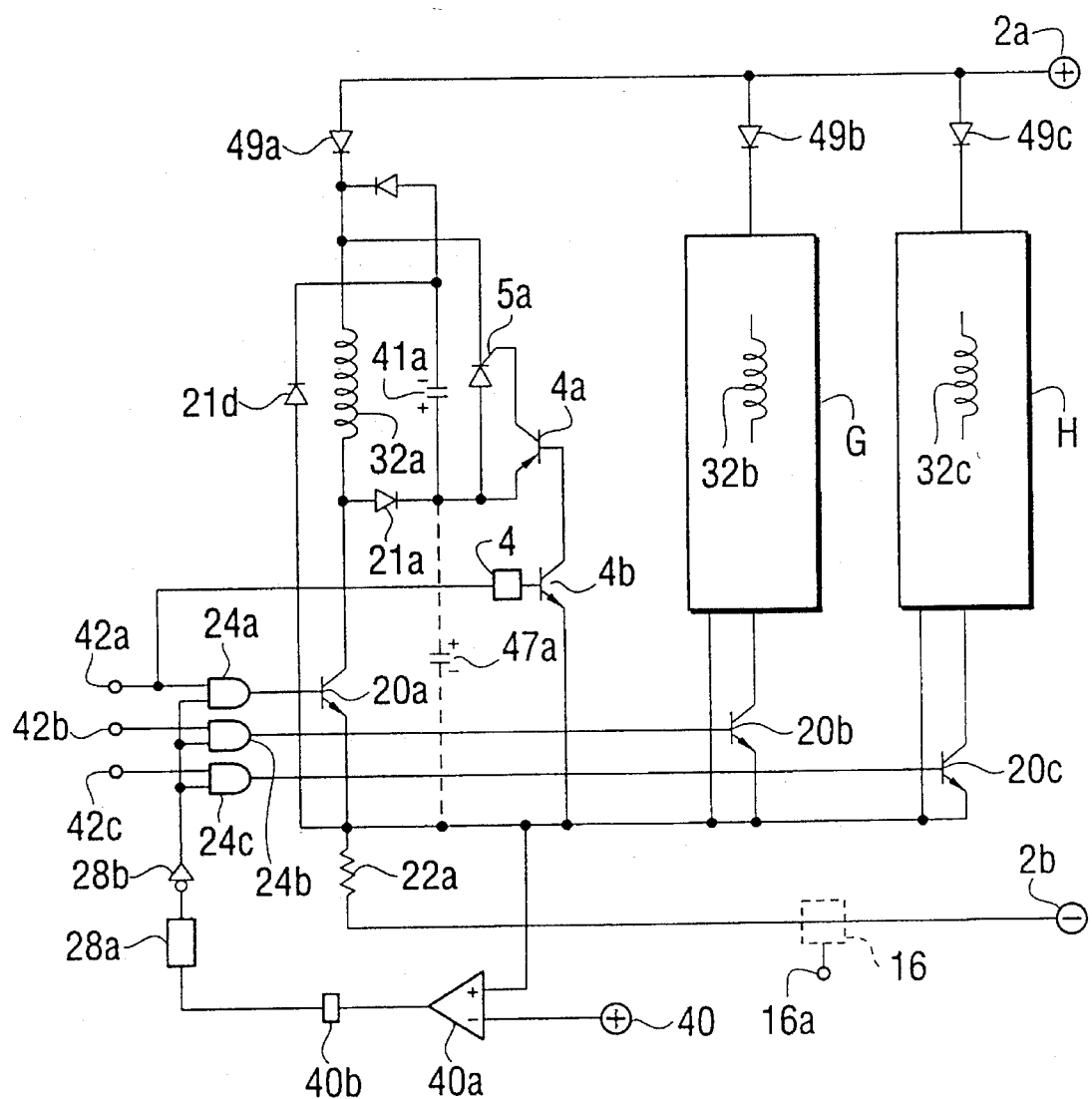
FIG. 5 is a circuit diagram showing a current supply control circuit for activating/deactivating armature coils in accordance with the present invention.

An apparatus in accordance with the present invention is characterized in that above-mentioned disadvantage is eliminated by additionally providing back-flow preventing diode 49a, a small-capacitance capacitor 41a, diodes 49a, 21a, semiconductor elements 4a, 4b, 5a and others shown in FIG. 5, and only one semiconductor switching element (20a, 20b or 20c), controlling activation/deactivation of each armature coil, is provided at a negative voltage side of the DC electric power source.

When current is terminated at the terminal end of the curve 36a, magnetic energy stored in the armature coil 32a is discharged through the diode 21a to the capacitor 41a so as to charge it up to a high voltage with polarities shown in the drawing, without returning to the DC electric power source side, by a function of the back-flow preventing diode 49a. Accordingly, the magnetic energy is sharply extinguished and the current decreases steeply.

Curves 27, 27a and 27b shown in the time chart of FIG. 9 cooperatively represent a current curve flowing the armature coil 32a. Both dotted lines are spaced 120 degrees. The armature current decreases steeply like the curve 27b and therefore no counter torque is generated. The capacitor 41a is charged up to a high voltage and held at this voltage.

Next, in response to the position detecting signal of curve 36b, the transistor 20a is turned on to activate the armature coil 32a again. A voltage equivalent to a summation of the charged voltage of the capacitor 41a and the DC electric power source voltage (a voltage between the terminals 2a and 2b) is applied to the armature coil 32a in this case; therefore an exciting current of the armature coil 32a builds up sharply.

By virtue of this function, the exciting current builds up abruptly as shown by the curve 27. The building-up portion of the current 27 becomes slow or moderate at its intermediate portion, because the magnetic energy is transformed into thermal energy due to copper loss of coils and iron loss of magnetic cores when the magnetic energy is transferred between armature coils. A countermeasure for eliminating such a disadvantage will be discussed later. As is explained above, the torque reduction and the counter torque are removed. And, as the exciting current becomes substantially the rectangular waveform, an output torque is increased. Function of SCR (Silicon Controlled Rectifier) 5a and transistors 4a, 4b will be explained next.

When a position detecting signal is inputted from the terminal 42a, the transistor 20a turns on. A block circuit 4 is also supplied with a position detecting signal. This block circuit 4 includes a differential circuit and a monostable circuit. A differential pulse generated by a building-up portion of position detecting signal activates the monostable circuit. Transistors 4a, 4b, turned on by an electric signal having a predetermined width, supplies a gate current to the SCR 5a to turn on. Hence, discharge current flows in the order of positive electrode of the capacitor 41a→SCR 5a→ armature coil 32a→transistor 20a→diode 21d → negative electrode of the capacitor 41a. Upon termination of discharge, the SCR 5a and the transistors 4a, 4b are turned off.

Next, a chopper circuit will be explained. When the armature current of the armature coil 32a increases and therefore the voltage drop in the resistor 22a, which detects armature current value, increases to exceed the reference voltage of the reference voltage terminal 40 (i.e. an input voltage of the negative terminal of the operational amplifier 40a), an output of the operational amplifier 40a turns to a HIGH-level. Accordingly, the differential circuit 40b generates a differential pulse to activate the monostable circuit 28a, whose output becomes an electric pulse having a predetermined width. As this output electric pulse is converted into a LOW-level electric pulse by the inversion circuit 28b, an output of the AND circuit 24a becomes a LOW-level signal having the same width, during which the transistor 20a is deactivated.

Accordingly a current flowing the armature coil reduces, and then this current flows through the diode 21a into the capacitor 41a to charge it up. When the output of the monostable circuit 28a extinguishes, outputs of the inversion circuit 28b and the AND circuit 24a return to a HIGH-level. Therefore, the transistor 20a turns on to increase the exciting current of the armature coil 32a. When the armature current exceeds a predetermined value, an output of the operational amplifier 40a turns again to a HIGH-level. The transistor 20a turns off during a predetermined period of time corresponding to the output pulse width of the monostable circuit 28a. Thus, the armature current reduces. Repetition of such a cycle constitutes a chopper circuit wherein the exciting current is maintained at a predetermined level regulated by the reference voltage of the reference voltage terminal 40.

A section indicated by the curve 27a of FIG. 9 represents a current to be chopper controlled. It is also possible to realize a constant speed control by means of a conventional means which controls the reference voltage of the reference voltage terminal 40 with a voltage proportional to the rotational speed.

During above-described chopper operation, the capacitor 41a is repeatedly charged in response to output pulses from the monostable circuit 28a so as to increase its charge voltage and store electrostatic energy. When the transistor 20a turns off at the terminal end of a position detecting signal, all the magnetic energy stored in the armature coil 32a is charged in the capacitor 41a. Another electrostatic energy, corresponding to chopper frequency and current attenuation amount, is further added to the capacitor 41a. This large amount electrostatic energy can compensate energy loss, i.e. previously described copper loss of armature coils and iron loss of magnetic poles in a building-up of armature current when the armature coil 32a is next activated.

Accordingly, the exciting current builds up as shown by a dotted line 27c of FIG. 9, whose building-up is so steep that, its waveform becomes substantially rectangle. Therefore, an output torque can be increased. Capacitance of the capacitor 41a, frequency of chopper current, and output pulse width of the monostable circuit 28a need to be adjusted so as to bring the above-described function and effect.

AND circuits 24b, 24c and transistors 20b, 20c also perform chopper control of armature current to be supplied to the armature coils 32b, 32c. Furthermore, block circuits G, H perform current supply control so as to make building-up and trailing-edge of exciting current of each armature coil sharp.

Current supply to each armature coil can be initiated from any timing within a range of approximately 30-degree section starting the point where the salient poles come to confront with the magnetic poles. An adjustment is carried out by taking account of rotational speed, efficiency, and output torque to change the fixing positions of the detecting coils 10a, 10b and 10c being fixed on the armature side for serving as position detecting elements.

As is apparent from the foregoing description, it becomes possible to drive a motor at a high speed with good efficiency and large output as a three-phase half-wave current supply type motor. Thus, the purpose of the present invention can be accomplished.

Curves 26a, 26b and 26c shown in FIG. 9 cooperatively represent a current supply curve for the armature coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 9a, 9b and 9c show output torque curves. At the point of the dotted line 26-1, the current supply operation is initiated and the salient poles begin confronting with the magnetic poles at the same time. The curve 9a represents a case where a current supplied to the armature coil is small. Its torque becomes relatively flat. However, as shown by the curves 9b, 9c, a peak value of the torque tends to shift toward a left side as the current value increases, and also a width of the peak value becomes narrow.

In view of above-described torque characteristics and supplied current value, it is preferable to adjust the fixing points of the position detecting coils 10a, 10b and 10c to set an initiation timing of the current supply operation at an intermediate point of a 30-degree wide section starting from the point where salient poles begin confronting with the magnetic poles.

Charging voltage of the capacitor 41a gets higher as its capacitance reduces. Therefore, with small-capacitance capacitor 41a, the exciting current of the armature coil can be built up sharply and reduced steeply. The motor can thus operate at a high-speed region. Then the disadvantage of the conventional reluctance type motor can be eliminated. It is preferable to select a capacitor having a capacitance not to damage transistors in the circuit. The present invention can be embodied by removing the capacitor 41a and newly providing a small-capacitance capacitor 47a as indicated by a dotted line in the drawing. This modified circuit will bring similar function and effect.

The chopper circuit will be constituted by interposing a switching element 16 in series at a negative terminal side 2b of the electric power source and feeding the output of the inversion circuit, 28b to a base input terminal 16a thereof. In this case, AND circuits 24a, 24b and 24c are removed. Input signals of the terminals 42a, 42b and 42c carry out the control of activation/deactivation of the transistors 20a, 20b and 20c.

Another embodiment of a current supply control circuit for the three-phase half-wave current supply mode motor in accordance with the present invention will be next explained with reference to FIG. 6. Position detecting signals of curves 36a, 36b,—, 37a, 37b,—, 38a, 38b,— of FIG. 10 are inputted from terminals 42a, 42b, 42c. A 120-degree width exciting current is supplied to the armature coils 32a, 32b, 32c successively.

The operational amplifier 40a, the differential circuit 40b, the resistance 22a, and the reference voltage terminal 40 are the same components as those denoted by the same reference numerals in the previous embodiment. These components constitute a chopper circuit which maintains the armature current at a predetermined level.

When the exciting current is terminated upon a signal input to the terminal 42a, magnetic energy stored in the armature coil 32a is discharged through the diodes 21a, 21d into the small-capacitance capacitor 47a which is charged up to a high voltage with polarities indicated in the drawing. The transistor 20a is held in a turned-off condition in this case.

When the rotor rotates 240 degrees, the transistor 20c is turned on in response to an input signal to the terminal 42c to initiate current supply to the armature coil 32c. In this instance the capacitor 47a supplies its charged high voltage to the armature coil 32c to build up the exciting current quickly.

The building-up of the exciting current becomes sharp as the capacitance of the capacitor 47a decreases. However, the capacitance of the capacitor 47a should be determined not to exceed withstanding voltages of other semiconductor elements.

Electrostatic energy stored in the capacitor 47a is discharged through the armature coil 32c, the transistor 20c, the resistance 22a, and the diode 21g. When the transistor 20a is turned off, magnetic energy stored in the armature coil 32a is transferred through the diodes 21a, 21d and the SCR 23a to charge the capacitor 47a up to a high voltage.

As the position detecting signal of the terminal 42a is supplied to the gate of the SCR 23a, magnetic energy of the armature coil 32a is gradually stored into the capacitor 47a during chopper operation of the transistor 20a repeating turning on and turning off.

As will be later explained, the capacitor 47b, when charged up to a high voltage, discharges its electrostatic energy through the armature coil 32a and the diode 21a to the capacitor 47a to charge it up. However, as the SCR 23a is turned off in this instance, this discharge can be prevented.

When the transistor 20c is turned on, an input signal of the terminal 42c is supplied to the gate of the SCR 23c to turn on SCR 23c. Accordingly, magnetic energy in the armature coil 32c is gradually stored into the capacitor 47c during the chopper operation.

When the current supply to the armature coil 32c is terminated, magnetic energy stored in the armature coil 32c is discharged through the diodes 21c, 21f into the capacitor 47c to charge it up to a high voltage. When the rotor rotates 240 degrees, the transistors 20b is turned on upon signal input to the terminal 42b to initiate the armature coil 32b. In this instance, the capacitor 47c supplies its charged high voltage to the armature coil 32b to make the building-up of the exciting current sharp. In this case, the discharge current passes through a diode 21i.

When the current supply to the armature coil 32b is terminated, magnetic energy stored in the armature coil 32b is discharged through the diodes 21b, 21e into the capacitor 47b to charge it up to a high voltage. When the rotor further rotates 240 degrees, the transistor 20a is turned on upon signal input to the terminal 42a. In this instance, the capacitor 47b supplies its charged high voltage through the diode 21h to the armature coil 32a to make the building-up of the exciting current sharp. As magnetic energy is discharged into a corresponding small-capacitance capacitor when current supply to each armature coil is terminated, reduction of the exciting current becomes steep.

As apparent from above explanation, torque reduction and counter torque are surely prevented and therefore a motor capable of operating in a high-speed region with high efficiency can be obtained. Furthermore the circuit is manufactured at low cost because a power switching element, which is normally expensive, is required only one at a negative voltage side of each armature coil. The purpose of the present invention is thus accomplished.

With high voltages of the capacitors 47a, 47b, 47c, exciting current supplied to the armature coils 32c, 32a, 32b build up quickly. Input signals (i.e. position detecting signals) of the terminals 42a, 42b, 42c are fed to the SCRs 23a, 23b, 23c respectively. Accordingly, during the chopper operation with turning on-and-off of the transistors 20a, 20b, 20c, capacitors 47a, 47b, 47c gradually store magnetic energy of corresponding armature coils in accordance with chopper frequency. This storage in the capacitors 47a, 47b, 47c compensates the energy loss, i.e. copper loss and iron loss, occurring when magnetic energy transfers between armature coils, so as to make the armature current build up sharply.

The same purpose will be accomplished even if the capacitors 47a, 47b, 47c are substituted for capacitors 46a, 46b, 46c as indicated by a dotted line in the drawing. In this case., these capacitors 46a, 46b, 46c have to accompany, at their negative electrode side, circuits comprising components corresponding to the SCRs 23a, 23b, 23c and the diodes 21g, 21h, 21i.

In the same manner as in the previous embodiments, diodes 49a, 49b, 49c prevent current from flowing back to the DC electric power source side due to high-voltage of the capacitors 47a, 47b, 47c. The SCRs 23b, 23c and the diodes 21h, 21i are functionally identical with the SCR 23a and the diode 21g, respectively.

Figure 6:
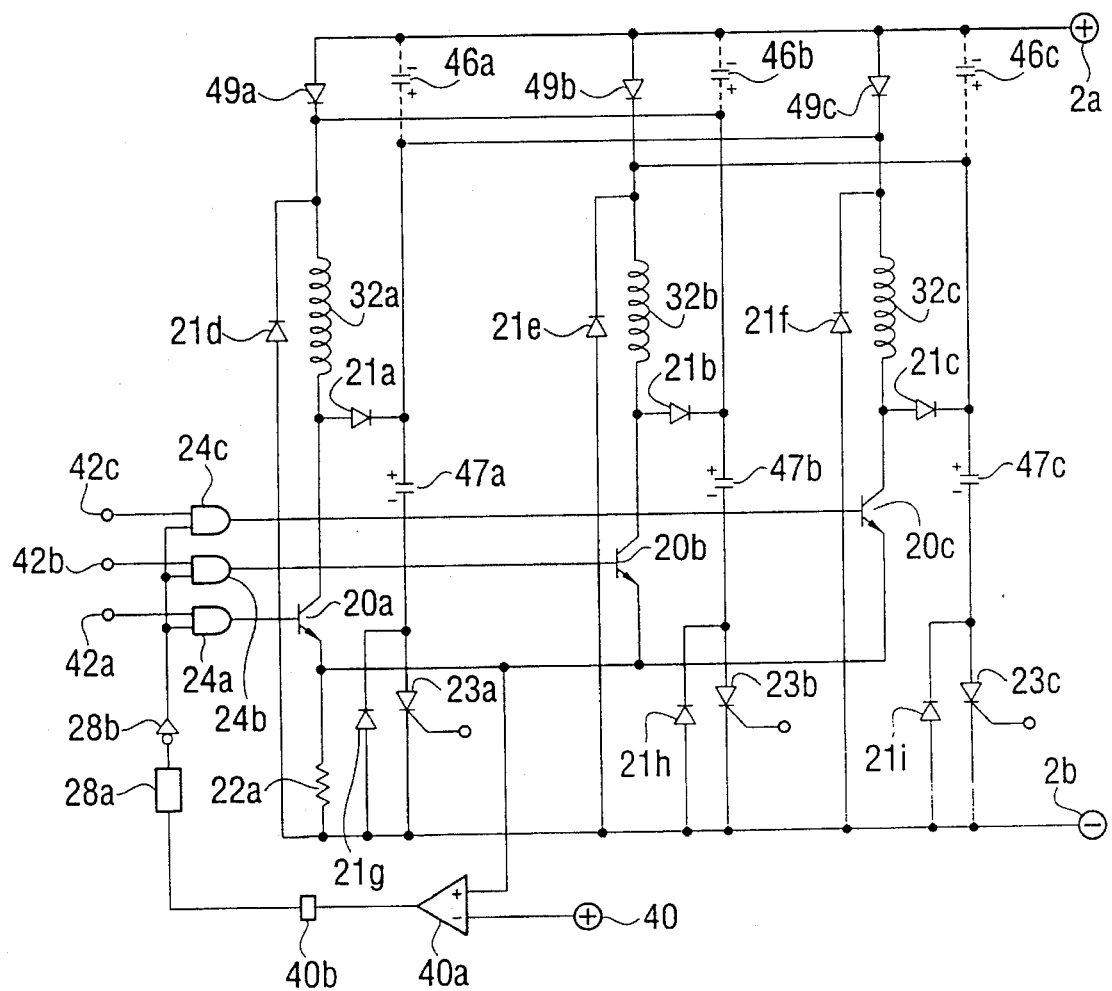
FIG. 6 is a circuit diagram showing another current supply control circuit for activating/deactivating armature coils in accordance with the present invention.
Figure 7:
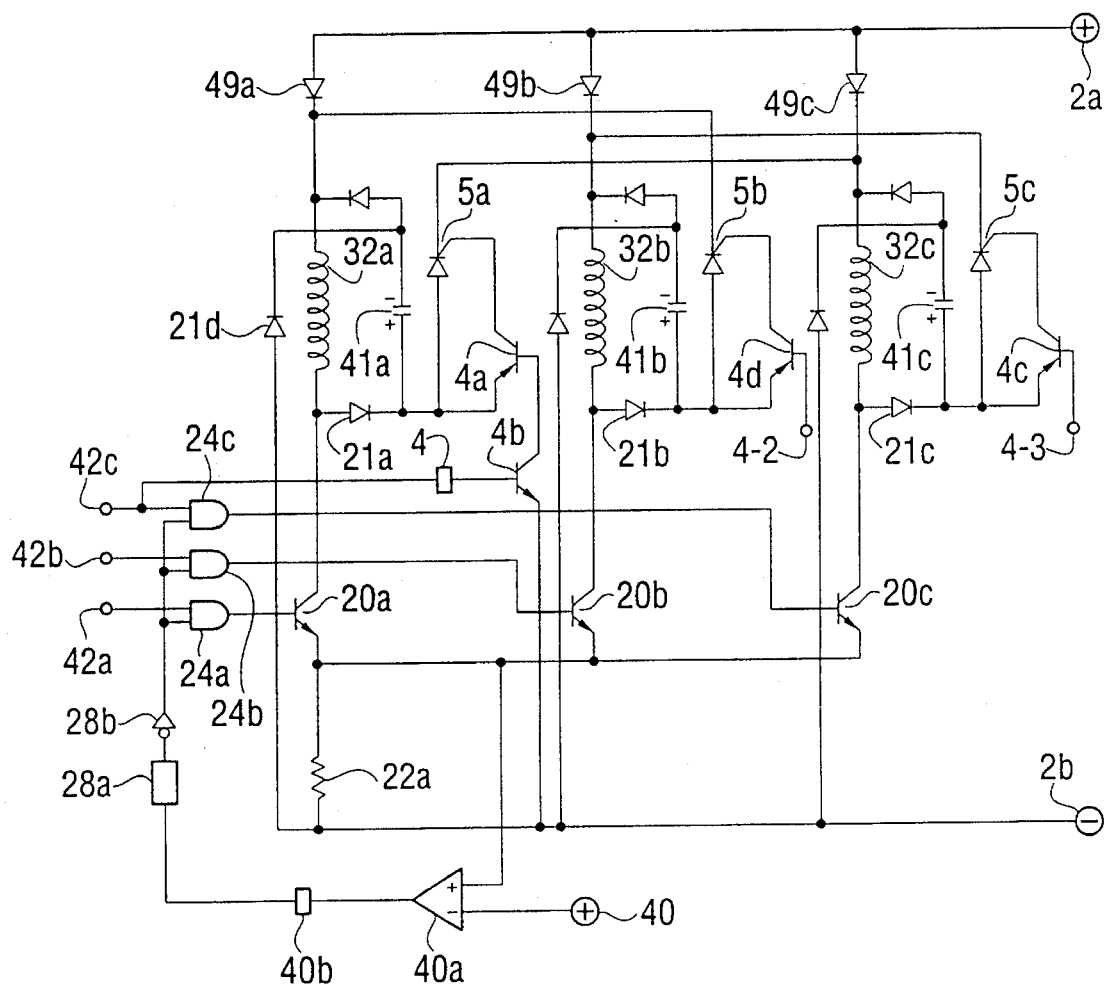
FIG. 7 is a circuit diagram showing still another current supply control circuit for activating/deactivating armature coils in accordance with the present invention.

FIG. 7 shows a modified embodiment of the circuit disclosed in FIG. 6. When the transistors 20a, 20b, 20c turn on at the terminal end of the position detecting signal, the capacitors 41a, 41b, 41c are charged up to a high voltage through diodes 21a, 21b, 21c. In this case, if transistors 4a, 4b, SCR 5a are turned on in response to an electric pulse of a predetermined width which is obtained by a block circuit 4 at a beginning end of the position detecting signal inputted from the terminal 42c, charged high voltage of the capacitor 41a is applied to the armature coil 32c to build up the exciting current sharply. The transistor 20c is turned on in this condition.

The transistors 4b, 4c also receive, at their base terminals 4-2, 4-3, electric pulses obtained at beginning ends of position detecting signals inputted from the terminals 42a, 42b through the similar means. Therefore, the SCRs 5b, 5c turn on during a period of time corresponding to these electric pulses. The high voltage of the capacitors 41b, 41c therefore make exciting current of armature coils 32a, 32b build up sharply.

Function of the chopper circuit is similar to that of FIG. 6. Accordingly, current supply control can be carried out in the same manner as in the embodiment of FIG. 6. Thus, the purpose of the present invention can be accomplished.

Figure 8:
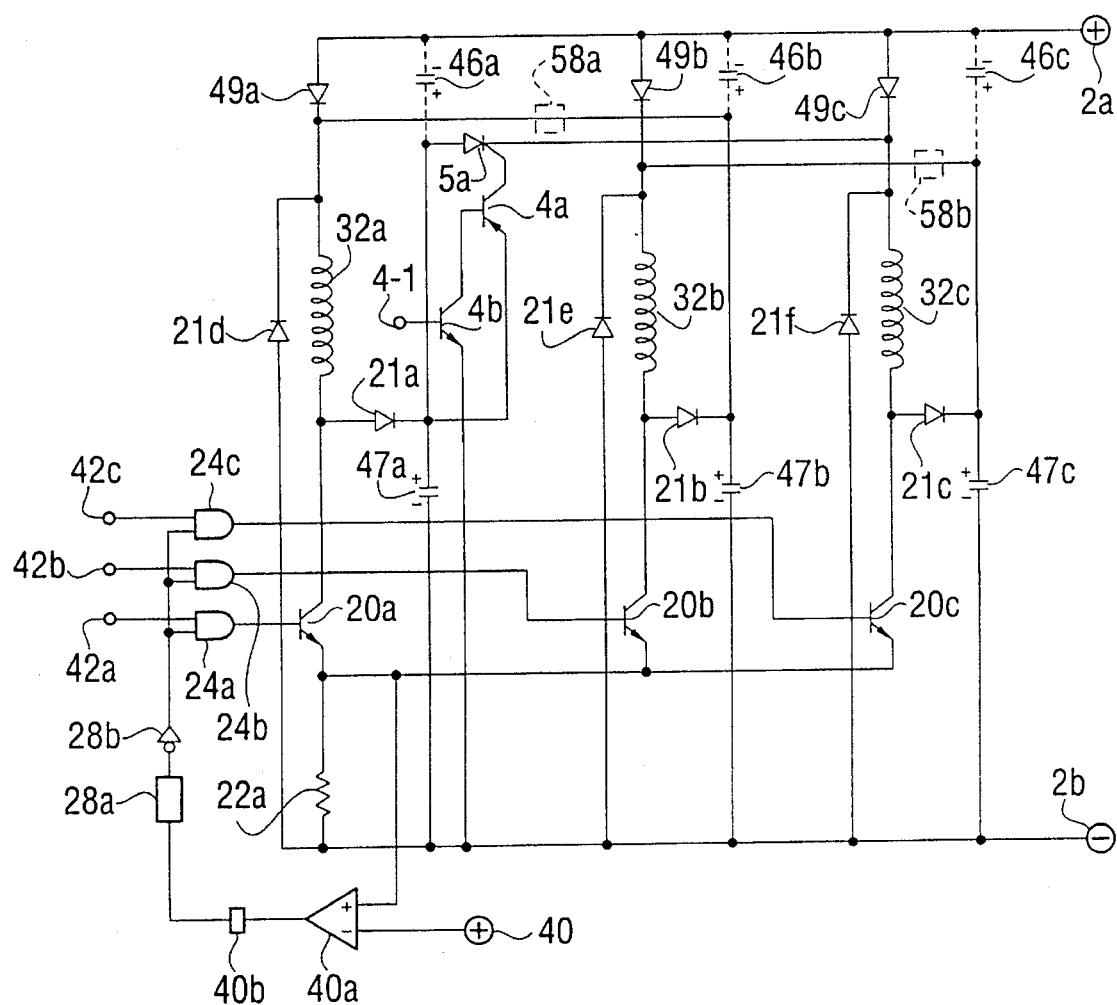
FIG. 8 is a circuit diagram showing still another current supply control circuit for activating/deactivating armature coils in accordance with the present invention.

Next, the embodiment of FIG. 8 will be explained. Capacitors 47a, 47b, 47c or their substitutions 46a, 46b, 46c, serving as charging means for storing magnetic energy when armature coils are deactivated, are similar to those of FIG. 6. Means for discharging electrostatic energy, stored in the capacitors 47a, 47b, 47c at a high voltage, to armature coils is also similar to that of FIG. 7. The transistor 4b receives, at its base terminal 4-1, an electric pulse obtained at a beginning end of position detecting signal inputted from the terminal 42c. Therefore, the transistors 4b, 4a, SCR 5a turn on during a period of time corresponding to the electric pulse. Accordingly, an exciting current of armature coil builds up sharply when the transistor 20c turns on.

Block circuits 58a, 58b are identical with the driving circuit of the above-described SCR 5a. The block circuit 58a turns on in response to an electric pulse obtained at a beginning end of the input signal to the terminal 42a during a period of time corresponding to this electric pulse. The block circuit 58b turns on in response to an electric pulse obtained at a beginning end of the input signal to the terminal 42b during a period of time corresponding to this electric pulse. Therefore, exciting current of corresponding armature coil can build up sharply. The chopper circuit functions in the same manner as in the previous embodiment. Even if any of block circuits 58a, 58b is omitted, the purpose of the present invention can be accomplished.

Figure 11:
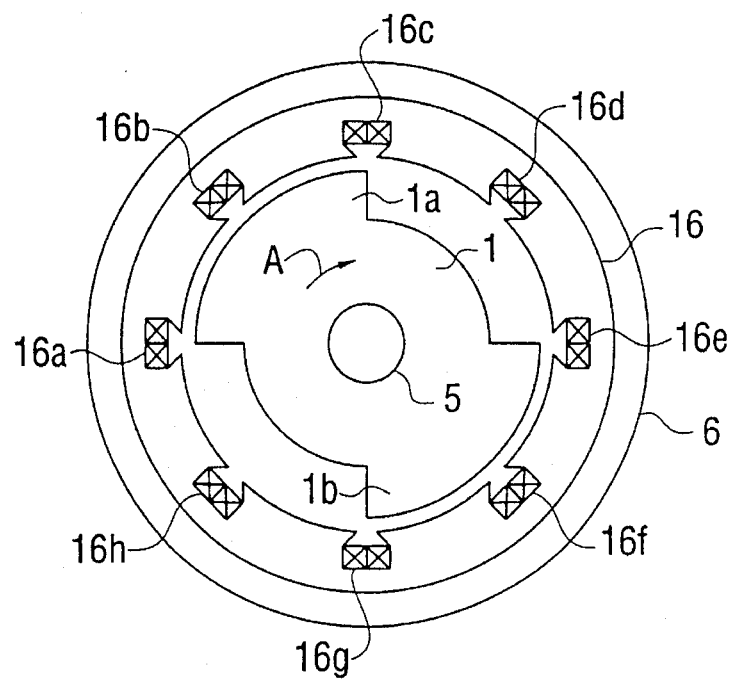
FIG. 11 is a plan view showing a two-phase full-wave reluctance type motor in accordance with the present invention.

Next, a constitution of a two-phase full-wave reluctance type motor embodying the present invention will be explained. FIG. 11 is a plan view showing a fixed armature and a rotor.

In FIG. 11, reference numeral 1 represents a rotor which is equipped with a plurality of salient poles 1a, 1b, — having the same width of 180 degrees (i.e. 90 degrees in terms of mechanical angle) and mutually spaced at regular intervals of 360 degrees.

The rotor 1 is made of well-known laminated silicon steel sheets, and has a rotational shaft 5. A fixed armature 16 is provided with 8 slots 16a, 16b, —, being mutually spaced at regular intervals. A reference numeral 6 represents a cylinder serving as an outer casing.

The slots 16a, 16c and 16e, 16g are respectively wound by one coil. Two coils are connected in series or parallel to constitute a No. 1-phase armature coil. This embodiment connects these two coils in series.

The slots 16b, 16d and 16f, 16h are respectively wound by one coil. These two coils are connected in series to constitute a No. 2-phase armature coil. And, the slots 16c, 16e and 16g, 16a are respectively wound by one coil. These two coils are connected in series to constitute a No. 3-phase armature coil. Slots 16d, 16f and 16h, 16b are respectively wound by one coil. These two coils are connected in series to constitute a No. 4-phase armature coil.

A two-phase motor is generally constituted by No. 1-and No. 2-phase armature coils. As each phase is constituted by the bifilar winding, it is possible to regard that the No. 1-phase is constituted by a set of two armature coils and the No. 2-phase is also constituted by a set of two armature coils. These armature coils should be referred to as No. 1-, No. 3- and No. 2-, No. 4-phase armature coils in the present specification. An order of current supply will be as follows: No. 1-phase→No. 2-phase →No. 3-phase→No. 4-phase. Repeating this cyclical current supply results in generation of an output torque.

An arrow A denotes a rotational direction of the rotor 1. Salient poles 1a, 1b have an angular width of 90 degrees in terms of mechanical angle, and are spaced with each other at the same interval.

Figure 12:
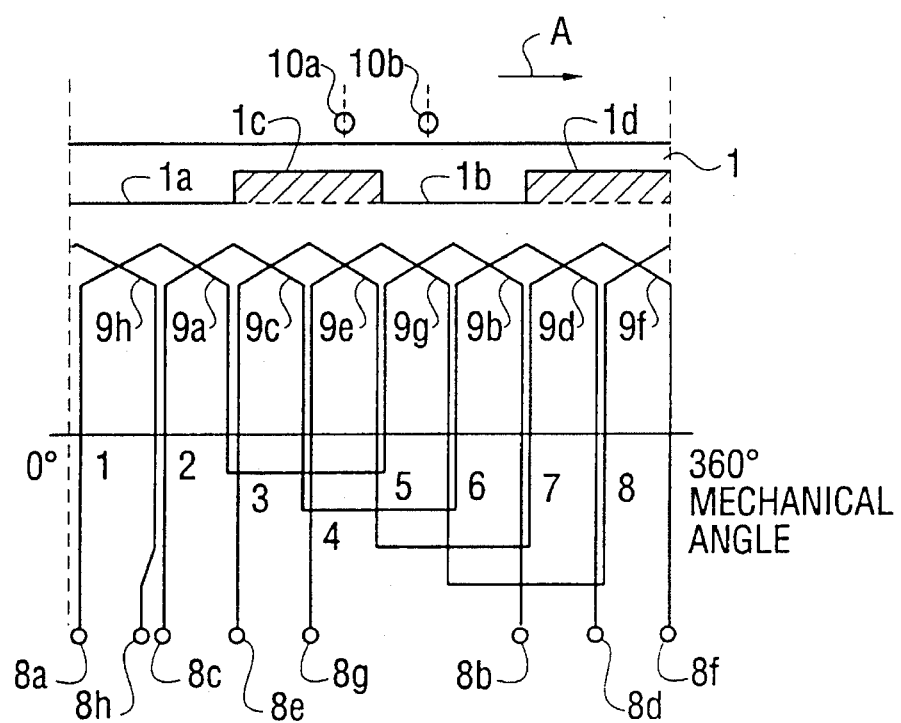
FIG. 12 is a development showing a fixed armature and a rotor of the motor of FIG. 11.

FIG. 12 is a development showing the rotor 1 and the armature coils. In FIG. 12, armature coils 9a, 9b serve as the No. 1-phase armature coil previously described. Armature coils 9c, 9d, armature coils 9e, 9f, and armature coils 9g, 9h serve respectively as the No. 2-, No. 3 and No. 4-phase armature coils previously described.

Reference numerals 8a, 8b, 8c, 8d, 8e, 8f, and 8g, 8h represent extracted terminals for the No. 1-, No. 2-, No. 3- and No. 4-phase armature coils.

The fixed armature 16 is made of well-known laminated silicon steel sheets as well as the rotor 1.

Portions shaded by dotted lines 1c, 1d are filled with plastic material in order to reduce frictional loss of air in a high-speed rotational region.

Hereinafter, No. 1-, No. 2-, No. 3- and No. 4-phase armature coils are referred to as armature coils 32a, 32b, 32c and 32d, respectively.

When the armature coil 32c is activated, the salient poles 1a, 1b are magnetically attracted and the rotor 1 rotates in a direction A. When the rotor 1 rotates 90 degrees, the armature coil 32c is deactivated and the armature coil 32d is activated. When the rotor 1 further rotates 90 degrees, the armature coil 32d is deactivated and the armature coil 32a is activated.

A current supply mode is cyclically alternated every 90-degree rotation in the order of; the armature coil 32a →the armature coil 32b→the armature coil 32c→the armature coil 32d. Accordingly, the motor can be driven as a two-phase full-wave motor.

In this case, symmetrically disposed magnetic poles are magnetized to N-poles and S-poles as shown in the drawing. Since two magnetic poles excited simultaneously are always magnetized to have opposite polarities each other, leaking magnetic fluxes passing non-excited magnetic poles become mutually opposite and, therefore, counter torque is prevented from being generated.

Coils 10a and 10b are position detecting elements for detecting positions of the salient poles 1a and 1b, and are fixed on the armature 16 as shown in the drawings. Their coil surfaces face to side surfaces of the salient poles 1a, 1b over air gap. The coils 10a and 10b are spaced each other by an amount of 90 degrees. The coil is of a 100-turn air-core having a diameter of 5 mm.

Figure 13:
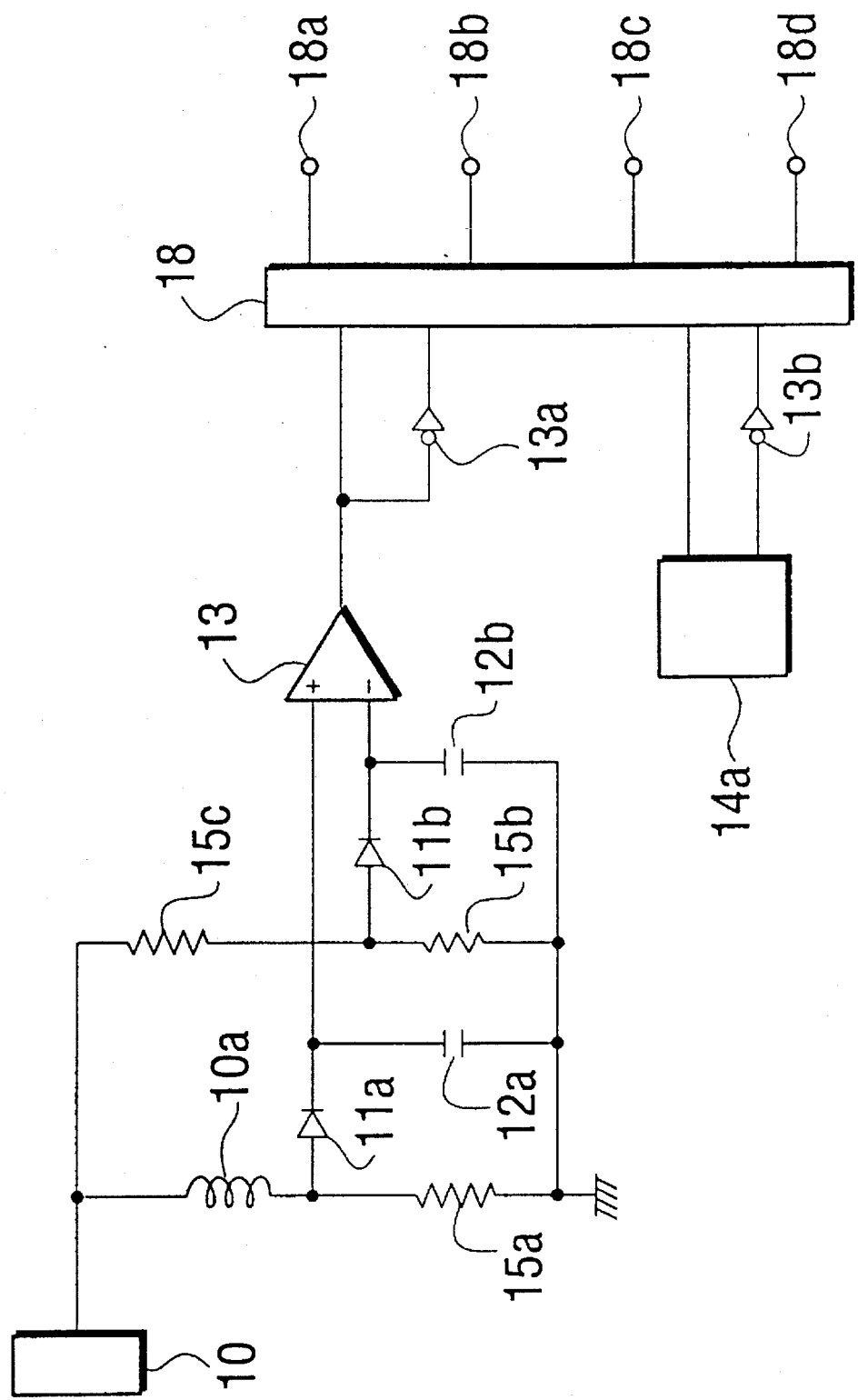
FIG. 13 is a circuit diagram showing a position detecting device.

FIG. 13 shows a device for obtaining position detecting signals from the coils 10a and 10b. In FIG. 13, the coil 10a and resistances 15a, 15b and 15c constitute a bridge circuit. This bridge circuit is adjusted to balance when the coil 10a does not directly confront with the salient poles 1a, 1b. Accordingly, an output of a low-pass filter consisting of a diode 11a and a capacitor 12a and an output of a low-pass filter consisting of a diode 11b and a capacitor 12b are equal to each other and, therefore, an output of the operational amplifier 13 becomes a LOW-level.

An oscillator 10 causes approximately 1 MHz oscillations. When the coil 10a directly confront with the salient poles 1a, 1b, —, an impedance is reduced due to iron loss (i.e. eddy loss and hysteresis loss). Therefore, a voltage drop in the resistance 15a becomes large and therefore the output of the operational amplifier 13 becomes a HIGH-level.

Figure 19:
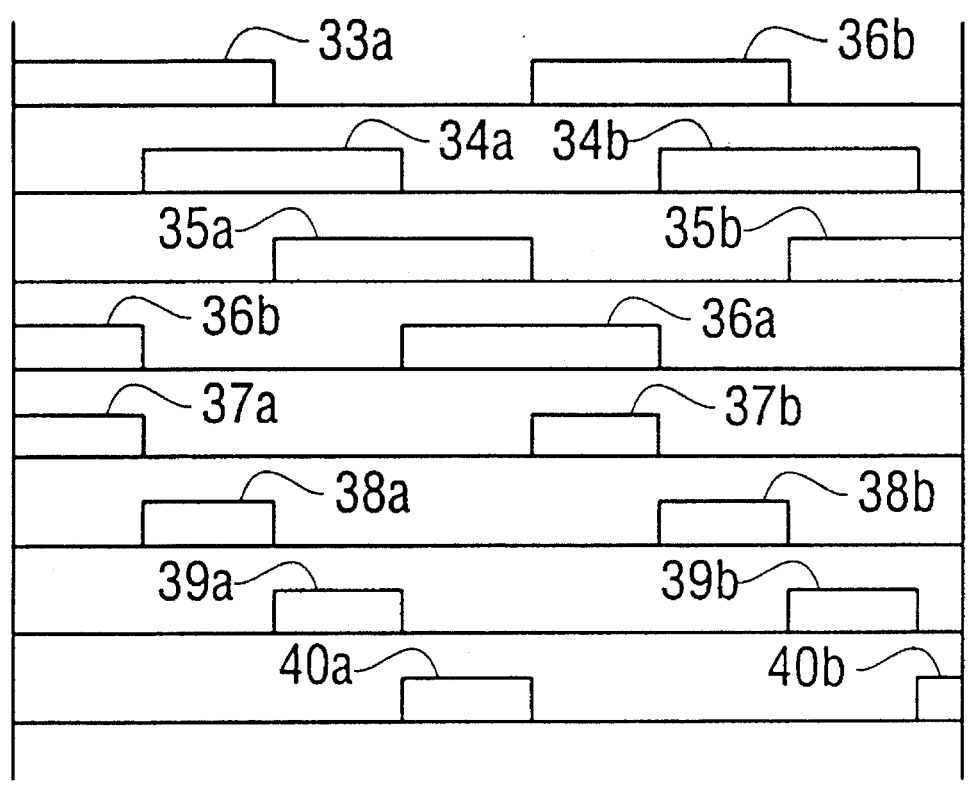
FIG. 19 is a time chart showing position detecting signals.

Inputs to the block circuit 18 are shown by curves 33a, 33b, — in a time chart of FIG. 19, and inputs curves 35a, 35b,—supplied through an inversion circuit 13a are identical with inverted curves of the curves 33a, 33b,—. The block circuit 14a in FIG. 13 has the same constitution as the above-described block circuit including the coil 10b. The oscillator 10 can be utilized commonly among these block circuits.

An output of the block circuit 14a and an output of the inversion circuit 13b are inputted into the block circuit 18, and their output signals become curves 34a, 34b,— as shown in FIG. 19 and inverted curves 36a, 36b,— of the curves 34a, 34b.

The curves 34a, 34b,— are delayed 90 degrees in their phase with respect to the curves 33a, 33b,—. Curves 37a, 37b,— show the output of an AND circuit inputting two signals of the curves 33a, 33b,— and the curves 36a, 36b,—. Curves 38a, 38b,— show the output of an AND circuit inputting two signals of the curves 33a, 33b,— and the curves 34a, 34b,—. Curves 39a, 39b,— and curves 40a, 40b are obtained in the same manner.

Above-described circuit is shown as the block circuit 18. Terminals 18a, 18b,—generate signal curves 38a, 38b,— shown in the bottom.

The same purpose will be accomplished by using an aluminum plate having the same configuration instead of the rotor 1 of FIG. 11 confronting with the coils 10a, 10b.

Next, current supply control to the armature coils will be explained with reference to FIG. 15. Lower ends of the armature coils 32a, 32b, 32c and 32d are connected with transistors 20a, 20b, 20c and 20d. The transistors 20a, 20b, 20c and 20d serve as semiconductor switching elements and can be substituted for other semiconductor elements having the same effect. A DC electric power source supplies electric power from its positive and negative terminals 2a, 2b.

This embodiment is characterized by a simplified circuit configuration in which only one transistor (transistor 20a, 20b, 20c or 20d) is provided at a lower end of each armature coil, i.e. a negative terminal side of the DC electric power source. FIG. 4 shows a conventional circuit, which is already explained in the foregoing description and will no more be explained.

Details of FIG. 15 will be explained below. Position detecting signals of curves 37a, 37b,—, curves 38a, 38b,— curves 39a, 39b,—, and curves 40a, 40b,— in FIG. 19 are inputted from terminals 42a, 42b, 42c, and 42d. In response to these input signals fed through AND circuits 24a, 24b, 24c and 24d, transistors 20a, 20b, 20c and 20d are turned on to activate armature coils 32a, 32b, 32c and 32d.

At terminal 41, a reference voltage specifying an armature current is supplied. By changing the voltage of the terminal 41, an output torque can be changed. When an electric power switch (not shown) is turned on, an output of an operational amplifier 41a becomes a LOW-level since an input of a positive terminal of the operational amplifier 41a is lower than that of its negative terminal. As an input of an inversion circuit 28b is a LOW-level, an output of the inversion circuit 28b becomes a HIGH-level. Accordingly, the transistor 20a turns on to activate the armature coil 32a. A resistance 22 is provided for detecting armature current flowing the armature coils 32a, 32b, 32c and 32d.

A block circuit N represents an electric circuit for controlling activation/deactivation of the armature coils 32b, 32c, respectively. The block circuit N includes transistors 20b. 20d corresponding to the transistors 20a, 20c and diodes 49c. 49d corresponding to the diodes 49a. 49b.

Figure 17:
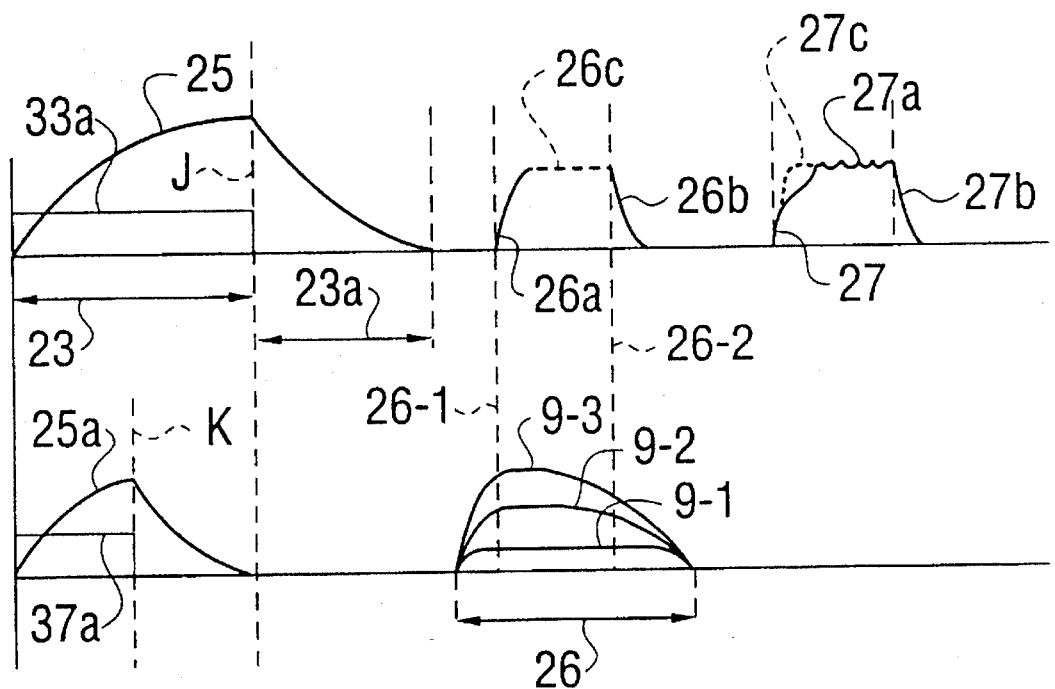
FIG. 17 is a time chart showing armature current.

One of the above-described position detecting signal curves of FIG. 19 is shown as a curve 33a in a time chart of FIG. 17. The armature coil 32a is supplied with an exciting current during a time period corresponding to this curve 33a in FIG. 4. An arrow 23 shows a current supply angle of 180 degrees.

In an initial stage of the current supply period, building-up of the exciting current is delayed due to inductance of the armature coil. If the current is stopped, magnetic energy stored in the armature coil is discharged through diodes 6c, 6d in case of FIG. 4 to return to the electric power source. Therefore, the current decreases as shown by a second half portion of the curve 25; i.e. a right side of the dotted line J.

A section generating positive torque is a 180-degree section shown by an arrow 23; therefore counter torque is generated in a section of an arrow 23a to decrease both output torque and efficiency. This phenomenon becomes remarkable as the speed increases, making difficult in practical usage in a high-speed region.

As the width of the curve 33a becomes small in proportion to an increase of the rotational speed, a building-up portion of the curve 25 is also delayed and an output torque is decreased. That is, torque reduction is generated. This is because the magnetic poles and the salient poles interact with each other to close the magnetic path to have a large inductance.

Although the reluctance type motor has a disadvantage in that it cannot increase its rotational speed notwithstanding an advantage of large output torque, such a disadvantage derives from the above-described counter torque and torque reduction.

Figure 15:
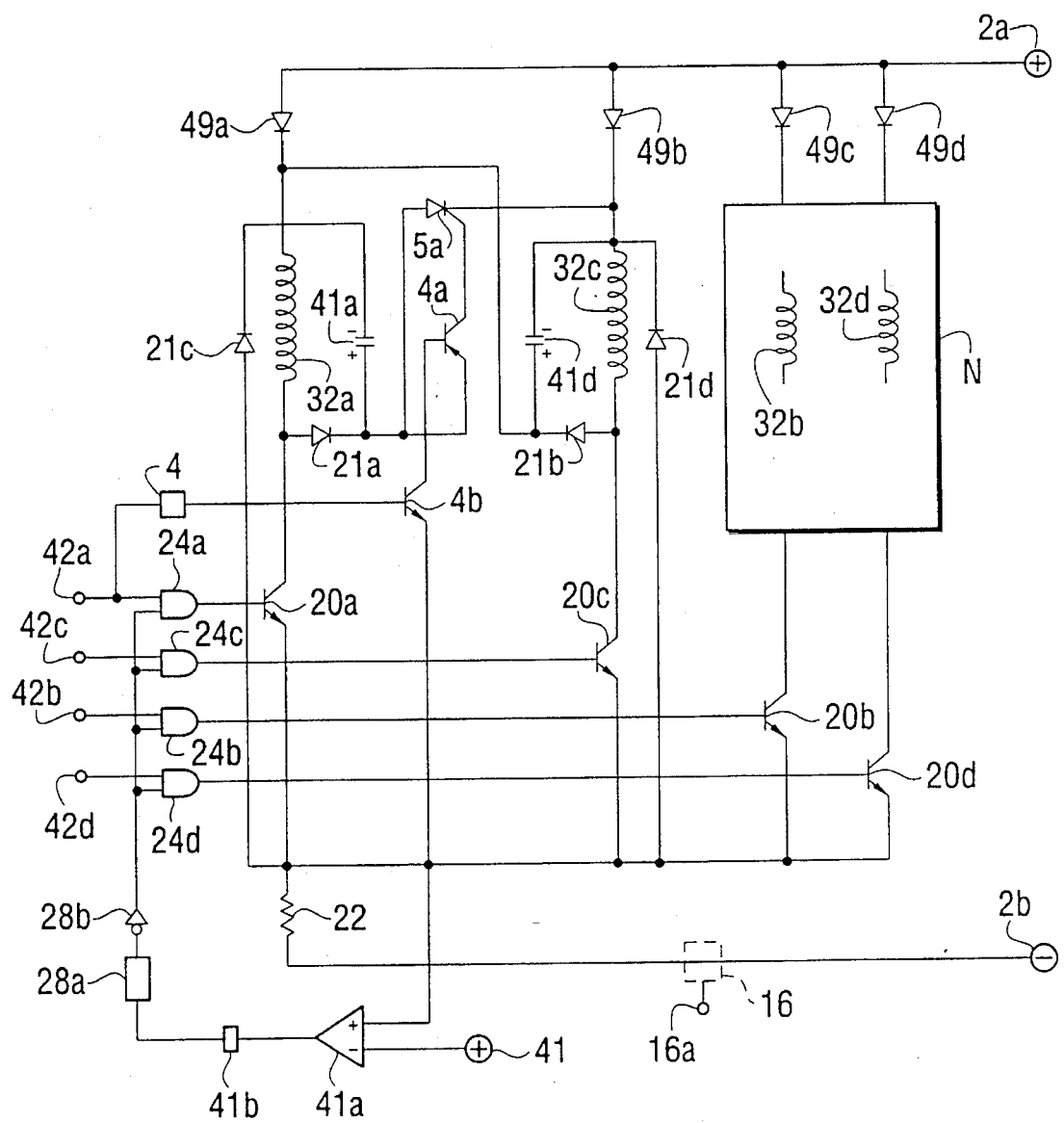
FIG. 15 is a circuit diagram showing another current supply control circuit for activating/deactivating armature coils in accordance with the present invention.

An apparatus in accordance with the present invention is characterized in that the above-mentioned disadvantage is eliminated by additionally providing back-flow preventing diodes 49a, 49b, small-capacitance capacitors 41c, 41d, diodes 21a, 21b, semiconductor elements 4a, 4b. 5a and others shown in FIG. 15, and only one semiconductor switching element (20a, 20b, 20c and 20d), controlling activation/deactivation of each armature coil, is provided at a negative voltage side of the DC electric power source.

Position detecting signals inputted from the terminals 42a, 42b, - - - are shown as curves 37a, 37b, - - - , curves 38a, 38b, - - - , curves 39a, 39b, - - - , and curves 40a, 40b, - - - in FIG. 19. In this embodiment, position detecting signals has 90-degree width.

When current is terminated at the terminal end of the signal curve 37a supplied from the terminal 42a, magnetic energy stored in the armature coil 32a is discharged through the diode 21a to the capacitor 41c so as to charge it up to a high voltage with polarities shown in the drawing, being prevented from returning to the DC electric power source side by a function of the back-flow preventing diode 49a. Accordingly, the magnetic energy is sharply extinguished and the current decreases steeply.

Curves 27, 27a and 27b shown in the time chart of FIG. 17 cooperatively represent a current curve flowing the armature coil 32a. Both dotted lines are spaced 90 degrees. The armature current decreases steeply like the curve 27b and therefore no counter torque is generated. The capacitor 41c is charged up to a high voltage and held at this voltage.

Next, in response to the position detecting signal curve 39a of FIG. 19 supplied from the terminal 42c, the transistor 20c is turned on to activate the armature coil 32c. A block circuit 4 is constituted by a monostable circuit activated by a differential pulse at an initial part of the curve 39a. In response to an electric pulse given at an initial part of an input to the terminal 42c, transistors 4a, 4b, SCR 5a are activated. Then, high voltage of the capacitor 41c is applied to the armature coil 32c to build up armature current quickly. When the transistor 20c is deactivated at the terminal end of the curve 39a, magnetic energy stored in the armature coil 32c is transferred into a small-capacitance capacitor 41d via a diode 21b.

Next, in response to the position detecting signal inputted from the terminal 42a, the armature coil 32a is activated. High voltage of the capacitor 41d is applied to the armature coil 32a to build up armature current quickly. Diodes 21c, 21d serve as components of discharge circuits for the capacitors 41c, 41d. Next, the reason why the SCR 5a is required will be explained. If the SCR 5a is eliminated, the capacitor 41d is not charged when the armature coil 32c is deactivated. Because, magnetic energy of the armature coil 32c is discharged in the order of; the diode 21b→the armature coil 32a→the diode 21a→the armature coil 32c.

Since a voltage equivalent to a summation of the charged voltage of the capacitor 41a and the DC electric power source voltage (a voltage between the terminals 2a, 2b) is applied to the armature coil 32a in this case, an exciting current of the armature coil 32a builds up sharply.

By virtue of this function, the exciting current builds up abruptly as shown by the curve 27 of FIG. 17. The building-up portion of the current 27 becomes slow or moderate at its intermediate portion, because the magnetic energy is transformed into thermal energy due to copper loss of coils and iron loss of magnetic cores when the magnetic energy is transferred between armature coils. A countermeasure for eliminating such a disadvantage will be discussed later. As is explained above, the torque reduction and the counter torque are removed, and the moveform of the exciting current becomes substantially rectangular, thereby increasing an output torque.

A block circuit N is a current supply control circuit for the armature coils 32b, 32d, which is similar to the current supply control circuit for the armature coils 32a, 32c.

Armature coils 32b, 32d are activated or deactivated in response to signal curves 38a, 38b- - - and curves 40a, 40b,— of FIG. 19 which serve as the position detecting signals supplied from the terminals 42b, 42d.

Next, a chopper circuit will be explained. When the armature current of the armature coil 32a increases and therefore the voltage drop at the resistor 22, which detects armature current value, increases to exceed the reference voltage of the reference voltage terminal 41 (i.e. an input voltage of the negative terminal of the operational amplifier 41a), an output of the operational amplifier 41a turns to a HIGH-level. Accordingly, the differential circuit 41b generates a differential pulse to activate the monostable circuit 28a, whose output becomes an electric pulse having a predetermined width. As this output electric pulse is converted into a LOW-level electric pulse by the inversion circuit 28b, an output of the AND circuit 24a becomes a LOW-level signal having the same width, during which the transistor 20a is deactivated.

Accordingly a current flowing the armature coil reduces, and then this current flows through the diode 21a into the capacitor 41a to charge it up. When the output of the monostable circuit 28a extinguishes, outputs of the inversion circuit 28b and the AND circuit 24a return to a HIGH-level. Therefore, the transistor 20a turns on to increase the exciting current of the armature coil 32a.

When the armature current exceeds a predetermined value, an output of the operational amplifier 41a turns again to a HIGH-level. The transistor 20a turns off during a predetermined period of time corresponding to the output pulse width of the monostable circuit 28a. Thus, the armature current reduces. Repetition of such a cycle constitutes a chopper circuit wherein the exciting current is maintained at a predetermined level regulated by the reference voltage of the reference voltage terminal 41.

A section indicated by the curve 27a of FIG. 17 is a section being chopper controlled. It is also possible to realize a constant speed control by a conventional means which controls the reference voltage of the reference voltage terminal 41 in accordance with a voltage being proportional to the rotational speed.

During the above-described chopper operation, the capacitor 41c is repeatedly charged in response to output pulses from the monostable circuit 28a so as to increase its charge voltage and store electrostatic energy. When the transistor 20a turns off at the terminal end of a position detecting signal, all the magnetic energy stored in the armature coil 32a is charged in the capacitor 41c. Another electrostatic energy, corresponding to chopper frequency and current attenuation amount, is further added to the capacitor 41c. This large amount of electrostatic energy can compensate energy loss, i.e. previously described copper loss of armature coils and iron loss of magnetic poles in a building-up of armature current when the armature coil 32c is next activated.

Accordingly, the exciting current builds up as shown by a dotted line 27c of FIG. 17, whose building-up is so steep that its waveform becomes substantially rectangle. Therefore, an output torque can be increased. Capacitance of the capacitor 41c, frequency of chopper current, and output pulse width of the monostable circuit 28a need to be adjusted so as to realize the above-described function and effect.

AND circuits 24b, 24c, 24d and transistors 20b, 20c, 20d also perform chopper control of armature currents to be supplied to the armature coils 32b, 32c, 32d.

Current supply to each armature coil can be initiated from any timing within an approximately 45-degree section after the salient poles come to confront with the magnetic poles. An adjustment is carried out by taking account of rotational speed, efficiency, and output torque to change the fixing positions of the detecting coils 10a and 10b being fixed on the armature side for serving as position detecting elements. As is apparent from the foregoing description, it becomes possible to drive a motor at a high speed with good efficiency and large output. Thus, the purpose of the present invention can be accomplished.

Curves 26a, 26b and 26c shown in FIG. 17 cooperatively represent a current supply curve for the armature coil. A gap between a dotted line 26-1 and a dotted line 26-2 represents a 90-degree width of the position detecting signal. Curves 9-1, 9-2 and 9-3 show output torque curves. The curve 9-1 represents a case where a current supplied to the armature coil is small. Its torque becomes relatively flat. However, as shown by the curves 9-2, 9-3, a peak value of the torque tends to shift toward a left side as the current value increases, and also a width of the peak value becomes narrow.

In view of the above-described torque characteristics and supplied current value, it is preferable to set an initiation timing of the current supply operation at a point of approximately 30 degrees after the salient poles begin confronting with the magnetic poles by adjusting the fixing points of the position detecting coils 10a, 10b.

Charging voltage of the capacitor 41c increases with reduction of its capacitance. Therefore, with the small-capacitance capacitor 41c, the exciting current of the armature coil can be built up sharply and reduced steeply. The motor can thus operate at a high-speed region and the disadvantage of the conventional reluctance type motor can be eliminated. It is preferable to select the capacitance of the capacitor not to damage transistors in the circuit.

Two capacitors 41c, 41d of the present embodiment can be replaced by one capacitor, which will be discharged through diodes 21a, 21b.

The chopper circuit can also be constituted by omitting the AND circuits 24a, 24b, of FIG. 15 and providing a switching element shown by a dotted line 16 so as to control a base terminal 16a of the switching element by an output of the inversion circuit 28b.

Next, an embodiment of FIG. 16 will be explained. Although the capacitors 41c, 41d of FIG. 15 are connected in parallel with armature coils, only a capacitor 47a is connected in parallel with the transistors 20a, 20c in FIG. 16 so as to obtain the similar function and effect. The components denoted by the same reference numerals as the components of FIG. 15 have the same function and effect and will no more be explained in detail.

When the armature coils 32a, 32c are deactivated, magnetic energy stored in these armature coils 32a, 32c is transferred into a capacitor 47a via diodes 21a, 21b, 21c and 21d, so as to charge the capacitor 47a to a high voltage with polarities shown in the drawing. Accordingly, the armature current decreases steeply.

When either the transistor 20a or the transistor 20c is activated in response to the position detecting signals supplied to the terminals 42a, 42c (i.e. curves 37a, 37b,— and curves 39a, 39b,— of FIG. 19), high voltage of the capacitor 47a is applied to either of the armature coils 32a, 32c so as to build up the armature current sharply.

A block circuit P is a current supply control circuit for the armature coils 32b, 32d, which is similar to the current supply control circuit for the armature coils 32a, 32c. As explained in the foregoing description, the purpose of the present invention can be accomplished.

Figure 14:
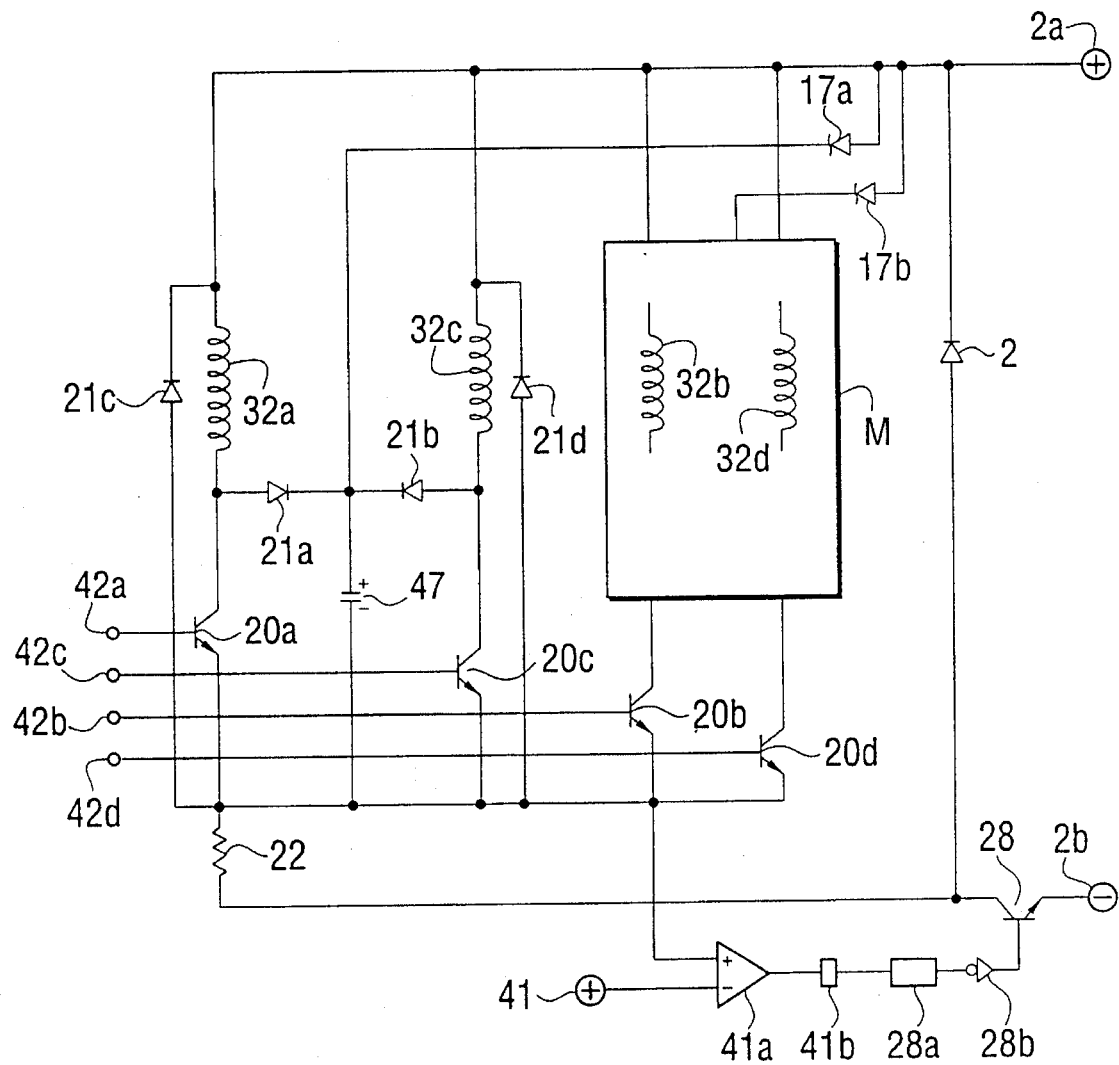
FIG. 14 is a circuit diagram showing a current supply control circuit for activating/deactivating armature coils in accordance with the present invention.

Next, an embodiment shown in FIG. 14 will be explained. In FIG. 14, the terminals 42a, 42b, — receive position detecting signals of curves 37a, 37b,—, curves 38a, 38b,— curves 39a, 39b,—, curves 40a, 40b,— of FIG. 19.

In response to the position detecting signals, the transistors 20a, 20b, are turned on to activate the armature coils 32a, 32b,—.

When the signal curve 37a is inputted into the terminal 42a, armature current of the armature coil 32a increases as shown by a curve 25a of FIG. 17. As the reluctance type motor has a large inductance as previously described, armature current builds up slowly as shown by the curve 25a.

When the armature coil 32a is deactivated at the terminal end of the curve 37a (i.e. point K), magnetic energy stored in the armature coil 32a is discharged through the diodes 21a, 21c and the capacitor 47.

The capacitor 47 is connected through a Zener diode 17a between positive and negative terminals of the electric power source, and is charged by the voltage thereof. Previously described discharge of magnetic energy is substantially the same as the conventional means in which magnetic energy is returned to the electric power source. Accordingly, a building-up width of the curve 25a of FIG. 17 becomes equal to a trailing-edge width thereof. Therefore, the capacitor 47 should have a small capacitance so that its voltage increases too much by the discharge of the magnetic energy. As both of the building-up and trailing-edge widths of the curve 25a of FIG. 17 become 90 degrees, only positive torque will be generated in both cases. Accordingly, it becomes necessary to adjust the position of the position detecting elements (i.e. coils 10a, 10b) with respect to the position of armature coils so that current supply to the armature coils begins at a point where the salient poles 1a, 1b just enter the magnetic poles.

In response to the position detecting signals of the curves 39a, 39b,— supplied from the terminal 42c, the transistor 20c turns on and activates the armature coil 32c. By the same reason as described above, both building-up and trailing-edge widths become 90 degrees. The diodes 21b, 21d and the capacitor 47 have the similar effects.

The capacitor 47 is charged every time the current supply control is switched between the armature coils 32a and 32c.

When a voltage increases by a predetermined amount, electrostatic energy stored in the capacitor 47 is discharged to the electric power source side through the Zener diode 17a so as to suppress energy loss and increase of voltage.

Current supply to the armature coils 32b, 32d is carried out by a block circuit M in the same manner.

The terminals 42b, 42d receive electric signals of curves 38a, 38b,— and curves 40a, 40b,— of FIG. 19 to control the transistors 20b and 20d. A Zener diode 17b has the same function as the Zener diode 17a.

Figure 18:
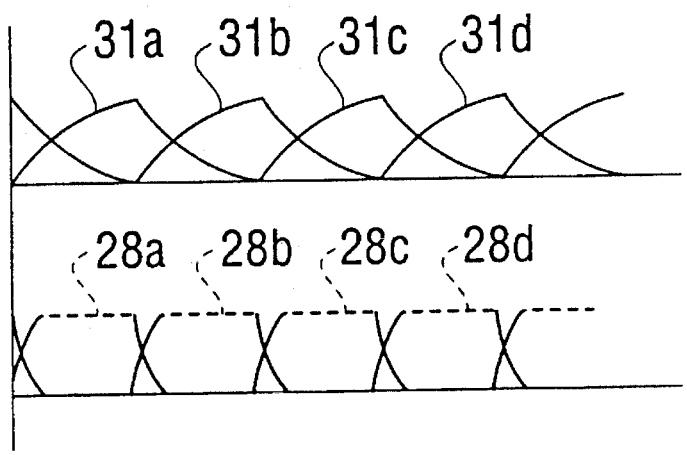
FIG. 18 is a time chart showing armature current of armature coils shown in FIGS. 14 and 15.

Curves 31a, 31b, 31c and 31d of FIG. 18 show current supply curves to be supplied to the armature coils 32a, 32b, 32c and 32d of FIG. 14, respectively. Curves 28a, 28b, 28c and 28d show current supply curves to be supplied to the armature coils 32a, 32b, 32c, and 32d of the embodiments shown in FIGS. 15 and 16, respectively.

The difference between these two kinds of current supply curves will be explained next.

In FIG. 14, peak points of current supply curves shift left as the speed increases. Accordingly, peak values reduce and the output torque decreases. If an applied voltage is increased, the armature current curve builds up sharply and the output torque increases correspondingly. Such characteristics is similar to that of the conventional DC motor, and will provide an effective technique.

When the rotor rotates 180 degrees, magnetic energy is transferred once between the magnetic poles and the salient poles. Therefore, iron loss will be identical with that of half-wave current supply mode of sine wave. This iron loss is small, compared with that of later-described current supply mode of rectangular wave. Thus, efficiency will increase.

Figure 16:
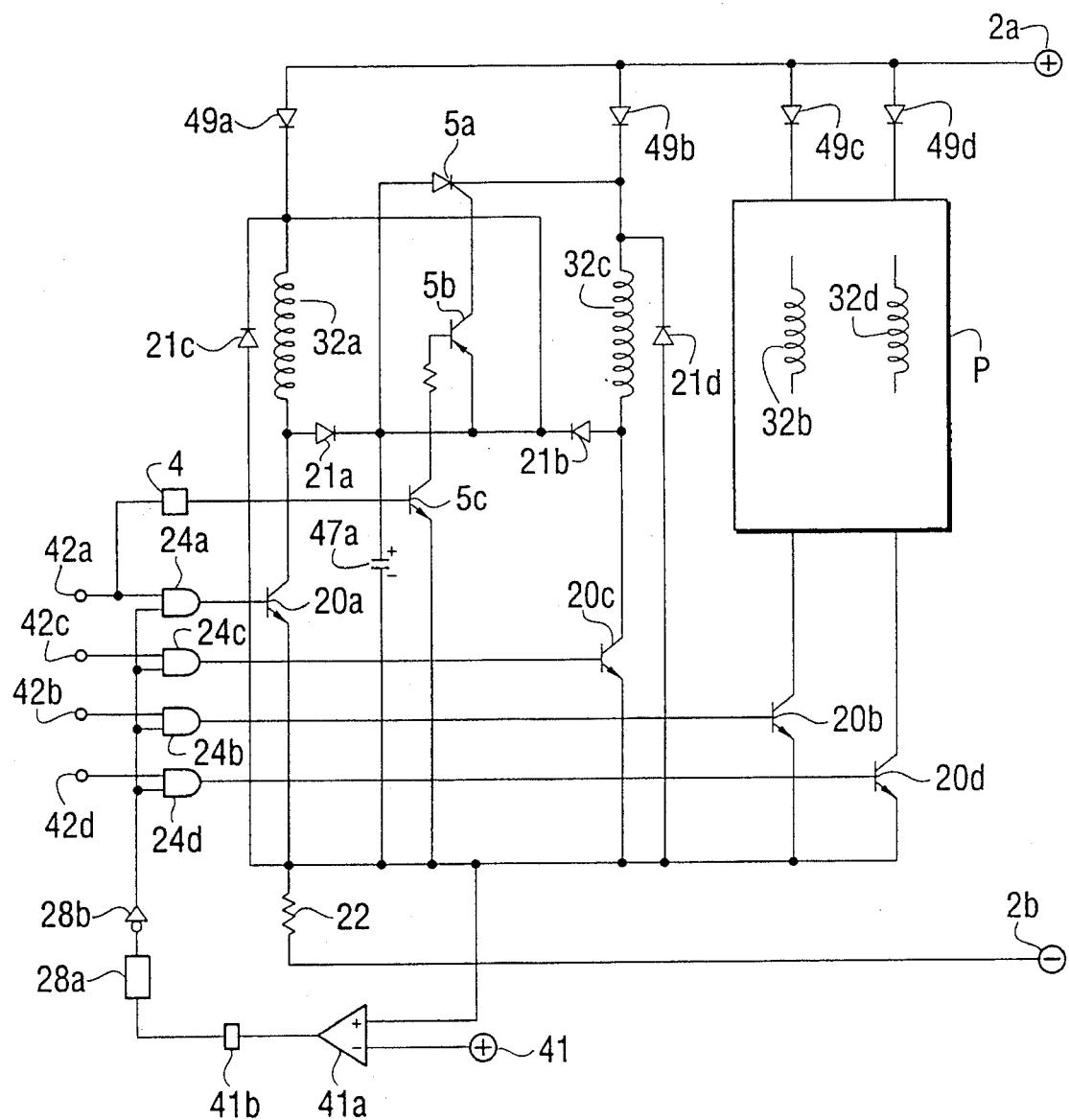
FIG. 16 is a circuit diagram showing still another current supply control circuit for activating/deactivating armature coils in accordance with the present invention.

As peak values of the curves 28a, 28b,— are not changed even if speed increases in the embodiments of FIGS. 15 and 16, high-speed rotation will be easy and an output torque can be freely controlled.

Furthermore, above-described characteristics is not changed as long as the applied voltage is larger than a predetermined value.

As an output torque generating section is substantially 90 degrees, the output torque and the efficiency can be increased by adjusting this section to be a section capable of obtaining maximum torque. As building-up and trailing-edge of the current supply curve are both steep, iron loss will increase, compared with the embodiment of FIG. 14.

In case of the embodiment of FIG. 14, current of armature coil will remarkably increase when the motor starts or rotates at low speed under excessive load. This results in burnout of the coil. A countermeasure for preventing this problem will be explained below.

In FIG. 14, if a voltage drop at the resistor 22 exceeds a voltage at the positive terminal 41, an output of the operational amplifier 41a turns to HIGH-level. The monostable circuit 28a generates an electric signal of a predetermined width in response to an electric pulse of the differential circuit 41b. An output of the inversion circuit 28b is correspondingly changed to LOW-level. And, the transistor 28 is turned off.

As the armature coil is deactivated and its magnetic energy is discharged through a diode 2, armature current decreases. As the output of the inversion circuit 28b returns to HIGH-level after a predetermined time has passed, the transistor 28 is turned on and armature current increases. Repeating such a cycle constitutes the chopper circuit. Accordingly, in order to prevent burnout, a voltage of the terminal 41 is suppressed below a predetermined value so that a voltage drop at the resistor 22 is smaller than a voltage drop caused by a burnout current.

Figure 20:
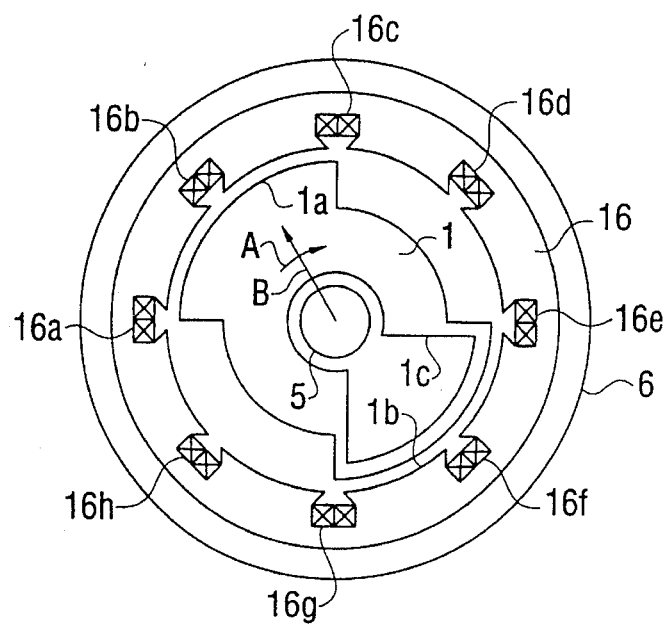
FIG. 20 is a plan view showing a two-phase full-wave reluctance type motor in accordance with the present invention.

Next, another constitution of a two-phase full-wave reluctance type motor embodying the present invention will be explained. FIG. 20 is a plan view showing a fixed armature and a rotor.

In FIG. 20, reference numeral 1 represents a rotor which is equipped with a plurality of salient poles 1a, 1b, — having the same width of 180 degrees (i.e. 90 degrees in terms of mechanical angle) and spaced one another at regular phase intervals of 360 degrees.

The rotor 1 is made of well-known laminated silicon steel sheets, and has a rotational shaft 5. A fixed armature 16 is provided with 8 slots 16a, 16b, —, being spaced one another at regular intervals. A reference numeral 6 represents a cylinder serving as an outer casing.

The slots 16a, 16c and 16e, 16g are respectively wound by one coil. Two coils are connected in series or parallel to constitute a No. 1-phase armature coil. This embodiment connects these two coils in series.

The slots 16b, 16d and 16f, 16h are respectively wound by one coil. These two coils are connected in series to constitute a No. 2-phase armature coil. And, the slots 16c, 16e and 16g, 16a are respectively wound by one coil. These two coils are connected in series to constitute a No. 3-phase armature coil. Slots 16d, 16f and 16h, 16b are respectively wound by one coil. These two coils are connected in series to constitute a No. 4-phase armature coil.

A two-phase motor is generally constituted by No. 1-and No. 2-phase armature coils. As each phase is constituted by the bifilar winding, it is possible to consider that the No. 1-phase is constituted by a set of two armature coils and the No. 2-phase is also constituted by a set of two armature coils. These armature coils should be referred to as No. 1-, No. 3- and No. 2-, No. 4-phase armature coils. An order of current supply will be No. 1-phase—No. 2-phase—No. 3-phase—No. 4-phase. Repeating this cyclic current supply results in generation of an output torque.

An arrow A denotes a rotational direction of the rotor 1. Salient poles 1a, 1b have an angular width of 90 degrees in terms of mechanical angle, and are spaced with each other at the same interval.

Figure 21:
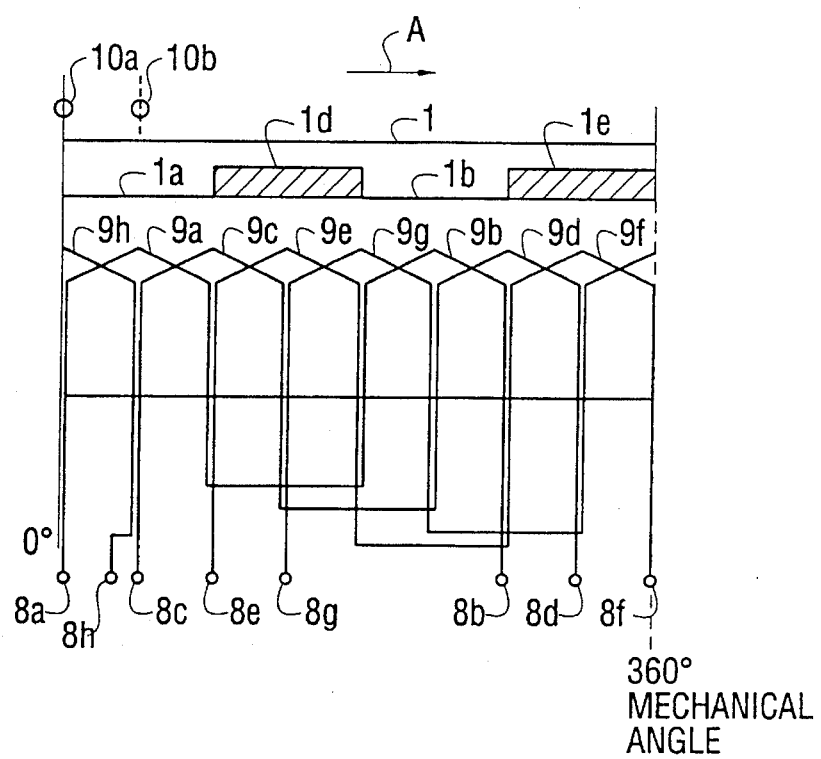
FIG. 21 is a development showing a fixed armature and a rotor of the motor of FIG. 20.

FIG. 21 is a development showing the rotor 1 and the armature coils. In FIG. 21, armature coils 9a, 9b serve as the No. 1-phase armature coil that has previously described. Armature coils 9c, 9d, armature coils 9e, 9f, and armature coils 9g, 9h serve as the No. 2-, No. 3 and No. 4-phase armature coils that have previously described.

Reference numerals 8a, 8b, 8c, 8d, 8e, 8f and 8g, 8h represent extracted terminals for the No. 1-, No. 2-, No. 3-and No. 4-phase armature coils.

The fixed armature 16 is made of well-known laminated silicon steel sheets as well as the rotor 1.

Portions shaded by dotted lines 1e, 1d are filled with plastic material in order to reduce frictional loss of air in a high-speed rotational region.

Hereinafter, No. 1-, No. 2-, No. 3- and No. 4-phase armature coils are referred to as armature coils 32a, 32b, 32c and 32d, respectively.

When the armature coil 32c is activated, the salient poles 1a, 1b are magnetically attracted and the rotor 1 rotates in a direction A. When the rotor 1 rotates 90 degrees, the armature coil 32c is deactivated and the armature coil 32d is activated. When the rotor 1 further rotates 90 degrees, the armature coil 32d is deactivated and the armature coil 32a is activated.

A current supply mode is cyclically alternated every 90-degree rotation in the order of; the armature coil 32a -the armature coil 32b-the armature coil 32c-the armature coil 32d. Therefore, the motor can be driven as a two-phase full-wave motor.

In this case, symmetrically disposed magnetic poles are magnetized to N-poles and S-poles as shown in the drawing. Since two magnetic poles excited simultaneously are always magnetized to have opposite polarities each other, leaking magnetic fluxes passing through non-excited magnetic poles become opposite each other in direction. Therefore, counter torque is prevented from being generated.

Coils 10a and 10b are position detecting elements for detecting positions of the salient poles 1a and 1b, and are fixed on the armature 16 as shown in the drawings. Their coil surfaces face to side surfaces of the salient poles 1a, 1b over an air gap. The coils 10a and 10b are spaced each other by an amount of 90 degrees. The coil is of a 100-turn air-core having a diameter of 5 mm.

Figure 22:
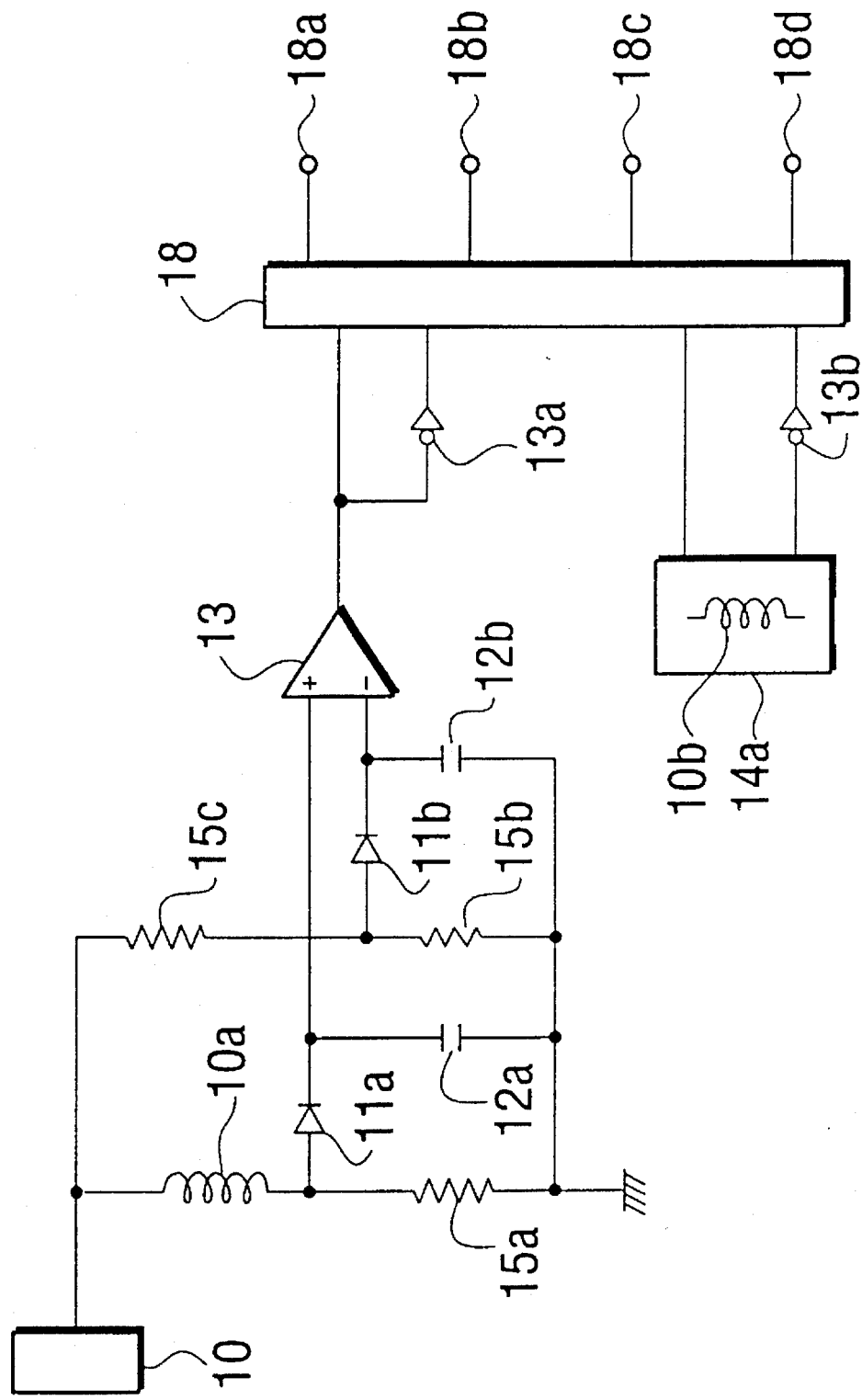
FIG. 22 is a circuit diagram showing a position detecting device.

FIG. 22 shows a device for obtaining position detecting signals from the coils 10a and 10b. In FIG. 22, the coil 10a and resistances 15a, 15b and 15c constitute a bridge circuit. This bridge circuit is adjusted to balance when the coil 10a does not directly confront with the salient poles 1a, 1b. Accordingly, an output of a low-pass filter consisting of a diode 11a and a capacitor 12a and an output of a low-pass filter consisting of a diode 11b and a capacitor 12b are equal to each other and, therefore, an output of the operational amplifier 13 becomes a LOW-level.

An oscillator 10 causes approximately 1 MHz oscillations. When the coil 10a directly confront with the salient poles 1a, 1b, —, an impedance is reduced due to iron loss (i.e. eddy loss and hysteresis loss). Therefore, a voltage drop in the resistance 15a becomes large and therefore the output of the operational amplifier 13 becomes a HIGH-level.

Inputs to the block circuit 18 are shown by curves 33a, 33b, —in a time chart of FIG. 19, and inputs curves 35a, 35b,—supplied through an inversion circuit 13a are identical with inverted curves of the curves 33a, 33b,—. The block circuit 14 in FIG. 22 has the same constitution as above-described block circuit including the coil 10b. The oscillator 10 can be utilized commonly among these block circuits.

An output of the block circuit 14 and an output of the inversion circuit 13b are inputted into the block circuit 18, and their output signals become curves 34a, 34b,— as shown in FIG. 19 and inverted curves 36a, 36b,— of the curves 34a, 34b.

The curves 34a, 34b,— are delayed 90 degrees in their phase with respect to the curves 33a, 33b, —. Curves 37a, 37b,— show the output of an AND circuit inputting two signals of the curves 33a, 33b,— and the curves 36a, 36b,— Curves 38a, 38b,— show the output of an AND circuit inputting two signals of the curves 33a, 33b,— and the curves 34a, 34b,— Curves 39a, 39b,— and curves 40a, 40b are obtained in the same manner.

The above-described circuit is shown as the block circuit 18. Outputs from terminal 18a, 18b,— are shown as signal curves 37a, 37b, —, that is, curves shown in the lower sections.

The same purpose will be accomplished by using an aluminum plate having the same configuration instead of the rotor 1 of FIG. 20 confronting with the coils 10a, 10b.

Next, current supply control to the armature coils will be explained with reference to FIG. 23. Lower ends of the armature coils 32a, 32b, 32c and 32d are connected with transistors 20a, 20b, 20c and 20d. The transistors 20a, 20b, 20c and 20d serve as semiconductor switching elements and can be substituted by other semiconductor elements having the same effect. A DC electric power source supplies electric power from its positive and negative terminals 2a, 2b.

This embodiment is characterized by a simplified circuit configuration in which only one transistor (transistor 20a, 20b, 20c or 20d) is provided at a lower end of each armature coil, i.e. a negative terminal side of the DC electric power source.

Details of FIG. 23 will be explained below. Position detecting signals of curves 37a, 37b, —, curves 38a, 38b, —curves 39a, 39b,—, and curves 40a, 40b,— in FIG. 19 are inputted from terminals 42a, 42b, 42c and 42d. In response to these input signals fed through AND circuits 24a, 24b, 24c and 24d, transistors 20a, 20b, 20c and 20d are turned on to activate armature coils 32a, 32b, 32c and 32d.

A terminal 43 is supplied with a reference voltage for specifying an armature current. By changing a voltage at the terminal 43, an output torque can be changed. When an electric power switch (not shown) is turned on, an output of an operational amplifier 43a becomes a LOW-level since an input of a positive terminal of the operational amplifier 43a is lower than that of its negative terminal. As an input of an inversion circuit 28b is a LOW-level, an output of the inversion circuit 28b becomes a HIGH-level. Accordingly, the transistor 20a turns on to activate the armature coil 32a. A resistance 22a is provided for detecting armature current flowing the armature coils 32a, 32b, 32c and 32d.

Block circuits F, G, H represent electric circuits for controlling activation/deactivation of the armature coils 32b, 32c, and 32d, respectively, which are substantially equivalent with the electric circuit for the armature coil 32a. Diodes 49b, 49c and 49d correspond to the diode 49a.

Figure 25:
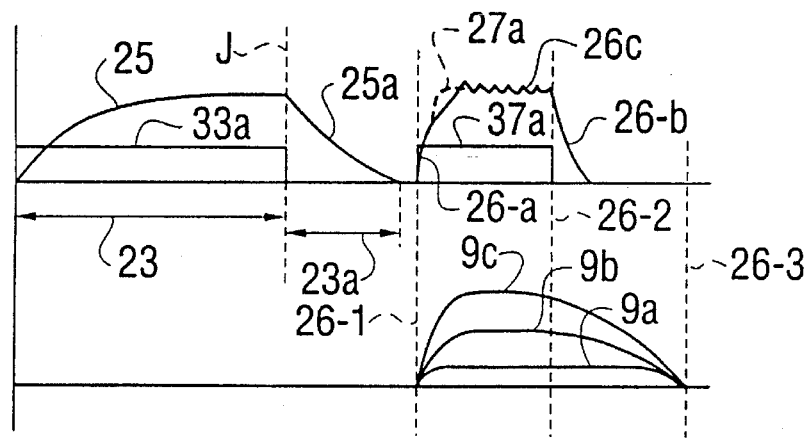
FIG. 25 is a time chart showing armature current.

One of the above-described position detecting signal curves of FIG. 19 is shown as a curve 33a in the upper section of the time chart of FIG. 25. The armature coil 32a is supplied with exciting current during a time period corresponding to this curve 33a in accordance with the conventional means. An arrow 23 of FIG. 25 shows a current supply angle of 180 degrees.

In an initial stage of the current supply period, building-up of the exciting current is delayed due to inductance of the armature coil. If the current is stopped, magnetic energy stored in the armature coil is discharged to the electric power source. Therefore, the armature current decreases as shown by a second half portion 25a of the curve 25; i.e. a right side of the dotted line J.

A positive torque generating section is a 180-degree section shown by an arrow 23; therefore counter torque is generated in a section of an arrow 23a to decrease both output torque and efficiency. This phenomenon becomes remarkable as the speed increases, making it impossible to be practically used in a high-speed region.

As the width of the curve 33a becomes small in proportion to all increase of the rotational speed, a building-up of the curve 25 is also delayed and then an output torque is decreased. That is, torque reduction is generated. This is because the magnetic poles and the salient poles interact with each other to close the magnetic path to have a large inductance.

Although the reluctance type motor has a disadvantage in that it cannot increase its rotational speed notwithstanding an advantage of large output torque, such a disadvantage derives from the above-described counter torque and torque reduction.

Figure 23:
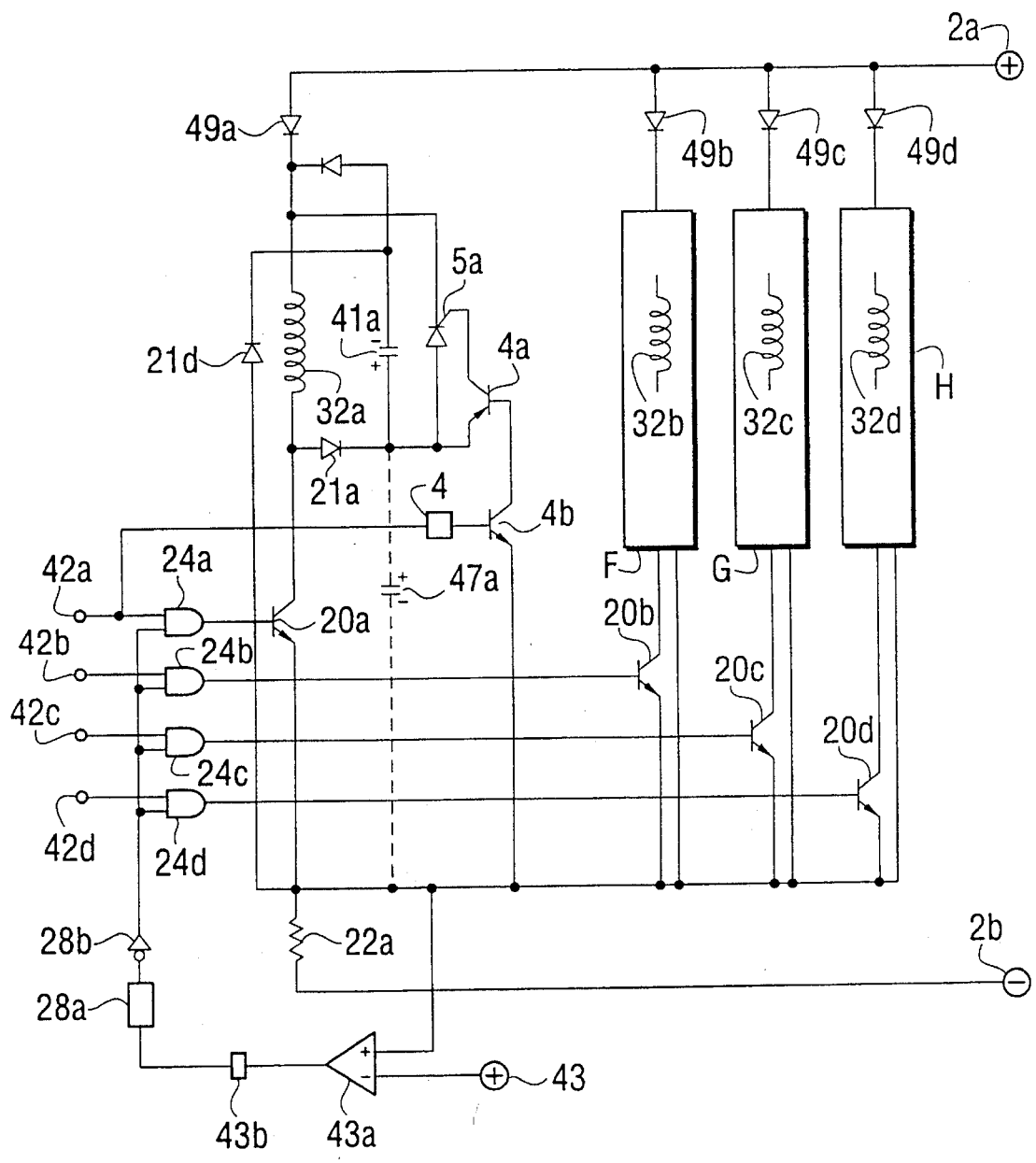
FIG. 23 is a circuit diagram showing a current supply control circuit for activating/deactivating armature coils in accordance with the present invention.

An apparatus in accordance with the present invention is characterized in that the above-mentioned disadvantages are eliminated by additionally providing back-flow preventing diodes 49a, 49b,— a small-capacitance capacitor 41a, diodes 21a, 21d, semiconductor elements 4a, 4b, 5a and others shown in FIG. 23, and further in that only one semiconductor switching element (20a, 20b, 20c and 20d) for controlling activation/deactivation of each armature coil is provided at a negative voltage side of the DC electric power source.

Position detecting signals inputted from the terminals 42a, 42b,— are shown as curves 37a, 37b, —, curves 38a, 38b,—, curves 39a, 39b,—, and curves 40a, 40b,— in FIG. 19. In this embodiment, position detecting signals has 90-degree width.

When current, is terminated at the terminal end of the signal curve 37a supplied from the terminal 42a, magnetic energy stored in the armature coil 32a is discharged through the diode 21a to the capacitor 41a so as to charge it up to a high voltage with polarities shown in the drawing. Accordingly, the magnetic energy is sharply extinguished and the current decreases steeply.

Curves 26a, 26c and 26b shown in the upper section of the time chart of FIG. 25 cooperatively represent a current curve flowing the armature coil 32a. Both dotted lines 26-1, 26-2 between which the current curve is put are spaced 90 degrees. The armature current decreases steeply like the curve 26b and therefore no counter torque is generated. The capacitor 41a is charged up to a high voltage and held at this voltage.

Next, in response to the position detecting signal curve 37b of FIG. 19 supplied from the terminal 42a, the transistor 20a is turned on to activate the armature coil 32a. A block circuit 4 is constituted by a monostable circuit activated by a differential pulse at an initial part of the curve 37b. In response to an electric pulse given at an initial part of an input to the terminal 42a, transistors 4a, 4b, SCR 5a are activated. Then, high voltage of the capacitor 41a is applied to the armature coil 32a to build up the armature current quickly. This building-up is shown as a curve 26a in FIG. 25. The above-described discharge current of the capacitor 41a is prevented from returning to the DC electric power source by means of the back-flow preventing diode 49a. The diode 21d serves as a component of a discharge circuit for the capacitor 41a.

A voltage equivalent to a summation of the charged voltage of the capacitor 41a and the DC electric power source voltage (a voltage between the terminals 2a, 2b) is applied to the armature coil 32a in this case. Therefore, an exciting current of the armature coil 32a builds up sharply.

By virtue of this function, the exciting current builds up abruptly as shown by the curve 26a of FIG. 25. The building-up portion of the current 26a becomes slow or moderate at its intermediate portion, because the magnetic energy is transformed into thermal energy due to copper loss of coils and iron loss of magnetic cores when the magnetic energy is transferred between armature coils. A countermeasure for eliminating such a disadvantage will be discussed later. As is explained above, the torque reduction and the counter torque are removed. And, as the exciting current becomes substantially the rectangular waveform, an output torque is increased.

Block circuits F, G, and H are current supply control circuits for the armature coils 32b, 32c and 32d, which are similar to the current supply control circuit for the armature coil 32a.

Armature coils 32b, 32c and 32d are activated or deactivated in response to signal curves 38a, 38b,—, 39a, 39b,— and curves 40a, 40b,— of FIG. 19 which serve as the position detecting signals supplied from the terminals 42b, 42c and 42d.

Next, a chopper circuit will be explained. When the armature current of the armature coil 32a increases and therefore the voltage drop in the resistor 22a, which detects armature current value, increases to exceed the reference voltage of the reference voltage terminal 43 (i.e. an input voltage of the negative terminal of the operational amplifier 43a), an output of the operational amplifier 43a turns to a HIGH-level. Accordingly, the differential circuit 43b generates a differential pulse to activate the monostable circuit 28a, whose output becomes an electric pulse having a predetermined width. As this output electric pulse is converted into a LOW-level electric pulse by the inversion circuit 28b, an output of the AND circuit 24a becomes a LOW-level signal having the same width, during which the transistor 20a is deactivated.

Accordingly a current flowing the armature coil reduces, and then this current flows through the diode 21a into the capacitor 41a to charge it up. When the output of the monostable circuit 28a extinguishes, outputs of the inversion circuit 28b and the AND circuit 24a return to a HIGH-level. Therefore, the transistor 20a turns on to increase the exciting current of the armature coil 32a.

When the armature current exceeds a predetermined value, an output of the operational amplifier 43a turns again to a HIGH-level. The transistor 20a turns off during a predetermined period of time corresponding to the output pulse width of the monostable circuit 28a. Thus, the armature current reduces. Repetition of such a cycle constitutes a chopper circuit wherein the exciting current is maintained at a predetermined level regulated by the reference voltage of the reference voltage terminal 43.

A section indicated by the curve 26c of FIG. 25 is a section being chopper controlled. It is also possible to realize a constant speed control by means of a conventional means which controls the reference voltage of the reference voltage terminal 43 by a voltage varying in proportion to the rotational speed.

During the above-described chopper operation, the capacitor 41a is repeatedly charged in response to output pulses from the monostable circuit 28a so as to increase its charge voltage and store electrostatic energy. When the transistor 20a turns off at the terminal end of a position detecting signal, all the magnetic energy stored in the armature coil 32a is charged in the capacitor 41a. Another electrostatic energy, corresponding to chopper frequency and current attenuation amount, is further added to the capacitor 41a. This large amount of electrostatic energy can compensate energy loss, i.e. previously described copper loss of armature coils and iron loss of magnetic poles in a building-up of armature current when the armature coil 32a is next activated. Accordingly, the exciting current builds up as shown by a dotted line 27a of FIG. 25, whose building-up is so steep that its waveform becomes substantially rectangle. Therefore, an output torque can be increased. Capacitance of the capacitor 41a, frequency of chopper current, and output pulse width of the monostable circuit 28a need to be adjusted so as to bring above-described function and effect.

AND circuits 24b, 24c, 24d and transistors 20b, 20c, 20d also perform chopper control of armature currents to be supplied to the armature coils 32b, 32c, 32d.

Current supply to each armature coil can be initiated from any timing within an approximately 45-degree section after the salient poles come to confront with the magnetic poles. An adjustment is carried out by taking account of rotational speed, efficiency, and output torque to change the fixing positions of the detecting coils 10a and 10b being fixed on the armature side for serving as position detecting elements. As is apparent from the foregoing description, it becomes possible to drive a motor at a high speed with good efficiency and large output. Thus, the purpose of the present invention can be accomplished.

Curves 27a, 26b and 26c shown in FIG. 25 cooperatively represent a current supply curve for the armature coil. A gap between a dotted line 26-1 and a dotted line 26-2 represents a 90-degree width of the position detecting signal. Curves 9a, 9b and 9c show output torque curves. The curve 9a represents a case where a current supplied to the armature coil is small. Its torque becomes relatively flat. However, as shown by the curves 9b, 9c, a peak value of the torque tends to shift toward a left side as the current value increases, and also a width of the peak value becomes narrow.

In view of the above-described torque characteristics and supplied current value, it is preferable to set an initiation timing of the current supply operation at a point of approximately 30 degrees after the salient poles begin confronting with the magnetic poles by adjusting the fixing points of the position detecting coils 10a, 10b.

Charging voltage of the capacitor 41a increases with reduction of its capacitance. Therefore, with the small-capacitance capacitor 41a, the exciting current of the armature coil can be built up sharply and reduced steeply. The motor can thus operate at a high-speed region and the disadvantage of the conventional reluctance type motor can be eliminated. It is preferable to select the capacitance of the capacitor which would damage transistors in the circuit. The same purpose will be accomplished by providing a capacitor 47a instead of the capacitor 41a. In this case, an output terminal side of the diode 21d is connected to the upper terminal of the armature coil 32a.

Figure 24:
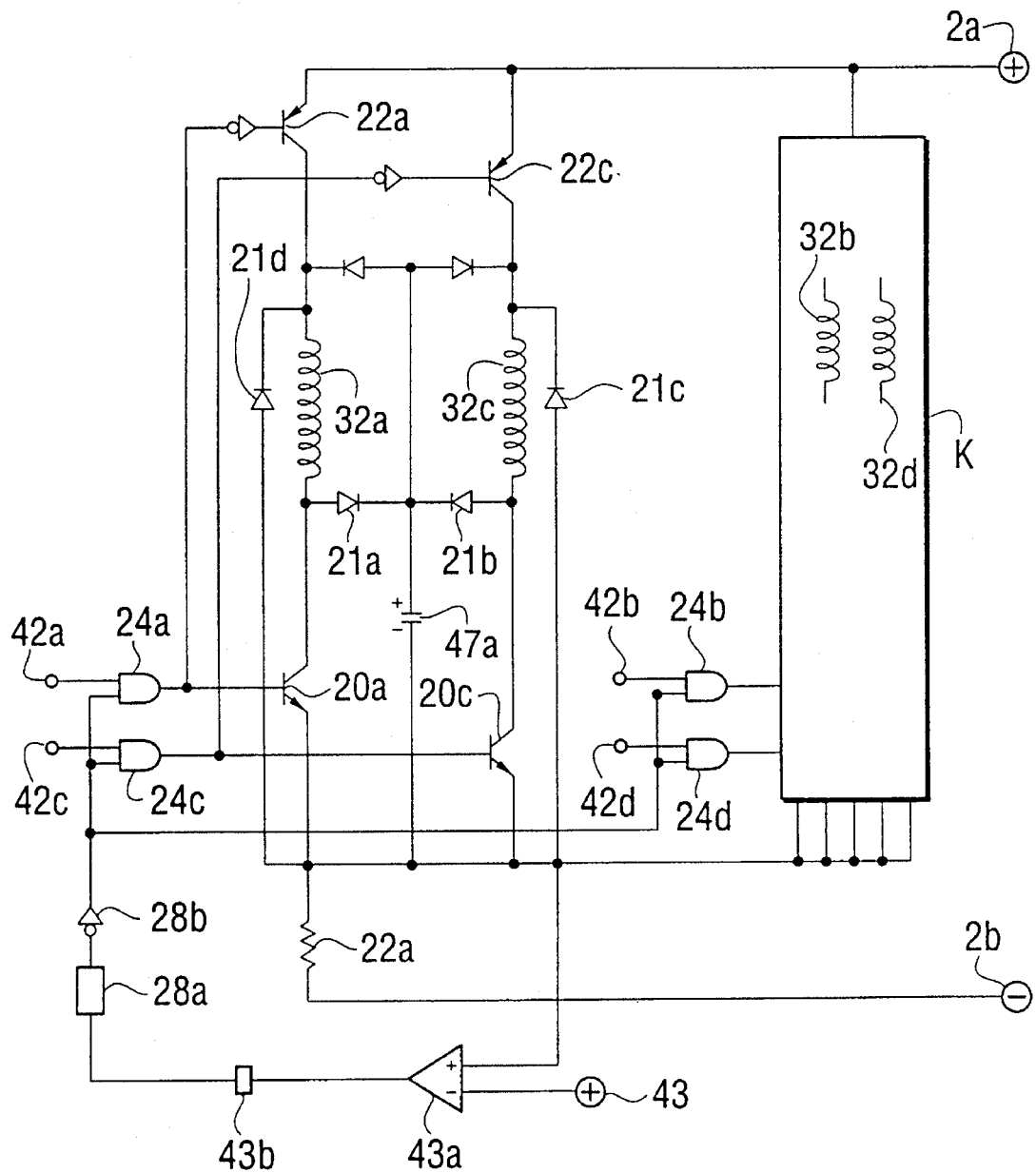
FIG. 24 is a circuit diagram showing another current supply control circuit for activating/deactivating armature coils in accordance with the present invention.

Next, FIG. 24 will be explained. Both ends of the armature coils 32a, 32c are connected to transistors 20a, 22a and transistors 20c, 22c, respectively.

When the armature coils 32a, 32c are deactivated, magnetic energy stored in these armature coils 32a, 32c is transferred into a capacitor 47a via diodes 21a, 21b, 21c and 21d, so as to charge the capacitor 47a to a high voltage with polarities shown in the drawing. Accordingly, the armature current decreases steeply.

When any one of the transistors 20a, 22a or the transistors 20c, 22c are activated in response to the position detecting signals supplied to the terminals 42a, 42c (i.e. curves 37a, 37b,— and curves 39a, 39b,— of FIG. 19), high voltage of the capacitor 47a is applied to either of the armature coils 32a, 32c so as to build up the armature current sharply.

A block circuit K is a current supply control circuit for the armature coils 32b, 32d, which is similar to the current supply control circuit for the armature coils 32a, 32c. As explained in the foregoing description, the purpose of the present invention can be accomplished.

The AND circuits 24a, 24b,—, 24d, the resistance 22a, and components shown by reference numerals 43, 43a, 43b, 28a, 28b have the same functions and effects as those suffixed by the same reference numerals in FIG. 23.

The present invention will be embodied by means of FIG. 23 instead of the transistors 22a, 22c.

Although the above-described embodiment is based on a two-phase full-wave current supply mode motor, the present invention can be embodied even in a three-phase half-wave current mode motor. In such a case, 12 slots will be provided on the armature 16, while the same type of rotor 1 is used.

Next, details of the rotor 1 will be explained with reference to FIG. 20. When the rotor 1 rotates, salient-poles 1a, 1b are magnetically attracted toward a rotational center (i.e. a central axis of the rotational shaft 5), that is, in a direction of an arrow B, by magnetic poles magnetized by activated armature coils. The attraction forces of the salient-poles 1a and 1b are different each other for the following reasons, causing vibration during rotation: air gap between the rotational shaft 5 and the bearing generates vibration. Furthermore, if air gap length between the outer peripheral surface of the salient-poles 1a, 1b and the inner peripheral surface of the armature 16 is changed, vibration will be generated in the same manner.

The present embodiment removes the above-described vibrations by providing the following constitution: an air gap length between the outer peripheral surface of the salient-pole 1a and the inner peripheral surface of the armature 16 is set smaller than an air gap length between the outer peripheral surface of the salient-pole 1b and the inner peripheral surface of the armature 16. For this end, a central axis of an outer peripheral surface of the armature coil 16 coincide with a rotational center of the rotational shaft 5. And, a distance between the outer peripheral surface of the salient-pole 1a and the rotational center of the rotational shaft 5 is set larger that a distance between the outer peripheral surface of the salient-pole 1b and the rotational center of the rotational shaft 5.

With these arrangement, a magnetic attraction force comes to act on the rotor 1 in a direction of an arrow B. As the vector B of magnetic attraction force rotates in synchronization with the salient-pole 1a, vibration can be suppressed.

The rotor 1, having the constitution above-described, causes vibration during its rotation due to the difference of centrifugal forces between at the salient-pole 1a side and the salient-pole 1b side. In order to remove this vibration, a metallic plate 1c is fixed on the rotor 1 at the same side as the salient-pole 1b of the rotor 1 so as to serve as a balance weight. Thus, the vibration can be eliminated. Metallic plates 1a, 1a are provided at both sides of the rotor 1. The above described arrangement makes it possible to prevent vibration from causing even in a high speed condition.

Figure 27:
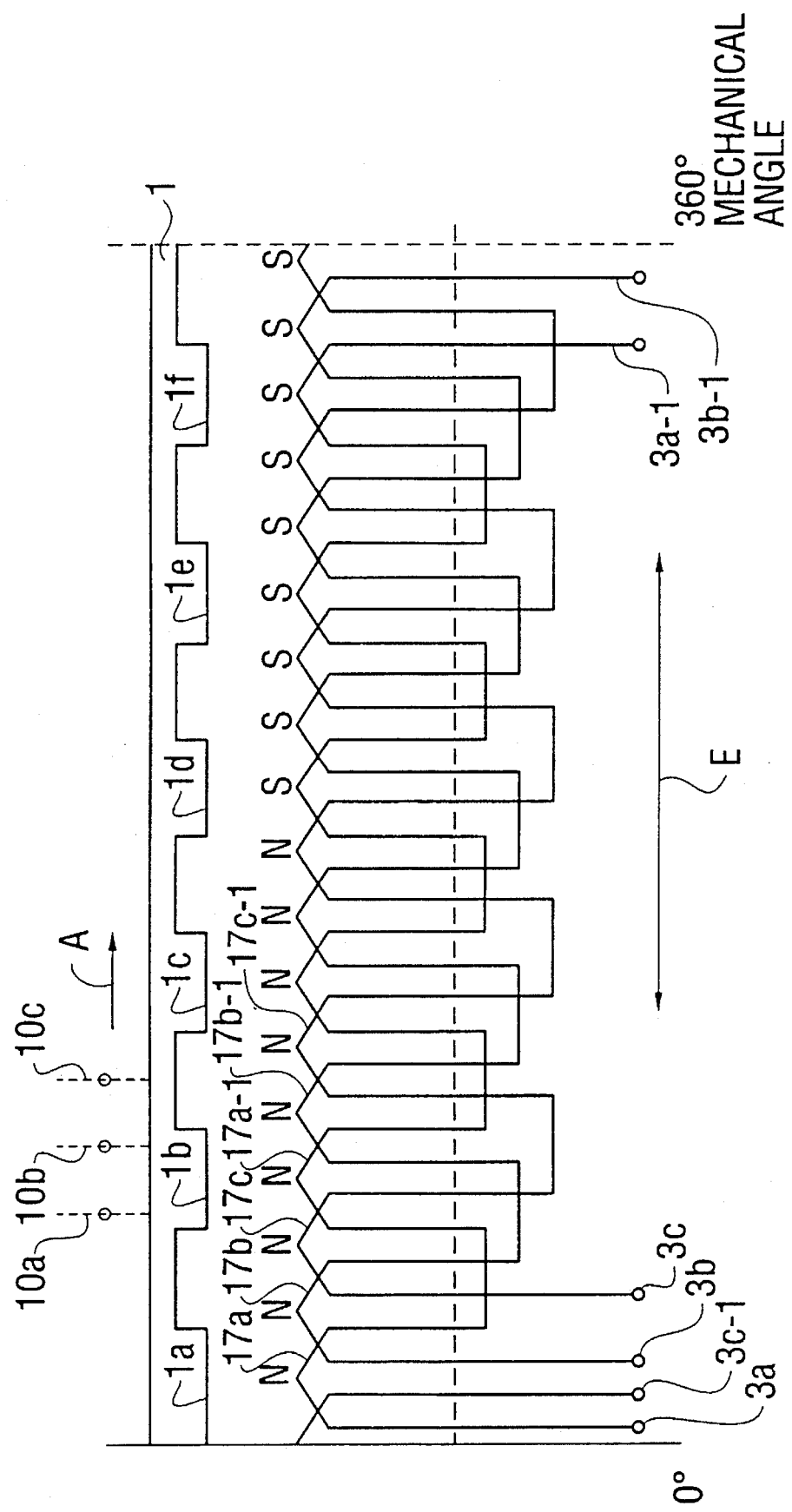
FIG. 27 is a development showing a fixed armature and a rotor of the present invention.

FIG. 27 is a development showing a fixed armature and a rotor in accordance with the present invention. In the following explanation, all the angles are expressed by electric angles.

In FIG. 27, a rotor 1 is rotatably supported on bearings provided on the side plates of the outer casing through a rotational shaft (not shown). A diameter of the rotor 1 is about 10 cm for a large-size motor.

The fixed armature is fixed inside the outer casing, only the armature coils 17a, 17b, 17c, 17a-1, 17b-1,— are shown in the drawing.

Figure 28:
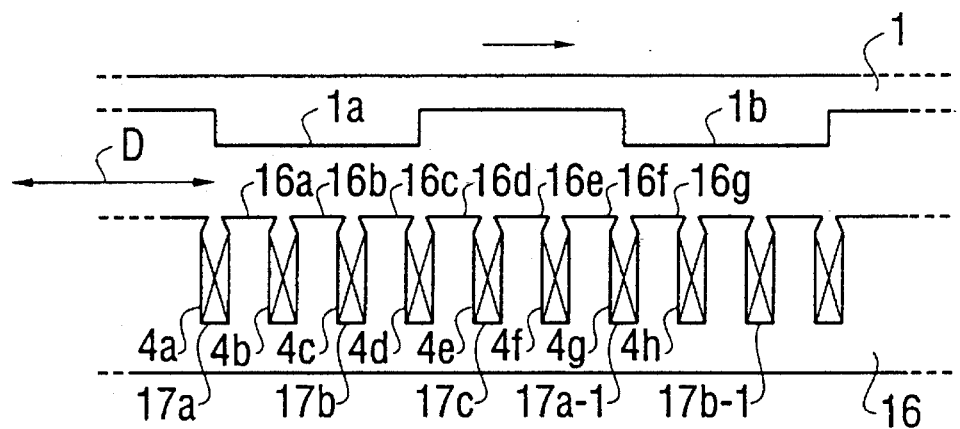
FIG. 28 is a partly enlarged view of FIG. 27.

Armature coils are installed in slots. FIG. 28 partly shows thence slots. FIG. 28 shows salient-poles 1a, 1b of the rotor 1 and magnetic-poles 16a, 16b,— of the fixed armature 16 confronting with the salient-poles 1a, 1b. Other salient-poles and magnetic-poles are identical in structure with those disclosed in FIG. 28.

The rotor 1 and the fixed armature 16 are made of well-known, laminated silicon steel sheets. Slots 4a, 4b,— are disposed along the whole inner surface thereof at regular intervals of 60 degrees. The slots 4a, 4d are associated with an armature coil 17a. The slots 4c, 4f and the slots 4e, 4h are associated with armature coils 17b, 17c, respectively. Other slots are also associated with armature coils shown in FIG. 27.

Figure 29:
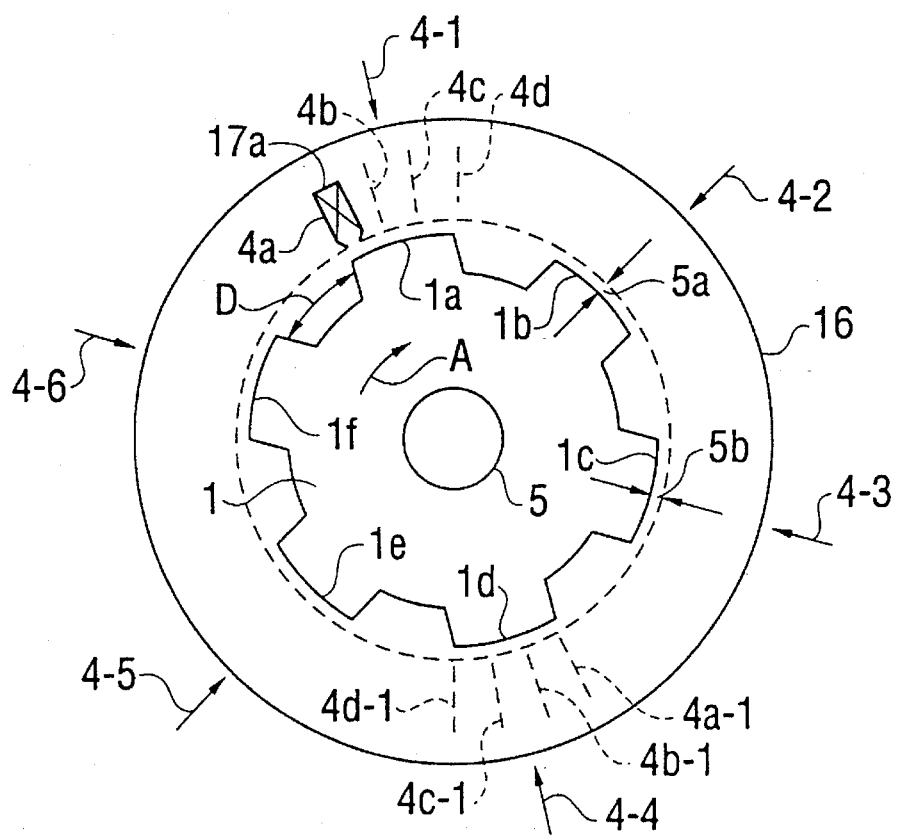
FIG. 29 is a plane view showing a fixed armature and a rotor of the present invention.

FIG. 29 is a plan view showing the rotor 1, salient-poles 1a, 1b,—, rotational shaft 5, slots 4a, 4b,—, and fixed armature 16. The armature coils 17a, 17a-1,— of FIG. 27 are connected in series with each other. Their terminals are generally denoted by reference numerals 3a, 3a-1. These armature coils can be connected in parallel. The above-described armature coils are referred to as a No. 1-phase armature coil. The armature coils 17b, 17b-1,— of FIG. 27 are also connected in series with each other so as to constitute a No. 2-phase armature coil. The armature coils 17c, 17c-1,— of FIG. 27 are also connected in series with each other so as to constitute a No. 3-phase armature coil. The No. 1-, No. 2-and No. 3-phase armature coils are installed in the slots which are offset one another by an amount of 120 degrees.

If the armature coil 17a is activated when the salient-pole 1a of FIG. 29 positions as shown by an arrow D, magnetic-poles 16a, 16b, 16c of FIG. 27 are all magnetized to N-polarity. Therefore, the salient pole 1a is magnetically attracted to cause a rotation in a direction of an arrow A. As the No. 1-phase armature coil is activated, all the salient-poles 1a, 1b,— generate torque in the direction of the arrow A.

When the rotor 1 rotates 120 degrees, the No. 1-phase armature coils are deactivated and the No. 2-phase armature coils (17b, 17b-1,—) are activated. Respective salient-poles generate torque in the direction of the arrow A. When the rotor 1 further rotates 120 degrees, the No. 2-phase armature coils are deactivated and the No. 3-phase armature coils (17c, 17c-1,—) are activated. Respective salient-poles generate torque in the direction of the arrow A. In the same way, the No.1-phase armature coils are activated when the rotor 1 still further rotates 120 degrees, and causes continuous rotation.

As described above, activating No. 1-, No. 2-, No. 3-, No. 1-, — phase armature coils successively with a 120-degree width will realize a three-phase half-wave current supply mode reluctance type motor which causes the rotor 1 to rotate in the direction of the arrow A. As output torque can be obtained from all the salient-poles 1a, 1b,—, it will bring a large output torque.

As can be understood from the above-described construction, a great number of the slots 4a, 4b,— are provided, so that, in the case of a motor having a smaller diameter, a winding space for each armature coil becomes too small to practically use the motor. The apparatus according to this embodiment is, therefore, effective for a motor having a large diameter.

It is well known in the field of reluctance type motors that an output torque increases in proportion to the square of current until the magnetic poses 16a, 16b, — are magnetically saturated and also its diameter provides an output in proportion to the current. Accordingly, if the present invention is applied to a large-sized motor with wide slot space capable of increasing ampere-turn, its output torque will be ten times as large as that of the similar type DC motor. The present invention will be realized if the salient poles are provided 3 or more in case of the embodiment of FIG. 27. Numbers of slots and magnetic poles will be 6n and also 6n, respectively, for n salient poles.

Figure 26:
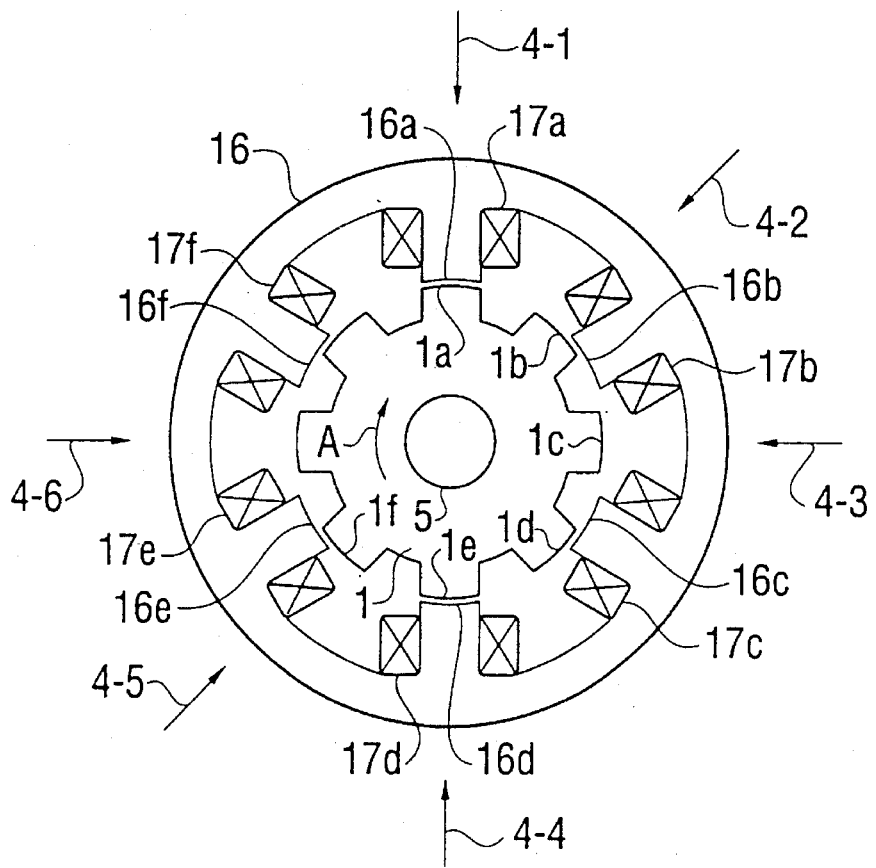
FIG. 26 is a plan view showing a fixed armature and a rotor of a conventional reluctance-type motor.

If compared with the conventional motor shown in FIG. 26, number of salient poles contributing the generation of output torque becomes three times. Accordingly, its output torque will become three times.

The conventional motor shown in FIG. 26 causes deformation because the fixed armature 16 receives magnetic attraction force by the salient poles 1a, 1e in the directions of arrows 4-1, 4—4. After rotation of 120 degrees, deformation is caused by the salient poles 1b, 1f in the directions of arrows 4-2, 4-5. After further rotation of 120 degrees, deformation is caused in the directions of arrows 4-3, 4-6. Hence, the direction of the deformation of the fixed armature 16 changes as the motor rotates and then vibration is generated. On the other hand, in the present invention, attraction forces shown by arrows 4-1, 4-2, 4-3,—in FIG. 29 generate simultaneously. The fixed armature 16, therefore, receives only a compression force acting along a circumferential direction and hence causes no deformation. Thus, vibration will be effectively suppressed.

In FIG. 29, the salient poles 1a, 1d receive magnetic attraction forces acting in the opposite directions of the arrows 4-1, 4—4, by the magnetic poles interposed between slots 4a, 4b, 4c, 4d, 4a-1, 4b-1, 4c-1, 4d-1 (shown by dotted lines). Other salient poles 1b, 1e and 1c, 1f also receive similar magnetic attraction forces.

Perfectly equalizing distances of air gap between respective salient poles and magnetic poles is impossible in technical point of view. The above-described magnetic attraction forces therefore cannot be canceled completely by symmetrically disposed salient poles. Accordingly, the rotor 1 generates vibration, during it rotation, due to radially residing attraction force. The bearing of the rotational shaft 5 may be damaged or cause vibration.

According to the present invention, the heights of the salient poles 1b, 1c positioned at one side are different from the height of other salient poles. Thus, the length of air gap (i.e. an air gap length shown by reference numerals 5a, 5b) becomes larger or smaller than the length of other salient poles. The rotor 1 accordingly does not cause the above-described problem since the rotational shaft 5 is always pressed against the bearing during rotation.

The number of windings of the armature coils located within a section E (a section of 180-degree mechanical angle) of FIG. 27 is increased or reduced, compared with those of the armature coils located within other sections.

With the above arrangement, magnetic attraction force between the magnetic poles and salient poles always acts in the same direction. The rotor 1 is, therefore, attracted in the same direction and no vibration will be generated.

N and S polarities of the magnetic poles magnetized by the armature coils are shown in FIG. 27. Next, current supply control means for the No. 1-, No. 2-, No. 3-phase armature coils will be explained. The No. 1-, No. 2-and No. 3-phase armature coils correspond to armature coils connected between the terminals 3a, 3a-1, armature coils connected between the terminals 3b, 3b-1, and armature coils connected between the terminals 3c, 3c-1, respectively. These No. 1-, No. 2- and No. 3-phase armature coils are referred to as armature coils 39a, 39b, and 39c, respectively.

Coils 10a, 10b, and 10c of FIG. 27 are position detecting elements for detecting positions of the salient poles 1a, 1b,— and are fixed on the armature 16 as shown in the drawings. Their coil surfaces face to side surfaces of the salient poles 1a, 1b over air gap. The coils 10a, 10b, and 10c are spaced one another by an amount of 120 degrees. The coil is of a 100-turn air-core having a diameter of 5 mm.

Figure 31:
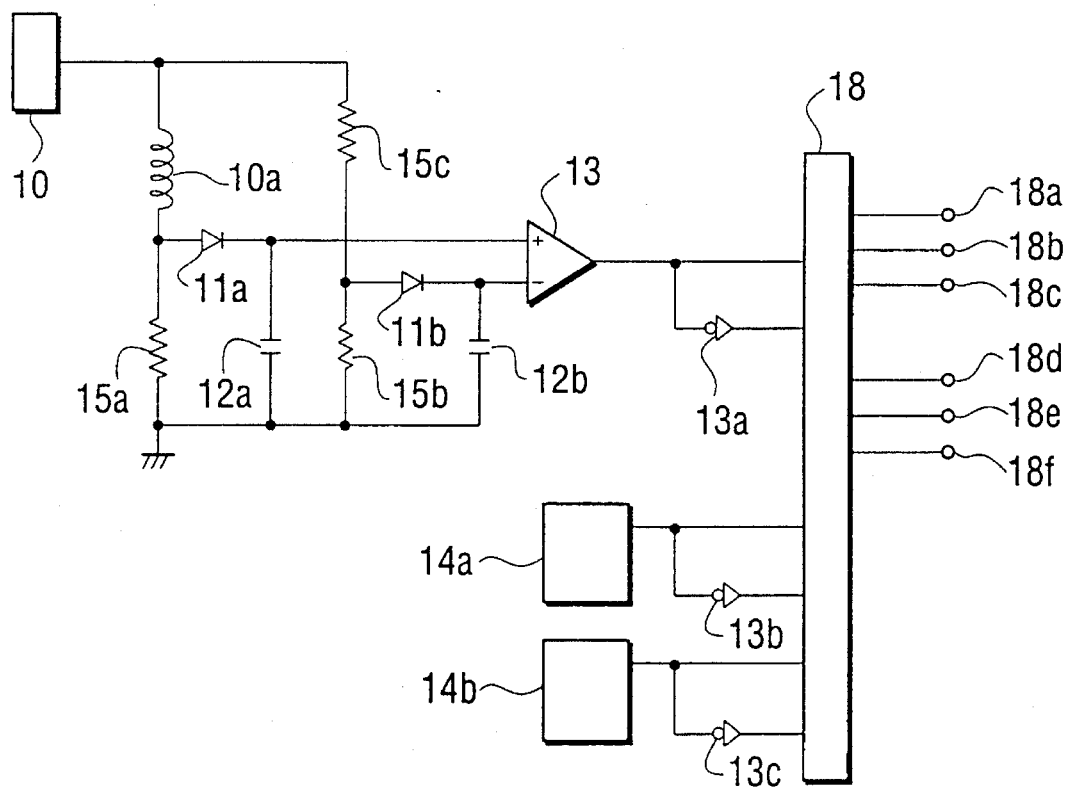
FIG. 31 is a circuit diagram showing a position detecting device.

FIG. 31 shows a device for obtaining position detecting signals from the coils 10a, 10b and 10c. In FIG. 31, the coil 10a and resistances 15a, 15b and 15c constitute a bridge circuit. This bridge circuit is adjusted to balance when the coil 10a does not directly confront with the salient poles 1a, 1b. Accordingly, an output of a low-pass filter consisting of a diode 11a and a capacitor 12a and an output of a low-pass filter consisting of a diode 11b and a capacitor 12b are equal to each other and, therefore, an output of the operational amplifier 13 becomes a LOW-level.

An oscillator 10 causes approximately 1 MHz oscillations. When the coil 10a directly confront with the salient poles 1a, 1b, —, an impedance is reduced due to iron loss (i.e. eddy loss and hysteresis loss). Therefore, a voltage drop in the resistance 15a becomes large and therefore the output of the operational amplifier 13 becomes a HIGH-level.

Figure 38:
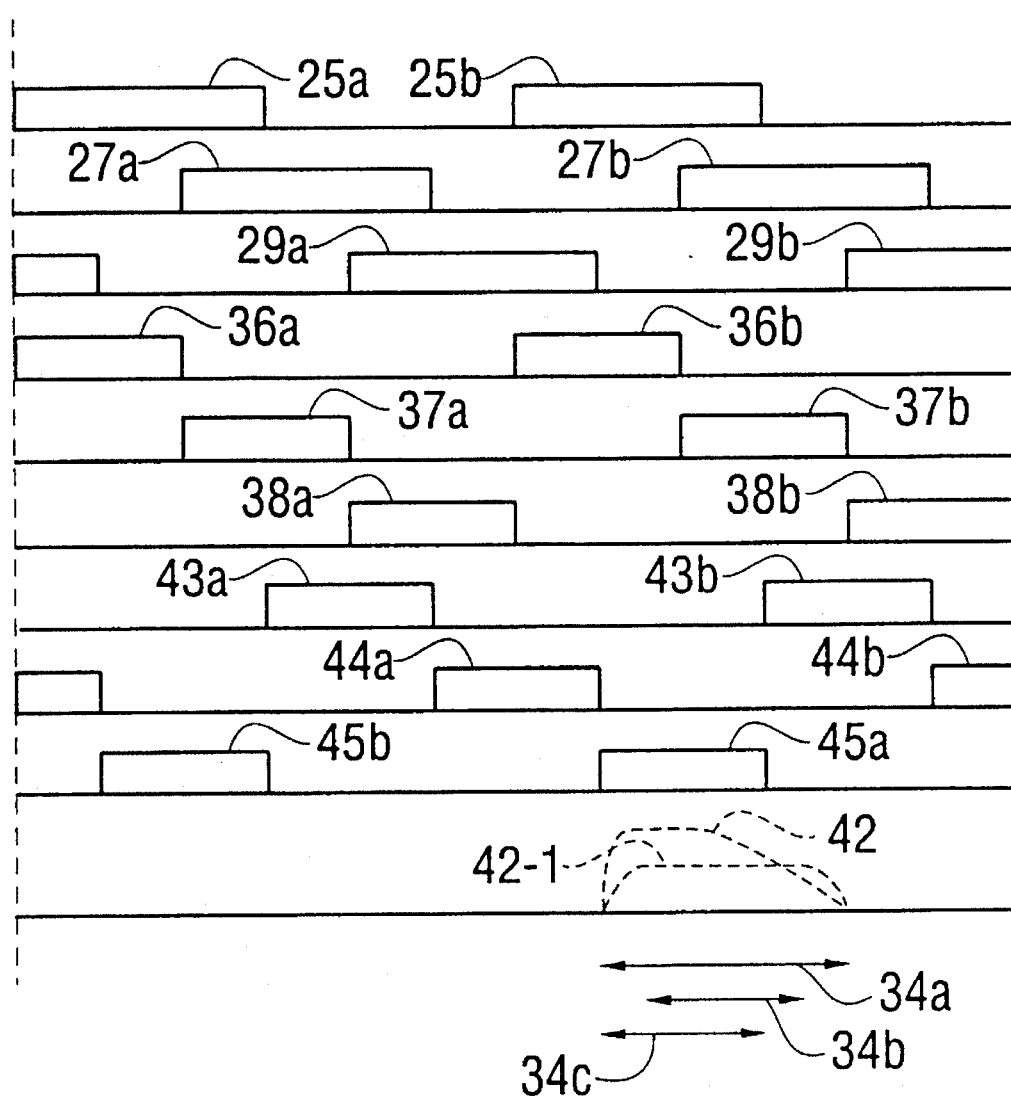
FIG. 38 is a time chart showing position detecting signals.

Inputs to the block circuit 18 are shown by curves 25a, 25b,— in a time chart of FIG. 38, and inputs supplied through an inversion circuit 13a are identical with inverted curves of the curves 25a, 25b,—. Block circuits 14a, 14b in FIG. 31 have the same constitutions as the above-described block circuits including the coils 10b, 10c, respectively. The oscillator 10 can be utilized commonly among these block circuits.

An output of the block circuit 14a and an output of the inversion circuit 13b are inputted into the block circuit 18, and their output signals become curves 27a, 27b, — as shown in FIG. 38 and inverted curves of the curves 27a, 27b.

An output of the block circuit 14b and an output of the inversion circuit 13c are inputted into the block circuit 18, and their output signals become curves 29a, 29b,— as shown in FIG. 38 and curves inverted of the curves 29a, 29b. The curves 27a, 27b, — are delayed 120 degrees in their phases with respect to the curves 25a, 25b,—. In the same way, the curves 29a, 29b,— are delayed 120 degrees in their phases with respect to the curves 27a, 27b, —.

The block circuit 18 is a circuit as conventionally utilized in a control circuit of a three-phase Y-type semiconductor motor. That is, the block circuit 18 is a logic circuit generating 120-degree width rectangular-waveform electric signals from terminals 18a, 18b, —, 18f in response to the above-described position detecting signals. Outputs from the terminals 18a, 18b, and 18c are shown by curves 36a, 36b,—, curves 37a, 37b, —, and curves 38a, 38b,— in FIG. 38, respectively. Outputs from the terminals 18d, 18e, and 18f are shown by curves 43a, 43b,—, curves 44a, 44b,—, and curves 45a, 45b,— in FIG. 38, respectively. Output signals of the terminals 18a and 18d have a mutual phase difference of 180 degrees. Output signals of the terminals 18b and 18e have a mutual phase difference of 180 degrees. And, output signals of the terminals 18c and 18f have a mutual phase difference of 180 degrees. Output signals of the terminals 18a, 18b and 18c are successively delayed one another by an amount of 120 degrees. And, output signals of the terminals 18d, 18e and 18f are successively delayed one another by an amount of 120 degrees. The same effect will be obtained when an aluminum plate, synchronously rotating together with the rotor 1 of FIG. 27 and having the same configuration, is used instead of the salient poles 1a, 1b,— facing to the coils 10a, 10b and 10c.

Next, current supply control to the armature coils will be explained with reference to FIG. 35. Both ends of the armature coils 39a, 39b and 39c are connected with transistors 20a, 20b, and 20c, 20d, and 20e, 20f. The transistors 20a, 20b, 20c,— serve as semiconductor switching elements and can be substituted by other semiconductor elements having the same effect. A DC electric power source supplies electric power from its positive and negative terminals 2a, 2b.

When a lower input of the AND circuit 41a is HIGH-level, the transistors 20a, 20b are turned on in response to a HIGH-level signal from the terminal 42a. Thus, the armature coil 39a is activated. In the same way, when HIGH-level signals are inputted from the terminals 42b, 42c, the transistors 20c, 20d and transistor 20e, 20f are turned on to activate the armature coils 39b, 39c.

A terminal 40 is supplied with a reference voltage specifying an armature current. By changing a voltage of the terminal 40, an output torque can be changed. When an electric power switch (not shown) is turned on, an output of an operational amplifier 40b becomes a HIGH-level since an input of a negative terminal of the operational amplifier 40b is lower than that of its positive terminal. Accordingly, the transistors 20a, 20b turn on to activate the armature coil 39a. A resistance 22a is provided for detecting armature current flowing the armature coils. A reference numeral 30a represents an absolute-value circuit. Position detecting signals 36a, 36b,— of FIG. 38 shows the input signal from the terminal 42a. Position detecting signals 37a, 37b,— and 38a, 38b,— of FIG. 38 show the input signals from the terminals 42b and 42c.

Figure 33:
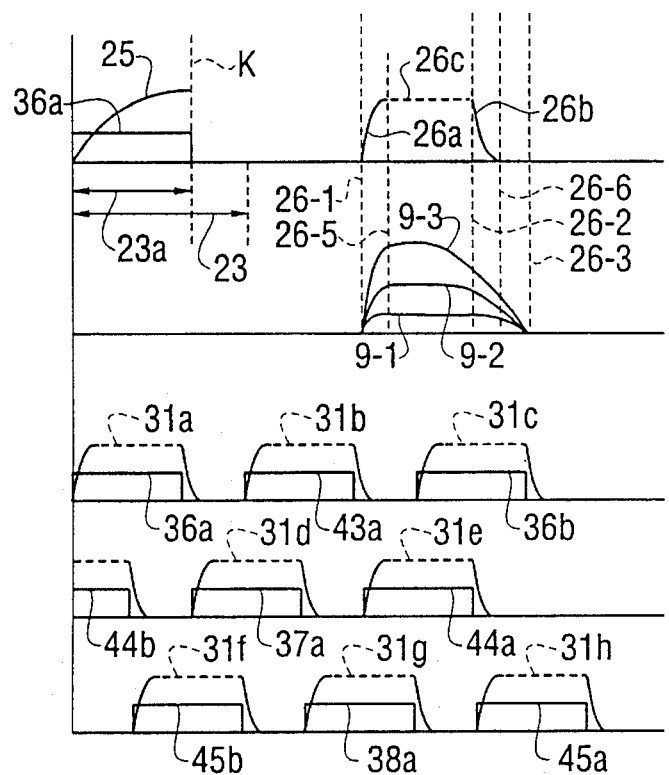
FIG. 33 is a time chart showing position detecting signals, armature current, and torque curves.

One of the above-described position detecting signal curves is shown as a curve 36a in a time chart of FIG. 33. The armature coil 39a is supplied with an exciting current during a time period corresponding to this curve 36a. An arrow 23a shows a current supply angle of 120 degrees. In an initial stage of the current supply period, building-up of the exciting current is delayed due to inductance of the armature coil. If the current is stopped, magnetic energy stored in the armature coil is discharged to the electric power source if the diode 49a of FIG. 35 is omitted. Therefore, the current decreases as shown by a second half portion of the curve 25, i.e. a right side of the dotted line K.

Since a positive torque generating section is a 180-degree section shown by an arrow 23, counter torque is generated to decrease both output torque and efficiency. This phenomenon becomes remarkable as the rotational speed increases, making it impossible to be used in a high-speed region.

This is because a time width of a positive torque generating section 23 becomes small in proportion to an increase of the rotational speed, while a time width of a counter torque generating section does not vary, even if the motor speed becomes a high speed.

The same explanation is applied to the current supply operation of the armature coils 39b, 39c based on other position detecting signals 37a, 38a.

Since a building-up portion of the curve 25 is also delayed, an output torque is decreased. That is, torque reduction is generated. This is because the magnetic poles and the salient poles interact to close the magnetic path so as to have a large inductance.

Although the reluctance type motor has a disadvantage in that it cannot increase its rotational speed notwithstanding an advantage of large output torque, such a disadvantage derives from the above-described counter torque and torque reduction. In order to resolve such disadvantages, a conventional means initiated the current supply timing before the salient poles confront with the magnetic poles.

Advancing the current supply timing makes armature current build up quickly because of small inductance of the magnetic poles. However, the inductance abruptly increases when an output torque begins generating, i.e. when the salient poles begin confronting with the magnetic poles. Consequently, the armature current declines steeply. Accordingly, an output torque reduces. In the case where a motor is driven in both forward and reverse directions, position detecting elements will be required twice in number.

Figure 35:
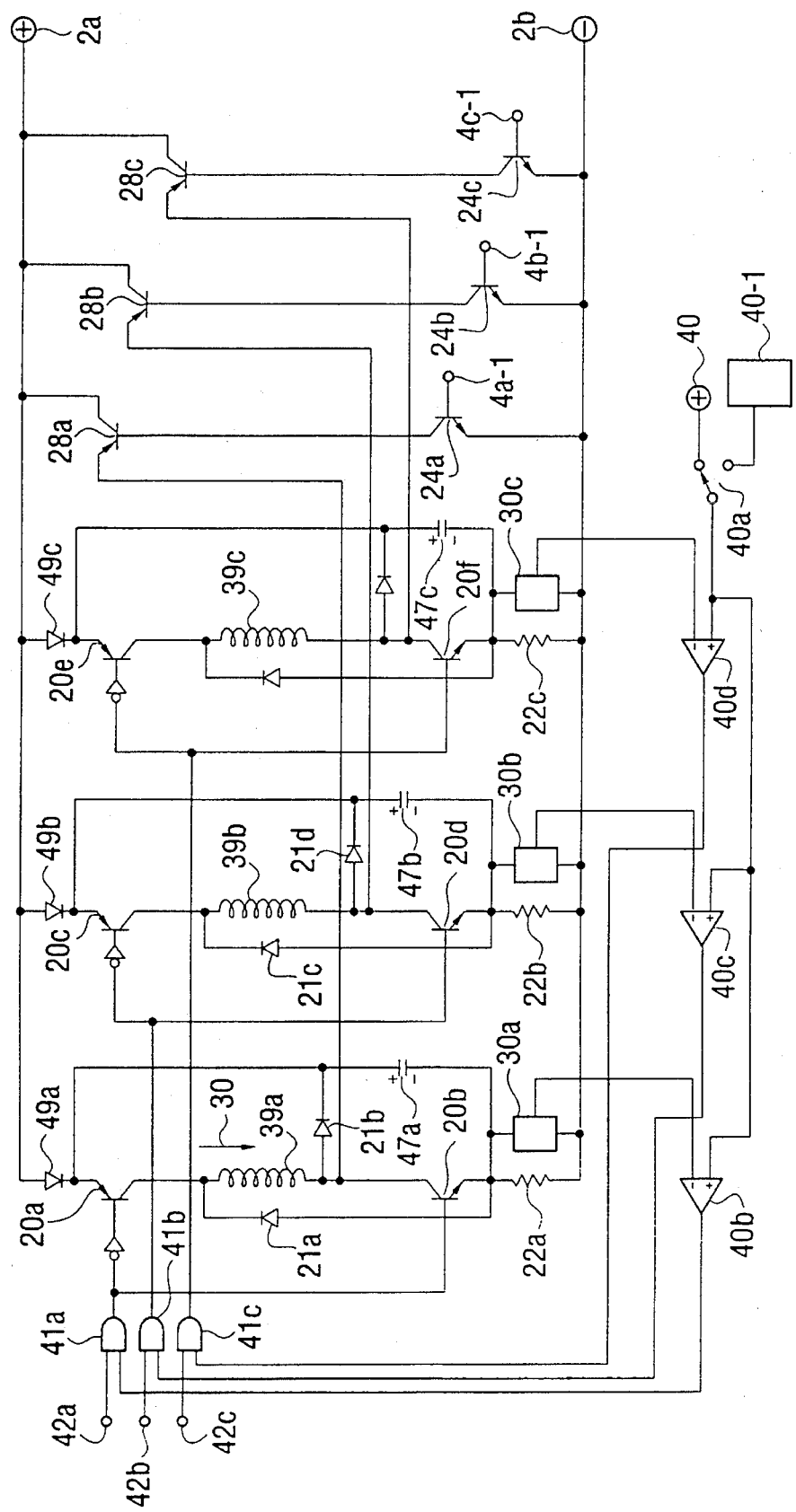
FIG. 35 is a circuit diagram showing a current supply control circuit for activating/deactivating armature coils in accordance with the present invention.

An apparatus in accordance with the present invention is characterized in that the above-mentioned disadvantage is eliminated by additionally providing back-flow preventing diodes 49a, 49b, 49c, and capacitors 47a, 47b, 47c shown in FIG. 35. When the current is terminated at the terminal end of the curve 36a, magnetic energy stored in the armature coil 39a is discharged through the diodes 21b, 21a to the capacitor 47a so as to charge it up to a high voltage with polarities shown in the drawing, being prevented from returning to the DC electric power source side by virtue of a function of the back-flow preventing diode 49a. Accordingly, the magnetic energy is sharply extinguished and the current decreases steeply.

Curves 26, 28a and 26b shown in the time chart of FIG. 33 cooperatively represent a current curve flowing the armature coil 39a. Both dotted lines 28-1, 26-2 are spaced 120 degrees. The armature current decreases steeply like the curve 26b and therefore no counter torque is generated. The capacitor 47a is charged up to a high voltage and held at this voltage.

Next, in response to the position detecting signal of curve 36b, the transistors 20a, 20b are turned on to activate the armature coil 39a again. A voltage equivalent to a summation of the charged voltage of the capacitor 47a and the DC electric power source voltage (a voltage between the terminals 2a, 2b) is applied to the armature coil 39a in this case. Therefore, an exciting current of the armature coil 32a builds up sharply.

By virtue of this function, the exciting current builds up abruptly as shown by the curve 28a. As is explained above, the torque reduction and the counter torque are removed. And, as the exciting current presents substantially the rectangular waveform, an output torque is increased.

Next, a chopper circuit will be explained. When the armature current of the armature coil 39a increases, and therefore the voltage drop at the resistor 22a detecting armature current value increases to exceed the reference voltage of the reference voltage terminal 40 (i.e. an input voltage of the positive terminal of the operational amplifier 40b), a lower input of the AND circuit 41a becomes LOW-level. Thus, the transistors 20a, 20b are turned off and the exciting current is decreased.

Due to hysteresis characteristics of the operational amplifier 40b, the output of the operational amplifier 40b returns to HIGH-level after a predetermined amount decreases. The transistors 20a, 20b, then, turn on to increase the armature current.

A section indicated by the curve 26c of FIG. 33 is a chopper controlled section. A height of the curve 26c is regulated by the voltage of the reference voltage terminal 40. The armature coil 39b of FIG. 35 is activated by the transistors 20c, 20d which are turned on in response to position detecting signal curves 37a, 37b,— supplied from the terminal 42b. A chopper control is carried out by the operational amplifier 40c, resistor 22b, absolute-value circuit 30b, and AND circuit 41b. Functions and effects of the diode 49b and the capacitor 47b are the same as those for the armature coil 39a. The same explanation will be applied to the armature coil 39c. The armature coil 39c is activated in response to the position detecting signal curves 38a, 38b,— of FIG. 38 supplied from the terminal 42c. Functions and effects of the transistors 20e, 20f, AND circuit 41c, operational amplifier 40d, resistance 22c, absolute-value circuit 30c, diode 49c and capacitor 47c are the same as in the previously explained case.

Current supply to each armature coil can be initiated either at the point of time when the salient poles come to confront with the magnetic poles or at the point of time when 30 degrees has passed thereafter. An adjustment is carried out by taking account of rotational speed, efficiency, and output torque to change the fixing positions of the detecting coils 10a, 10b and 10c to be fixed at the armature side for serving as position detecting elements.

As is apparent from the foregoing description, it becomes possible to drive a motor at a high speed with good efficiency and large output as a three-phase half-wave current supply type motor. Thus, an object of the present invention can be accomplished. In case of a three-phase full-wave current supply mode, the same purpose can be accomplished by combining two half-wave current supply systems described above as will be explained with reference to FIG. 30.

Curves 26a, 26b and 26c shown in FIG. 33 cooperatively represent a current supply curve for the armature coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 9-1, 9-2 and 9-3 show output torque curves. At the point of the dotted line 26-1, the current supply operation is initiated and the salient poles begin confronting with the magnetic poles at the same time. The curve 9-1 represents a case where a current supplied to the armature coil is small. Its torque becomes relatively flat. However, as shown by the curves 9-2, 9-3, a peak value of the torque tends to shift toward a left side as the current value increases, and also a width of the peak value becomes narrow.

It is preferable to set an initiation timing of the current supply operation in view of the above-described torque characteristics and supplied current value. Charging voltages of the capacitors 47a, 47b and 47c increase with reduction of their capacitances. Therefore, with small-capacitance capacitors 47a, 47b, 47c, the exciting currents of the armature coils can be built up sharply and reduced steeply. The motor can thus operate at a high-speed region and the disadvantage of the conventional reluctance type motor can be eliminated. It is preferable to select the capacitance of the capacitor not to damage transistors in the circuit.

As there is no field magnet, it becomes impossible to perform electromagnetic braking for realization of deceleration or stop. Also, it is impossible to perform regenerative braking. Accordingly, this cannot be used as servo motors or driving motors for electric motive vehicles.

The present invention resolves the above-described problems. Details will be described below. In FIG. 35, the diodes 49a, 49b, 49c are connected in parallel with transistors 28a, 28b, 28c serving as semiconductor switching elements, respectively.

Position detecting signals to be inputted to the terminals 42a, 42b, 42c are inputted through terminals 4a-1, 4b-1, 4c-1. Accordingly, transistors 24a, 28a are turned on during the time corresponding to the width of signal curves 36a, 36b,— Transistors 24b, 28b are turned on during the time corresponding to the width of signal curves 317a, 37b,—. And, transistors 24c, 28c are turned on during the time corresponding to the width of signal curves 38a, 38b,—.

The armature coils 39a, 39b, 39c are successively activated by an amount of 120 degrees. Therefore, the same function and effect will be obtained even if the emitters of the transistors 20b, 20d, 20f are connected with one another and the absolute-value circuits 30b, 30c and resistances 22b, 22c and operational amplifiers 40c, 40d are omitted together. If current supply angle of the armature coil is set to be more than 120 degrees, the above-described means cannot be adopted.

In case that the motor's rotation is reversed, the input signals of the terminals 42a, 42b, 42c are switched to the position detecting signal curves 43a, 43b, —, curves 44ah, 44b,—, curves 45a, 45b,— of FIG. 38.

When the motor's rotation has been reversed, the position detecting signals shown from the top to the third levels in FIG. 38 are all shifted left so as to cause phase shift of 180 degrees. These shifted signal curves are identical with the reversed curves. Accordingly, in order to obtain signals curves 43a, 43b,—, an output of an AND circuit is used. That is, this AND circuit has two inputs, one being the signal curve shown at the top level in FIG. 38 and the other being the reversed signal curve of the curve shown at the second level in FIG. 38. The signal curves 44a, 44b,— and signal curves 45a, 45b,— are obtained by using in the same means.

The above-described means will not be necessary in the case where the motor is switched to a reverse rotation mode for braking during the normal rotation of the motor.

Figure 34:
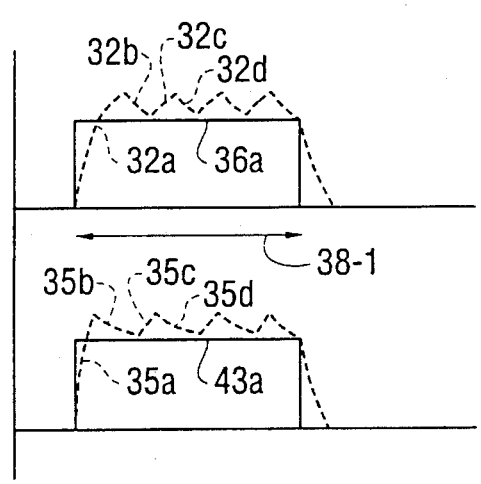
FIG. 34 is a graph showing exciting current curve.

Next, a regenerative braking which is carried out by switching the motor to the reverse rotation mode during the normal rotation of the motor will be explained. A current supply to the armature coil 39a during the normal rotation will be explained. In the graph of FIG. 34, the signal curve 30a denotes a position detecting signal inputted from the terminal 42a. An arrow 38-1 denotes 120-degree width. The transistor 28a of FIG. 35 is turned on during time period of an arrow 38-1.

A building-up portion of the exciting current of the armature coil 39a becomes sharp as shown by the curve 32a due to high voltage of the capacitor 47a. Electrostatic energy is transformed into magnetic energy of the armature coil 39a in the first half of the signal curve 32a. In the second half of the signal curve 32a, the electric power source supplies magnetic energy.

When the output of the operational amplifier 40b turns to LOW-level, the transistors 20a, 20b turn off. As shown by the curve 32b, magnetic energy is returned through the transistor 28a to the electric power source. When the armature current decreases a predetermined amount, the output of the operational amplifier 40b turns to HIGH-level due to hysteresis characteristics. The transistors 20a, 20b are therefore turned on, so as to increase armature current as shown by the curve 32c. Repeating such a cycle constitutes a chopper circuit. This chopper circuit may be constructed by other conventional means.

When the transistors 20a, 20b, 28a are turned off at the terminal end of the curve 36a, magnetic energy stored in the armature coils is discharged to the capacitor 47a so as to charge it up to a high voltage, being prevented from returning to the DC electric power source side by virtue of a function of the diode 49a. Accordingly, as described above, generation of torque reduction and counter torque are both prevented. Consequently, a motor having high efficiency in a high speed region can be obtained. An exciting current can be controlled by the voltage of the reference voltage terminal 40. Other armature coils 39b, 39c are controlled in the same manner.

A case wherein the motor is switched to a reverse mode during the normal rotation of the motor will be explained below with reference to FIG. 34. Regenerative braking is necessary for a motor having a large output to recover kinetic energy of the rotor and load as electric energy of the electric power source.

Next, the measure for realizing the regenerative braking will be explained. According to this measure, that object can be accomplished by switching the motor rotating in the normal rotation into the reverse rotation mode so as to cause deceleration or stop. Then, the armature coil 39*a* in the reverse rotation mode will be explained. An electromotive force is generated in a direction of an arrow 30. A voltage applied to the armature coil 39*a* will be V+E, where V being a voltage between the terminals 2*a*, 2*b* and E being a counter electromotive force. Such a counter electromotive force E generates due to the reduction of the number of magnetic flux intersecting the armature coil 39*a* as the motor speed reduces. Accordingly, armature current sharply increases up to a predetermined value in response to the curve 36*a* in a time chart of FIG. 34, as shown by dotted lines 35*a*, 35*c*—.

When the output of the operational amplifier 40*b* turns to LOW-level, the transistors 20*a*, 20*b* turn off. Magnetic energy in the armature coil 39*a* is discharged. The direction of the discharge current is identical with that of the counter electromotive force. Although the above discharge direction is opposite to the counter electromotive force during the normal rotation of the motor, it becomes identical with each other in the reverse rotation mode because braking torque is generated during the reverse rotation mode. Hence, the discharge current flowing through the diodes 21*a*, 21*b* is returned through the transistor 28*a* to the electric power source whose voltage is changed to V-E.

A degree of reduction of the discharge current in the reverse rotation mode is smaller than in the normal rotation mode, as shown by dotted lines 35*b*, 35*d* of FIG. 34. When the armature current decreases to a predetermined amount, the output of the operational amplifier 40*b* turns to HIGH-level due to its hysteresis characteristics, The transistors 20*a*, 20*b* are therefore turned on again, so as to increase exciting current abruptly. Repeating such a cycle constitutes a chopper circuit. Functions and effects of the diode 49*a*, transistor 28*a*, and capacitor 47*a* at the initial and terminal ends of respective position detecting signals are substantially the same as those in the normal rotation mode.

Widths of the dotted lines 35*a*, 35*c*,— become smaller than that of the dotted lines 35*b*, 35*d*,— in FIG. 34. Although electric power is consumed during sections of the dotted lines 35*a*, 35*c*,—, overall amount of consumption is small due to small widths of these sections. Meanwhile, energy of the rotor and load is transformed into electric energy and returned to the electric power source during sections of the dotted lines 35*b*, 35*d*,—. Therefore, regenerative braking can be carried out effectively since time widths of these section are large.

After a predetermined deceleration is completed, the motor can be switched into the normal rotation mode to return to the normal operation. If the applied voltage is increased, the motor can speed up to, for example, 30 thousands rpm. Although the transistor 28*a*, diode 49*a*, capacitor 47*a*, are provided at the positive terminal 2*a* side of the electric power source, the same object will be accomplished even if these components are provided at the negative terminal 2*b* side of the electric power source.

The above-described functions and effects are similar to those of the armature coils 39*b*, 39*c*. Next, an output torque of 180-degree section generated by salient poles and magnetic poles will be explained. In a time chart of FIG. 38, curves 42, 42-1 represent the output torque generating within the range indicated by an arrow 34*a* (180 degrees). When an exciting current is small, the output torque becomes symmetrical as shown by the curve 42-1 and has a flat torque characteristics. If the exciting current increases so much that magnetic flux is nearly saturated, then the output torque becomes an asymmetric torque curve as shown by the curve 42. Namely, the output torque promptly increases as soon as the salient poles begin confronting with magnetic poles. Subsequently, the output torque becomes flat. It thereafter decreases gradually. If the exciting current further increases, the flat portion is almost extinguished.

In the normal/reverse rotation modes as previously described, if the armature coil is supplied with current having as much as the time width of a central portion, when the torque curve is symmetric (curve 42-1), the output torque characteristics does not change regardless of normal or reverse rotation. However, if the torque curve is asymmetric, the output torque characteristics does change. However, it will be acceptable in practical aspect because only deceleration torque is reduced during deceleration in the reverse rotation mode.

In case of 120-degree current supply mode, the armature coil is generally supplied with current by an amount indicated by an arrow 34*b* during the normal rotation mode. It is however possible to supply current by an amount, indicated by an arrow 34*c* from the initiation terminal of the position detecting signal. In order to decelerate and stop the motor by the regenerative braking, input signals to positive terminals of the operational amplifiers 40*b*, 40*c*, 40*d* should be proportional to the rotational speed of the motor. For this end, an output of the terminal 40 is changed over to an output of the block circuit 40-1 by a switch 40*a*. The block circuit 40-1 is a well-known conventional circuit which generates a voltage proportional to the rotational speed.

Figure 30:
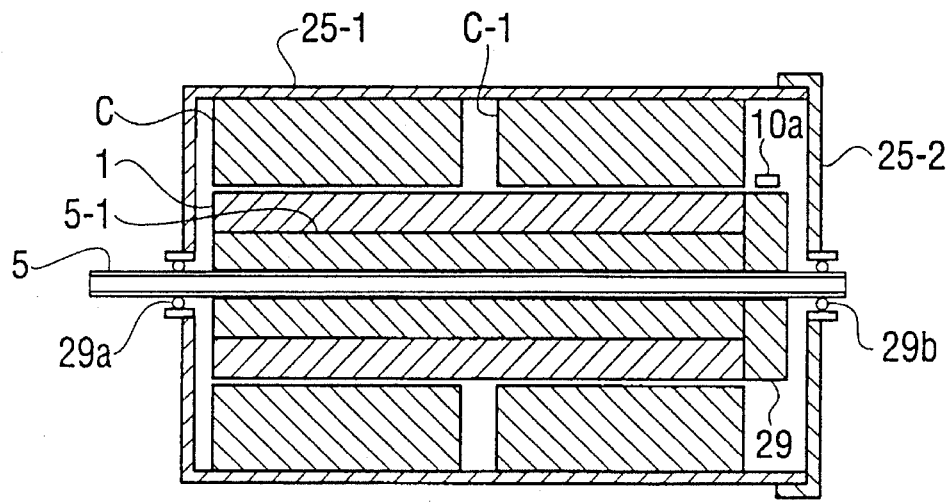
FIG. 30 is a cross-sectional view showing a three-phase full-wave reluctance-type motor.

Next, a three-phase full-wave current supply mode will be explained with reference to FIG. 36. In FIG. 30, a metallic (cylindrical) outer casing 25-1 is coupled with an outer flange of a circular side plate 25-2 which is bent axially inward. Both of these side plates are provided with ball bearings 29*a*, 29*b*, through which a rotational shaft 5 is rotatably supported. A rotor 1 is fixed with the rotational shaft 5 through a supporting member 5*a*. Salient poles (not shown) of the rotor 1 have substantially the same construction as the salient poles of the rotor 1 of FIG. 27. A fixed armature C, whose salient poles confront with magnetic poles, is fixed inside the outer casing 25-1. The construction of the fixed armature is substantially the same as the fixed armature 16 of FIGS. 28, 29.

Aluminum rotor 29, having a protrusion similar in outer peripheral shape to the rotor 1, is fixed to the right side of rotor 1 so as to rotate together with the rotor 1. The outer peripheral portion thereof faces to coils 10*a*, 10*b* and 10*c*, so that obtain position detecting signals shown in FIG. 38 as previously described with reference to FIG. 31 can be obtained.

Another fixed armature C-1 is fixed inside the outer casing 25-1. This fixed armature C-1 has substantially the same construction as the fixed armature C, but is different in that its phase is offset 180 degrees with respect to the salient poles of the rotor 1 (equivalent to 180 rotation about an axis). Its magnetic poles confront with salient poles on outer periphery of the rotor 1 over air gap. The fixed armature C-1 is associated with three-phase armature coils, which are referred to as armature coils 39*d*, 39*e*, 39*f*. The armature coils 39*d*, 39*e*, 39*f* are activated by an electric circuit similar to that of FIG. 35 in response to the position detecting signals 43a, 43b,—, 44a, 44b,—, 45a, 45b,—, of FIG. 38, so as to realize a three-phase half-wave current supply mode motor. The fixed armatures C and C-1 constitute three-phase full-wave current supply mode motor.

Current supply control of the armature coils 39a, 39b,—, 39f will be explained with reference to FIG. 36.

The fixed armature C-1 has No. 1-, No.2-, No.3-phase armature coils, corresponding to the No. 1-, No.2-, No.3-phase armature coils associated with the fixed armature C. Both of them are respectively supplied with current by the half-wave current mode. Thus, the motor of FIG. 30 is operated by the three-phase full-wave current supply mode.

First phase armature coil is constituted by No.1 and No. 1 armature coils. Second phase armature coil is constituted by No.2 and No.2 armature coils. And, third phase armature coil is constituted by No.3 and No.3 armature coils. Position detecting signals 36a, 36b,—, 37a, 37b, —, 38a, 38b,— are referred to as No. 1-, No.2-, No.3-phase position detecting signals. Position detecting signals 43a, 43b,—, 44a, 44b,—, 45a, 45b,— are referred to as No. 1-, No.2-, No.3-phase position detecting signals.

Figure 36:
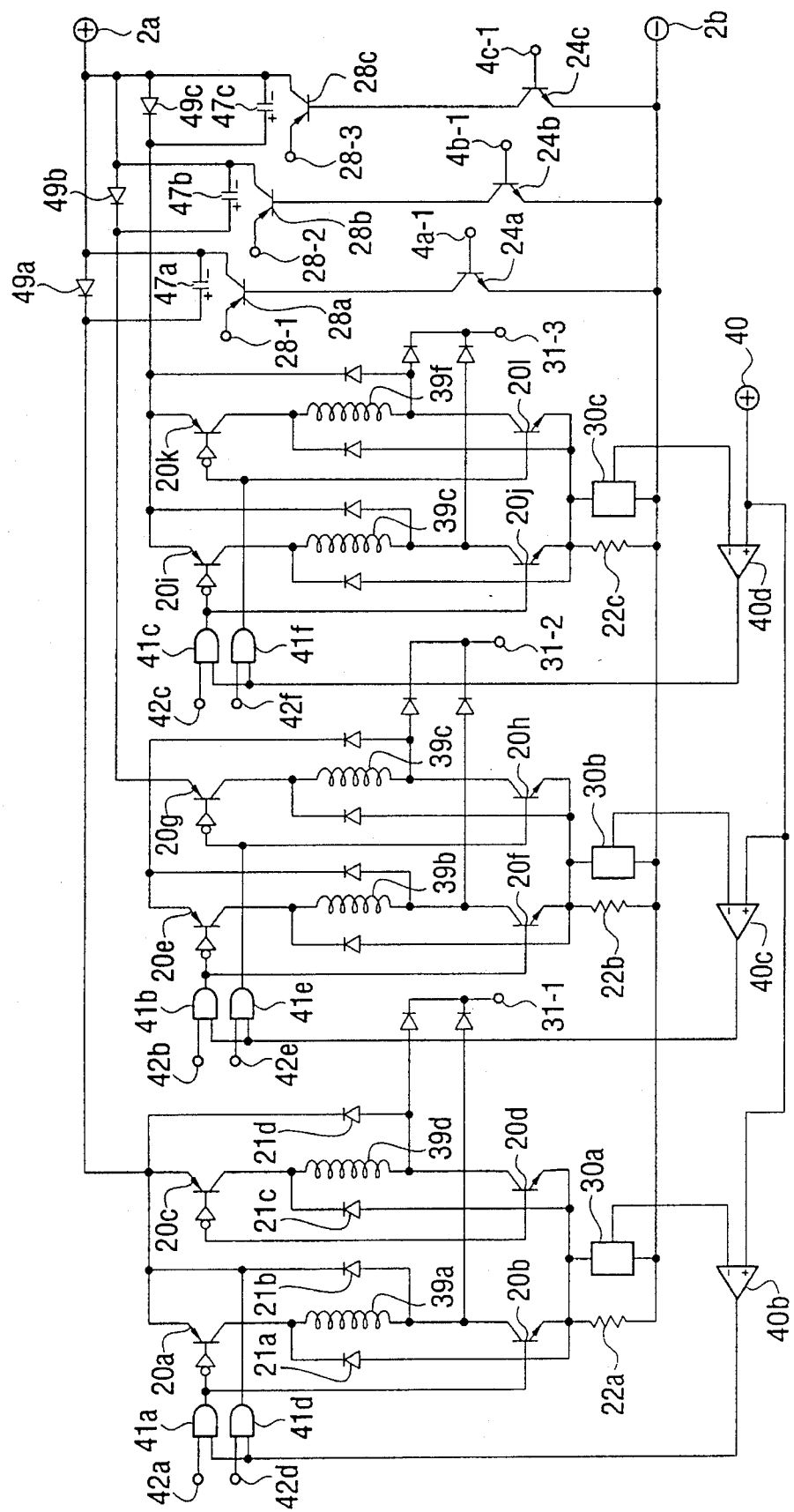
FIG. 36 is a circuit diagram showing another current supply control circuit for activating/deactivating armature coils in accordance with the present invention.

In FIG. 36, No. 1-, No.2-, No.3-phase position detecting signals are supplied from the terminals 42a, 42b, 42c. No. 1-, No.2-, No.3-phase position detecting signals are supplied from the terminals 42d, 42e, 42f. Armature coils 39a, 39d serve as No.1, No.1 armature coils of first phase. Armature coils 39b, 39e serve as No.2, No.2 armature coils of second phase. And, armature coils 39c, 39f serve as No.3, No.3 armature coils of third phase.

Transistors 20a, 20b turn on in response to the input signal of the terminal 42a. Subsequently, the armature coil 39a is activated through the diode 49a which is connected in forward direction. Then, the transistors 20a, 20b turn off at the terminal end of the input signal (curve 36a). Magnetic energy stored in the armature coil 32a is discharged into the capacitor 47a so as to charge it, being prevented from returning to the electric power source (terminals 2a, 2b) by the function of diodes 21a, 21b. Accordingly, discharge current due to the magnetic energy stored is extinguished promptly.

A capacitance of the capacitor 47a is adjusted to small such that the discharge current disappears within a period of time that the salient poles rotate 60 degrees, i.e. within a section extending from a right edge of the curve 36a to a left edge of the curve 43a in FIG. 38. If the capacitance is too small, charge voltages of the transistors will become too high to suppress them below their withstand voltages. Thus, counter torque can be prevented.

When the salient poles rotate 60 degrees, the position detecting signal of the curve 43a is supplied to the terminal 42d. In response to this input signal, the transistors 20c, 20d turn on to activate the armature coil 32d. As a voltage applied to the armature coil 32d is high voltage of the capacitor 47a in this instance, the exciting current builds up sharply as shown by the curve 31b in the time chart of FIG. 33. Subsequently, the armature coil 32d is supplied with a constant current determined by the chopper circuit, as described later. At the terminal end of the curve 43a, the transistors 20c, 20d are turned off. Magnetic energy stored in the armature coil 32d is discharged into the capacitor 47a so as to charge it to high voltage, being prevented from returning to the electric power source by the function of back-flow preventing diode 49a. Next, an input signal of curve 36b is supplied to the terminal 42a. Therefore, exciting current of the armature coil 39a builds up sharply.

As apparent from the foregoing description, magnetic energy stored in the armature coils 39a, 39d is transferred into electrostatic energy of the capacitor 47a upon termination of current. Accordingly, discharge current due to the magnetic energy is extinguished promptly. Thus, counter torque can be prevented. Hence, torque reduction is avoided.

When the armature coil 39d is deactivated, magnetic energy stored in the armature coil 39d is promptly stored in the capacitor 47a and its discharge current is also promptly extinguished within a section of 60 degrees even in a high speed rotation. After a predetermined time has passed, the armature coil 39a is activated. Its exciting current sharply increases by the high voltage of the capacitor 47a. Its time width is less than a time required in a rotation of a 60-degree salient pole.

Next, a case wherein a chopper function is included will be explained. A chopper circuit, constituted by the AND circuits 41a, 41d, operational amplifier 40b, reference voltage terminal 40, resistance 22a, and absolute-value circuit 30a, turns on and off the transistors 20a, 20b, 20c and 20d in the same manner as in the previously described embodiments. With such chopper function, current supply curves 31a, 31b, 31c of FIG. 33 become substantially equal to rectangular shape. A dotted portion is a section wherein a current value is regulated to a predetermined value by the chopper function.

Current supply to the armature coils 39b, 39e is controlled by the input signals of the terminals 42b, 42e, diode 49b, capacitor 47b, AND circuits 41b, 41e, transistors 20e, 20f, —, resistance 22b, operational amplifier 40c, and absolute-value circuit 30b in the same way as in the case of the armature coils 39a, 39d.

Current supply to the armature coils 39c, 39f is controlled by the input signals of the terminals 42c, 42f, diode 49c, capacitor 47c, AND circuits 41c, 41f, transistors 20i, 20j,—, operational amplifier 40d, resistance 22c, and absolute-value circuit 30c in the same way as in the above-described case. Accordingly, a three-phase full-wave current supply mode reluctance type motor is obtained, which not only maintains an advantage of large output torque but also resolves a problem of low speed. Furthermore, this motor can suppress ripple torque.

Curves 31d, 31e of FIG. 33 represent current supply curves of armature coils 39b, 39e in response to the position detecting signals 37a, 44a. Curves 31g, 31h, 31f represent current supply curves of armature coils 39c, 39f in response to the position detecting signals 38a, 45a, 45b. The present invention can be embodied even if capacitors 47a, 47b, 47c are disposed in parallel with diodes 49a, 49b, 49c and the electric power source.

If the armature coil is deactivated during chopper control, voltages of the capacitors 47a, 47b, 47c increase by the magnetic energy. Hence, exciting current of the armature coil builds up quickly when the armature coil is next activated.

Figure 32:
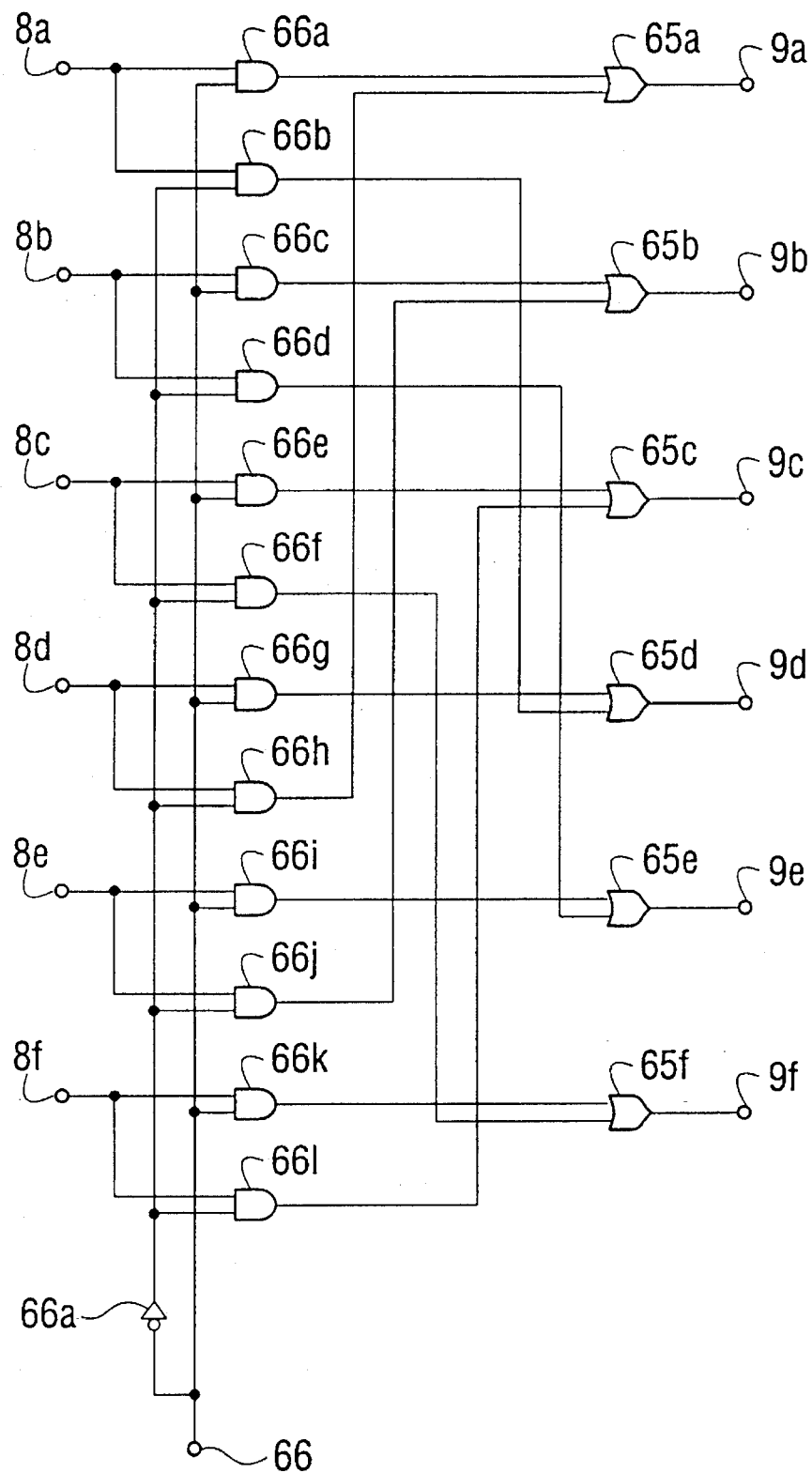
FIG. 32 is a circuit diagram showing a position detecting device for obtaining position detecting signals used for normal/reverse rotations.

Next, a means for rotating the motor in the reverse direction will be explained. The motor's rotation can be reversed by inputting the position detecting signals to be inputted to the terminals 42a, 42b, 42c, to the terminals 42d, 42e, 42f, and further by inputting the position detecting signals to be inputted to the terminals 42d, 42e, 42f, to the terminals 42a, 42b, 42c. FIG. 32 shows such a switching means. In FIG. 32, terminals 8a, 8b,—, and 8f receive position detecting signal curves 36a, 36b,—, curves 37a, 37b, —, curves 38a, 38b,—, curves 43a, 43b,—, curves 44a, 44b,—, and curves 45a, 45b,— of FIG. 38, respectively.

When an input of the terminal 66 is HIGH-level, downside inputs of the AND circuits 66a, 66c, 66e, 66g, 66i, 66k become HIGH-level. These signals, having passed through OR circuits 65a, 65b,—, and 65f, are obtained from the terminals 9a, 9b, —, 9f as position detecting signals for rotating the motor in the normal direction. Output signals of the terminals 9a, 9b,—, 9f are inputted into the terminals 42a, 42b,—, 42f of FIG. 36, respectively. When an input of the terminal 66 is turned to LOW-level, this signal is inverted into a HIGH-level through an inversion circuit 66a. This HIGH-level electric signal is supplied to the downside terminals of the AND circuits 66b, 66d, —, 66i. Accordingly, the position detecting signals for the reverse rotation can be obtained from the terminals 9a, 9b,—, and 9f through the OR circuits 65a, 65b,—, and 65f.

Accordingly, normal/reverse rotation of the motor can be controlled by the input signal of the terminal 66. If the input of the terminal 66 is changed to LOW-level during the normal rotation of the motor, reverse torque is generated. In the chopper circuit, a time width of increasing portion of exciting current becomes smaller than that of decreasing portion of exciting current. Hence, regenerative braking can be carried out in the same manner as the embodiment of FIG. 35. Its function and effect are similar too.

Terminals 28-1, 28-2, 28-3 of FIG. 36 are connected to the terminals; 31-1, 31-2, 31-3, respectively. Input signals of the terminals 4a-1, 4b-1, 4c-1 are identical with the input signals from the terminals 42a 42d, terminals 42b, 42e, and terminals 42c, 42f, respectively. Curves 43a, 43b,—, curves 44a, 44b,—, and curves 45a, 45b,— are inputted.

When an input of the terminal 66 is HIGH-level, downside inputs of the AND circuits 66a, 66c, 66e, 66g, 66i, 66k become HIGH-level. These signals, having passed through OR circuits 65a, 65b,—, and 65f, are obtained from the terminals 9a, 9b, —, 9f as position detecting signals for rotating the motor in the normal direction. Output signals of the terminals 9a, 9b,—, 9f are inputted into the terminals 42a, 42b,—, 42f of FIG. 36, respectively. When an input of the terminal 66 is turned to LOW-level, this signal is inverted into a HIGH-level through an inversion circuit 66a. This HIGH-level electric signal is supplied to the downside terminals of the AND circuits 66b, 66d, —, 66i. Accordingly, the position detecting signals for the reverse rotation can be obtained from the terminals 9a, 9b,—, and 9f through the OR circuits 65a, 65b,—, and 65f.

Accordingly, normal/reverse rotation of the motor can be controlled by the input signal of the terminal 66. If the input to the terminal 66 is changed to LOW-level during the normal rotation of the motor, reverse torque is generated, in the chopper circuit, a time width of increasing portion of exciting current becomes smaller than that of decreasing portion of exciting current. Hence, regenerative braking can be carried out in the same manner as the embodiment of FIG. 35. Its function and effect are similar too.

Terminals 28-1, 28-2, 28-3 of FIG. 36 are connected to the terminals 31-1, 31-2, 31-3, respectively. Input signals of the terminals 4a-1, 4b-1, 4c-1 are identical with the input signals from the terminals 42a 42d, terminals 42b, 42e, and terminals 42c, 42f, respectively. As a result, the regenerative braking can be performed by switching the motor rotating in the normal direction into the reverse rotation mode in the same manner as in the previously explained embodiment.

The positions of coils 10a, 10b, 10c serving as position detecting elements are adjusted and fixed to the armature side in such manner that current supply to armature coils is started at a point where 30 degrees is passed after the salient poles begin confronting with magnetic poles, and is stopped after the rotation of 120 degree. Accordingly, the armature coil is activated at the point 30 degrees after the salient poles begin to confront with the magnetic poles, and is deactivated after the 120-degree rotation. Thus, an output torque in the normal rotation mode is identical with that in the reverse rotation mode.

Only the reference voltage (i.e. voltage of the terminal 40 of FIG. 36) can regulate the output torque. Hence, the applied voltage has no relation to the output torque. Accordingly, ripple voltage between the electric power terminals 2a, 2b is not so relevant. In case of AC electric power source, a capacitor is used for rectification. However, this capacitor needs not to be a large-capacitance capacitor. In the case where the AC electric power source is three-phase, the capacitance of the capacitor can be further reduced. Consequently, the electric power source can be simplified.

Although each armature coil of FIGS. 35, 36 is controlled by two transistors provided both ends thereof, the present invention can be embodied even if only one transistor is provided at a negative terminal side of the electric power source.

Figure 37:
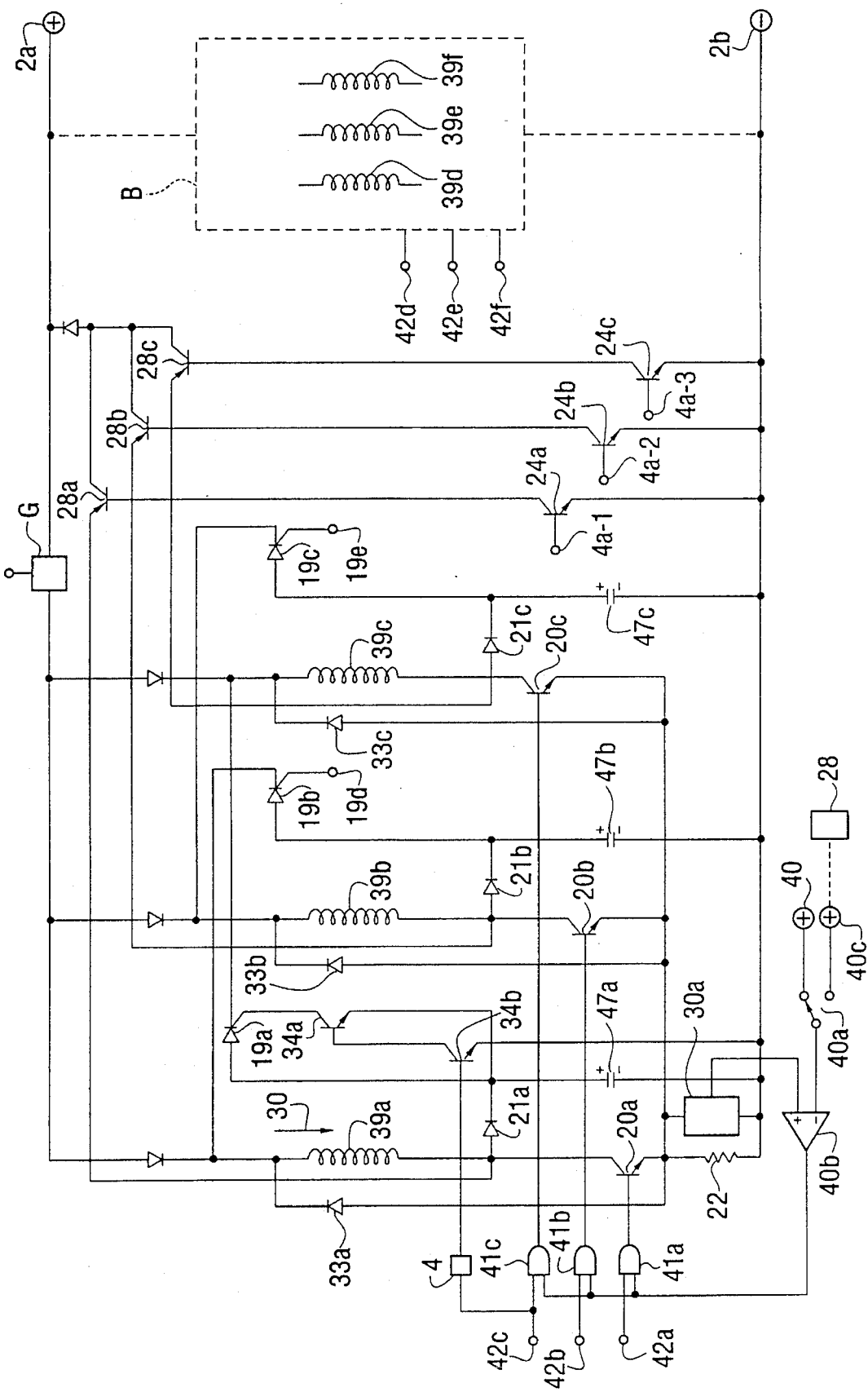
FIG. 37 is a circuit diagram showing another current supply control circuit for activating/deactivating armature coils in accordance with the present invention.

FIG. 37 will be explained below. In FIG. 37, lower ends of the armature coils 39a, 39b and 39c are connected with transistors 20a, 20b and 20c. The transistors 20a, 20b, and 20c serve as semiconductor switching elements and can be substituted by other semiconductor elements having the same effect. A DC electric power source supplies electric power from its positive and negative terminals 2a, 2b.

This embodiment is characterized by a simplified circuit configuration in which only one transistor (transistor 20a, 20b or 20c) is provided at a lower end of each armature coil, i.e. a negative terminal side of the DC electric power source.

Position detecting signals of curves 36a, 36b,—, curves 37a, 37b, —, and curves 38a, 38b,— in FIG. 38 are inputted from the terminals 42a, 42b and 42c. In response to these input signals fed through AND circuits 41a, 41b, 41c, transistors 20a, 20b and 20c are turned on to activate armature coils 39a, 39b and 39c.

A reference voltage specifying an exciting current is inputted to a terminal 40. By changing a voltage of the terminal 40, an output torque can be changed. When an electric power switch (not shown) is turned on, an output of an operational amplifier 40b becomes a HIGH-level since an input of a negative terminal of the operational amplifier 40b is lower than that of its positive terminal. Accordingly, the transistor 20a turns on to supply a voltage to the current supply circuit for the armature coil. A resistance 22 and an absolute-value circuit 30a are provided for detecting armature current flowing the armature coils 39a, 39b and 39c.

This embodiment provides the following means in order to suppress above-described counter torque and torque reduction and to provide a high-speed and large-torque motor.

An apparatus in accordance with the present embodiment is characterized in that above-mentioned disadvantage is eliminated by additionally providing a small-capacitance capacitor 47a, a diode 21a, semiconductor elements 19a, 19b, 19c and others shown in FIG. 37, and only one semiconductor switching element (20a, 20b or 20c), controlling activation/deactivation of each armature coil, is provided at a negative voltage side of the DC electric power source.

When current is terminated at the terminal end of the position detecting signal curve 36a, magnetic energy stored in the armature coil 39a is discharged through the diodes 21a, 33a to the capacitor 47a so as to charge it up to a high voltage with polarities shown in the drawing, being prevented from returning to the DC electric power source side. Accordingly, the magnetic energy is sharply extinguished and the current decreases steeply.

Curves 26a, 26b and 26c shown in the time chart of FIG. 33 cooperatively represent a current curve flowing the armature coil 39a. Both dotted lines 26-1, 26-2 are spaced 120 degrees. The armature current decreases steeply like the curve 26b and therefore no counter torque is generated. The capacitor 47a is charged up to a high voltage and held at this voltage. The armature coils 39b, 39c are activated in response to the position detecting signals inputted from the terminals 42b, 42c. When subsequently deactivated, the capacitors 47b, 47c are charged to high voltage through the diodes 33b, 33c, 21b, 21c. Thus, armature current decreases quickly.

Next, in response to the position detecting signal of curve 38b, the transistor 20c is turned on to activate the armature coil 39c again. A voltage equivalent to a summation of the charged voltage of the capacitor 47a and the DC electric power source voltage (a voltage between the terminals 2a, 2b) is applied to the armature coil 39c. Consequently, an exciting current of the armature coil 39c builds up sharply, as shown by curves 26a.

The reason will be explained below. A differential pulse of an initial terminal of the position detecting signal 38b is obtained from the block circuit 4 of FIG. 37. A monostable circuit inputting this differential pulse produces an electric pulse having a short width. In response to this electric pulse, the transistors 34b, 34a, and SCR 19a turn on. High voltage of the capacitor 47a is applied to the armature coil 39c, thus, the exciting current builds up sharply. Thereafter, a current shown by the curve 26c (FIG. 33) is obtained by the DC electric power source. Upon termination of discharge of the capacitor 47a, the SCR 19a is turned off.

As explained above, torque reduction and counter torque can be avoided, therefore, current waveform becomes rectangular shape. Consequently, an output torque increases.

Functions of other armature coils 39a, 39b, capacitors 47b, 47c, and SCRs 19b, 19c are similar too.

To terminals 19d, 19e, inputted are electric signals each having a width equal to electric pulses obtained at the initial edges of corresponding position detecting signals.

Next, a chopper circuit will be explained. When the armature current of the armature coil 39a increases and therefore the voltage drops in the resistor 22 and absolute-value circuit 30a, which detect armature current value, increase to exceed the reference voltage of the reference voltage terminal 40 (i.e. an input voltage of the positive terminal of the operational amplifier 40b), a downside input of the AND circuit 41a turns to LOW-level. The transistor 20a turns off. An exciting current reduces. Due to hysteresis characteristics of the operational amplifier 40b, an output of the operational amplifier 40b resumes HIGH-level after a predetermined reduction. Thus, the transistor 20a turns on and the exciting current increases. Repetition of such a cycle maintains the exciting current at a predetermined value. A section indicated by a curve 26c of FIG. 33 is a section being chopper controlled. A height of the curve 26a is regulated by a voltage of the reference voltage terminal 40.

The armature coil 39b of FIG. 37 is activated by the turning-on of the transistor 20b in accordance with widths of the position detecting signal curves 37a, 37b,— inputted from the terminal 42b. And, the chopper control is carried out by the operational amplifier 40b, resistor 22, absolute-value circuit 30a, AND circuit 41b. Above-described circumstances are applied to the armature coil 39c. That is, the current supply control for the armature coil 39c is executed by inputting the position detecting signal curves 38a, 38b,— of FIG. 38 to the terminal 42c. Function and effect of transistor 20c, AND circuit 41c, operational amplifier 40b, resistance 22, and absolute-value circuit 30a are substantially identical with the same components previously described.

Current supply to each armature coil can be initiated from either when the salient poles come to confront with the magnetic poles or when approximately 30 degrees has passed thereafter. An adjustment is carried out by taking account of rotational speed, efficiency, and output torque to change the fixing positions of the detecting coils 10a, 10b, and 10c being fixed on the armature side for serving as position detecting elements. As is apparent from the foregoing description, it becomes possible to drive a motor at a high speed with good efficiency and large output as a three-phase half-wave current supply type motor. Thus, the object of the present invention can be accomplished.

The smaller the capacitances of the capacitors 47a, 47b, 47c are, the higher their charge voltages become. Therefore, with small-capacitance capacitors 47a, 47b, 47c, the exciting currents of the armature coils can be built up sharply and reduced steeply. The motor can thus operate at a high-speed region and the disadvantage of the conventional reluctance type motor can be eliminated. It is preferable to select the capacitance of the capacitor not to damage transistors in the circuit.

As there is no field magnet, it becomes impossible to perform electromagnetic braking used for deceleration or stop. Also, it is impossible to perform regenerative braking. Accordingly, this cannot be used as servo motors or actuators for electric motive vehicles.

The present invention resolves the above-described problems. Details will be described below. In FIG. 37, the capacitors 47a, 47b, 47c are connected in series with transistors 28a, 28b, 28c serving as semiconductor switching elements, respectively. A transistor G is inserted.

In order to cause a reverse rotation for braking during the normal rotation of the motor, the input signals of the terminals 42a, 42b, 42c are switched to the position detecting signal curves 43a, 43b, —, curves 44a, 44b,—, curves 45a, 45b,— of FIG. 38.

Next, a regenerative braking which is carried out by switching the motor to the reverse rotation mode during the normal rotation of the motor will be explained. A current supply to the armature coil 39a during the normal rotation will be explained. In FIG. 34, the signal curve 36a denotes a position detecting signal to be inputted through the terminal 42a. An arrow 38-1 denotes 120-degree width. The transistors 28a, 28a of FIG. 37 are turned on in response to the input of the base terminal 4a-1.

Corresponding position detecting signals become input signals of the base terminal 4a-2 of the transistors 28b, 24b and the base terminal 4a-3 of the transistors 28c, 24c.

Transistors 28a, 28b, and 28c are controlled for realizing the reverse rotation mode for the regenerative braking. In the normal rotation mode, base terminals 4a-1, 4a-2 and 4a-3 are maintained at earth level. Therefore, even if the transistors are turned off or even if the same current supply control is carried out in both the normal and reverse rotation modes, the object of the present invention will be accomplished.

Input signals of the terminals 4a-1, 4a-2 and 4a-3 become the position detecting signals inputted through the terminals 42a, 42b and 42c.

The building-up of the exciting current of the armature coil 39a becomes sharp due to high voltage of the capacitor 47b. When the output of the operational amplifier 40b turns to LOW-level, the transistor 20a turns off. Magnetic energy is returned through the transistor 28a to the electric power source side. Armature current of the armature coil 39a reduces. When reduced by a predetermined amount, an output of the operational amplifier 40b returns to HIGH-level due to its hysteresis characteristics. The transistor 20a turns on and the armature current increases. Repeating such a cycle constitutes a chopper circuit. This chopper circuit can be constituted by another conventional means.

When the transistors 20a, 28a turn off at the terminal edge of the curve 36a, magnetic energy is discharged as a current which in turn charges the capacitor 47a. Thus the current decreases sharply. Hence, as described above, torque reduction and counter torque can be prevented and a motor having high efficiency at high speed region can be obtained. The exciting current value can be controlled by the voltage of the reference voltage terminal 40. Other armature coils 39b, 39c can be controlled in the same manner as the armature coil 39a.

A case wherein the motor is switched to a reverse mode during the normal rotation of the motor will be explained below with reference to FIG. 34. Regenerative braking is necessary for a motor having a large output to recover kinetic energy of the rotor and load as electric energy of the electric power source.

Next, the measure for realizing the regenerative braking will be explained. This measure has a constitution capable of accomplishing the purpose by switching the motor rotating in the normal rotation into the reverse rotation mode so as to cause deceleration or stop. Next, the armature coil 39a in the reverse rotation mode will be explained. An electromotive force is generated in a direction of an arrow 30. A voltage applied to the armature coil 39a will be V+E, where V being a voltage between the terminals 2a, 2b and E being a counter electromotive force. That is, E equals to an electromotive force to be generated when magnetic flux intersecting the armature coil 39a reduces as the motor rotates.

Accordingly, armature current sharply increases up to a predetermined value in response to the position detecting signal curve 43a in a time chart of FIG. 34, as shown by dotted lines 35a. 35c—. Therefore, the output of the operational amplifier 40b turns to LOW-level. Consequently, the transistor 20a turns off, and then, direction of current supply due to the discharge of magnetic energy of the armature coil 39a becomes equal to the direction of counter electromotive force. Although the above discharge direction is opposite to the counter electromotive force during the normal rotation of the motor, it becomes identical with each other in the reverse rotation mode because braking torque is generated during the reverse rotation mode.

Hence, the discharge current flowing through the diodes 21a, 33a is returned through the transistor 28a to the electric power source whose voltage is changed to V-E. A reduction degree of the discharge current in the reverse rotation mode is smaller than in the normal rotation mode. A reduction width becomes large, as shown by dotted lines 35b, 35d of FIG. 34. When the armature current decreases a predetermined amount, the output of the operational amplifier 40b turns to HIGH-level due to hysteresis characteristics. The transistor 20a is therefore turned on again, so as to increase armature current. Repeating such a cycle constitutes a chopper circuit. Function and effect of the capacitor 47a at the initial and terminal ends of respective position detecting signals are substantially the same as those in the normal rotation mode.

Widths of the dotted lines 35a, 35c,— become smaller than that of the dotted lines 35b, 35d,— in FIG. 34. Although electric power is consumed during sections of the dotted lines 35a, 35c,—, overall amount of consumption is small because of small widths of these sections. Meanwhile, energy of the rotor and load is transformed into electric energy of the electric power source during sections of the dotted lines 35b, 35d,—. Therefore, regenerative braking is carried out effectively since widths of these sections are large. After a predetermined deceleration is finished, the motor is switched into the normal rotation mode and returns to the normal operation.

The above-described function and effect are same in the care of the armature coils 39b, 39c. In the normal rotation mode, the base terminal of the transistor G is maintained so as to activate the transistor G. If switched into the reverse rotation mode, the base terminal is controlled to activate the transistor G by time widths of the curves 35a, 35c,—, of FIG. 34. Current is supplied from the electric power source to the armature coil 39a. The transistor G is turned off by time widths of the curves 35b, 35d,—. Electric power is recovered to the electric power source side through the transistor 28a. Other armature coils 39b, 39c will be controlled in the same manner.

Next, electromagnetic braking will be explained. The transistor G is removed in this case. In the reverse rotation mode, building-up of the curves 35a, 35c, — of FIG. 34 become sharp. Widths of the curves 35b, 35d,— become large. In these sections, magnetic energy stored in each armature coil partly disappears as Joule loss of each armature coil through diodes 21a, 21b, 21c and transistors 28a, 28b, 28c, and is partly recovered as electric energy of the electric power source.

Next, an output torque of 180-degree section by salient poles and magnetic poles will be explained. In a time chart of FIG. 38, curves 42, 42-1 represent the output torque of an arrow 34a (180 degrees). When an exciting current is small, the output torque becomes symmetrical as shown by the curve 42-1 and has a flat torque characteristics. If the exciting current increases so much that magnetic flux is saturated, the output torque becomes an asymmetric torque curve as shown by the curve 42. Namely, the output torque promptly increases as soon as the salient poles begin confronting with magnetic poles. Subsequently, the output torque becomes flat. It thereafter decreases gradually. If the exciting current further increases, the flat portion is almost extinguished.

When the armature coil is supplied with current by a width of a central portion in the normal/reverse rotation modes previously described, if the torque curve is symmetric (curve 42-1), then the output torque characteristics does not change in the normal/reverse rotation modes. However, if the torque curve is asymmetric, the output torque characteristics does change. However, it will be acceptable in practical aspect because only deceleration torque is reduced during deceleration in the reverse rotation mode.

In case of 120-degree current supply mode, the armature coil is generally supplied with current by an amount of an arrow 34b during the normal rotation mode. It is however possible to supply current by an amount of an arrow 34c from the initiation terminal of the position detecting signal. The latter case will be effective for the motor rotating at a high speed of several tens thousands rpm.

As understood from the foregoing description, the regenerative braking can be realized for deceleration by switching the motor rotating in the normal direction into the reverse rotation mode. Deceleration torque can be controlled by varying the voltage of the terminal 40 of FIG. 37. In order to decelerate and stop the motor by the regenerative braking, the voltage of the terminal 40 needs to be changed to be a voltage proportional to the rotation speed of the motor upon switching to the reverse rotation mode. Deceleration torque will be reduced as the motor speed decreases. When the motor stops, the armature current of the armature coil becomes "0". Thus, it becomes possible to stop the motor.

A block circuit 28 of FIG. 37 is a circuit for changing an input voltage of the positive terminal 40c in proportion to the rotation speed of the motor. When the motor is switched into the reverse rotation mode for regenerative braking, the switch 40a is simultaneously changed over. Thus, the output voltage of the block circuit 28 can be inputted into the operational amplifier 40b. As the motor decelerates, the voltage of the terminal 40c decreases. Accordingly, exciting current decreases. Such a braking operation enables the motors to stop.

Thus, it is possible to obtain the stop characteristics similar to the braking and stop characteristics to be obtained in the case where armature coils of the motor having a magnet rotor are short-circuited.

What is claimed:

1. A high-speed motor in a three-phase half-wave reluctance type DC motor with a fixed armature and a magnetic rotor comprising:

two salient poles having the same width, disposed on an outer peripheral surface of the magnetic rotor and being mutually spaced at regular intervals of the same angle;

twelve slots disposed on an inner peripheral surface of the fixed armature at regular intervals;

a No.1-phase armature coil consisting of a coil associated with the No.1 and No.4 slots and another coil associated with the No.7 and No.10 slots, two coils of said No. 1-phase armature coil being connected in series or in parallel with each other;

a No.2-phase armature coil consisting of a coil associated with the No.3 and No.6 slots and another coil associated with the No.9 and No.12 slots, two coils of said No.2-phase armature coil being connected in series or in parallel with each other;

a No.3-phase armature coil consisting of a coil associated with the No.5 and No.8 slots and another coil associated with the No.11 and No.2 slots, two coils of said No.3-phase armature coil being connected in series or in parallel with each other;

a position detecting device for detecting rotational positions of said salient poles and generating No. 1-phase position detecting signals having 120-degree width and spaced each other at regular intervals of 240 degrees in term of electric angle. No.2-phase position detecting signals being delayed 120 degrees from said No. 1-phase position detecting signals, and No.3-phase position detecting signals being delayed 120 degrees from said No.2-phase position detecting signals;

only one switching element interposed between a negative terminal of a DC electric power source and each of said No. 1-, No.2- and No.3-phase armature coils;

only one first diode interposed at a positive voltage side of each armature coil in a forward direction;

a DC electric power source for supplying electric power to a serial joint unit consisting of said first diode, said armature coil, and said switching element;

a current supply control circuit for supplying current to said No. 1-, No.2- and No.3-phase armature coils by turning on corresponding switching elements connected to said No. 1-, No.2- and No.3-phase armature coils in response to said No. 1-, No.2- and No.3-phase position detecting signals by an amount of signal width of each position detecting signal, so as to obtain output torque;

a first electric circuit for transferring magnetic energy stored in the armature coil through a second diode into a small-capacitance capacitor from a connecting point of said switching element and said armature coil and holding it to quickly reduce exciting current of said armature coil when said switching element is turned off at a terminal end of said position detecting signal;

a second electric circuit for discharging electrostatic energy stored in said small-capacitance capacitor into the armature coil being next activated through the simultaneously activated semiconductor element from a connecting point of said first diode and said armature coil element to quickly build up exciting current at the time when said armature coil is activated in response to said position detecting signal after said magnetic rotor rotates a predetermined angle;

a detecting circuit obtaining a detection electric signal when exciting current of said armature coil exceeds a predetermined value; and a chopper circuit for deactivating said armature coil in response to said detection electric signal and in turn activating said armature coil after a predetermined time has passed.

2. A three-phase reluctance type high-speed motor in accordance with claim 1, further comprising a third electric circuit for discharging magnetic energy stored in said armature coil into said small-capacitance capacitor through said second diode when said armature coil is deactivated, so that electrostatic energy corresponding to chopper frequency is stored in said small-capacitance capacitor.

3. A high-speed motor in a two-phase full-wave reluctance type DC motor with a fixed armature and a magnetic rotor comprising:

two salient poles having the same width, disposed on an outer peripheral surface of the magnetic rotor and being mutually spaced at regular intervals of the same angle;

eight slots disposed on an inner peripheral surface of the fixed armature at regular intervals;

a No.1-phase armature coil consisting of a coil associated with the No.1 and No.3 slots and another coil associated with the No.5 and No.7 slots, two coils of said No. 1-phase armature coil being connected in series or in parallel with each other;

a No.2-phase armature coil consisting of a coil associated with the No.2 and No.4 slots and another coil associated with the No.6 and No.8 slots, two coils of said No.2-phase armature coil being connected in series or in parallel with each other;

a No.3-phase armature coil consisting of a coil associated with the No.3 and No.5 slots and another coil associated with the No.7 and No.1 slots, two coils of said No.3-phase armature coil being connected in series or in parallel with each other;

a No.4-phase armature coil consisting of a coil associated with the No.4 and No.6 slots and another coil associated with the No.8 and No.2 slots, two coils of said No.3-phase armature coil being connected in series or in parallel with each other;

a position detecting device for detecting rotational positions of said salient poles and generating No. 1-phase position detecting signals having 90-degree width and spaced each other at regular intervals of 360 degrees in term of electric angle, No.2-phase position detecting signals being delayed 90 degrees from said No. 1-phase position detecting signals, No.3-phase position detecting signals being delayed 90 degrees from said No.2-phase position detecting signals, No.4-phase position detecting signals being delayed 90 degrees from said No.3-phase position detecting signals;

only one switching element interposed between a negative terminal of a DC electric power source and each of said No. 1-, No.2-. No.3- and No.4-phase armature coils;

only one first diode interposed at a positive voltage side of each armature coil in a forward direction;

A DC electric power source supplying electric power to a serial joint unit consisting of said first diode, said armature coil, and said switching element;

a current supply control circuit for supplying current to said No. 1-, No.2-, No.3- and No.4-phase armature coils by turning on corresponding switching elements connected to said No.1-, No.2-, No.3- and No.4-phase armature coils in response to said No. 1-, No.2-, No.3- and No.4-phase position detecting signals by an amount of signal width of each position detecting signal, so as to obtain maximum output torque;

a first electric circuit for transferring magnetic energy stored in the armature coil through a second diode into a small-capacitance capacitor from a connecting point of said switching element and said armature coil and holding it to quickly reduce exciting current of said armature coil when said switching element is turned off at a terminal end of said position detecting signal;

a second electric circuit for discharging electrostatic energy stored in said small-capacitance capacitor into the armature coil being next activated through the simultaneously activated semiconductor element from a connecting point of said first diode and said armature coil element to quickly build up exciting current at the time when said armature coil is activated in response to said position detecting signal after said magnetic rotor rotates a predetermined angle;

a detecting circuit obtaining a detection electric signal when exciting current of said armature coil exceeds a predetermined value; and a chopper circuit for deactivating said armature coil in response to said detection electric signal and in turn activating said armature coil after a predetermined time.

4. A two-phase reluctance type high-speed motor in accordance with claim 3, further comprising a third electric circuit for discharging magnetic energy stored in said armature coil into said small-capacitance capacitor through said second diode when said armature coil is deactivated, so that electrostatic energy corresponding to chopper frequency is stored in said small-capacitance capacitor.

5. A high-speed motor in a two-phase full-wave reluctance type DC motor with a fixed armature and a magnetic rotor comprising:

two salient poles having the same width, disposed on an outer peripheral surface of the magnetic rotor and being mutually spaced at regular intervals of the same angle;

eight slots disposed on an inner peripheral surface of the fixed armature at regular intervals;

a No. 1-phase armature coil consisting of a coil associated with the No. 1 and No. 3 slots and another coil associated with the No. 5 and No. 7 slots, these two coils being connected in series or in parallel with each other;

a No. 2-phase armature coil consisting of a coil associated with the No. 2 and No. 4 slots and another coil associated with the No. 6 and No. 8 slots, these two coils being connected in series or in parallel with each other;

a No. 3-phase armature coil consisting of a coil associated with the No. 3 and No. 5 slots and another coil associated with the No. 7 and No. 1 slots, these two coils being connected in series or in parallel with each other;

a No. 4-phase armature coil consisting of a coil associated with the No. 4 and No. 6 slots and another coil associated with the No. 8 and No. 2 slots, these two coils being connected in series or in parallel with each other;

a position detecting device detecting rotational positions of said salient poles and generating No. 1-phase position detecting signals having 90-degree width and spaced from each other at regular intervals of 360 degrees delay in term of electric angle, No. 2-phase position detecting signals being delayed 90 degrees from said No. 1-phase position detecting signals, No. 3-phase position detecting signals being delayed 90 degrees from said No. 2-phase position detecting signals, No. 4-phase position detecting signals being delayed 90 degrees from said No. 3-phase position detecting signals;

a DC electric power source supplying electric power to a serial joint unit;

a current supply control circuit supplying current to said No. 1-, No. 2-, No. 3- and No. 4-phase armature coils by turning on corresponding switching elements connected to said No. 1-, No. 2-, No. 3- and No. 4-phase armature coils in response to said No. 1-, No. 2-, No. 3- and No. 4-phase position detecting signals by an amount of signal width of each position detecting signal from an initial end of a positive torque generation section, so as to obtain output torque;

only one switching element interposed between a negative terminal of said DC electric power source and each of said No. 1-, No. 2- No. 3- and No. 4-phase armature coils;

a first group of diodes, each of said first group of diodes being inversely connected to a serial joint unit consisting of one of said No. 1-, No. 2- No. 3- and No. 4 phase armature coils and corresponding one of said switching elements;

a first electric circuit transferring magnetic energy stored in the armature into a capacitor through a second group of diodes and said first group of diodes, each of said second group of diodes being connected to a connecting point of said switching element and said armature coil;

a second electric circuit, interposed between a positive side of said capacitor and a positive terminal of said electric power source, comparing a voltage of said capacitor and a voltage of said electric power source and equalizing the voltage of said capacitor and the voltage of said electric power source; and a chopper circuit suppressing exciting current of said armature coil so as not to cause a burnout of said armature coil.

6. A three-phase reluctance type DC motor with a fixed armature and a magnetic rotor comprising:

n salient poles having the same width, disposed on an outer peripheral surface of the magnetic rotor and being spaced from each other at regular intervals of the same angle, wherein n is a positive integer greater than or equal to three;

6n slots disposed on an inner peripheral surface of the fixed armature at regular intervals;

No. 1-, No. 2- and No. 3-phase armature coils being associated with said slots and disposed so as to have a phase difference of 120-degree electric angle from one another;

a position detecting device detecting rotational positions of said salient poles and generating No. 1-phase position detecting signals having 120-degree width and spaced from each other at regular intervals of 240 degrees in term of electric angle, No. 2-phase position detecting signals being delayed 120 degrees from said No. 1-phase position detecting signals, and No. 3-phase position detecting signals being delayed 120 degrees from said No. 2-phase position detecting signals;

semiconductor switching elements connected in series with said No. 1-, No. 2- and No. 3-phase armature coils;

a DC electric power source supplying electric power to said No. 1-, No. 2- and No. 3-phase armature coil and said semiconductor switching elements being serially connected with said No. 1-, No. 2- and No. 3-phase armature coils;

a current supply control circuit supplying current to said No. 1-, No. 2- and No. 3-phase armature coils by turning on corresponding semiconductor switching elements connected to said No. 1-, No. 2- and No. 3-phase armature coils in response to said No. 1-, No. 2- and No. 3-phase position detecting signals by an amount of signal width of each position detecting signal;

a first electric circuit transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

a second electric circuit discharging electrostatic energy stored in said small-capacitance capacitor into the armature coil being next activated to quickly build up exciting current at the time when said armature coil is activated in response to said position detecting signal after said magnetic rotor rotates a predetermined angle;

an armature current detecting circuit detecting armature currents of said No. 1-, No. 2- and No. 3-phase armature coils to obtain detected signals; and a chopper circuit deactivating the semiconductor switching elements when armature currents exceed the predetermined value, while activating said semiconductor switching elements to maintain the armature currents to predetermined value when the currents decrease to the predetermined value due to the discharge of magnetic energy in the armature coils, in response to said detection signals.

a chopper circuit for deactivating the semiconductor switching elements when armature currents exceed the predetermined value, while activating said semiconductor switching elements to maintain the armature currents to predetermined value when the currents decrease to the predetermined value due to the discharge of magnetic energy in the armature coils, in response to said detection signals.

7. A three-phase reluctance-type motor in accordance with claim 6, wherein air gap between an outer peripheral surface of first salient poles disposed on one side of said rotor and said inner peripheral surface of said fixed armature is set smaller or larger than air gap between an outer peripheral surface of second salient poles disposed on the other side of said rotor and said inner peripheral surface of said fixed armature.

8. A three-phase reluctance-type motor in accordance with claim 6, wherein armature coils associated with first salient poles disposed at one side of said rotor are large or smaller in their ampere-turn than armature coils associated with second salient poles disposed at the other side of said rotor.

9. A three-phase full-wave reluctance type DC motor comprising:

n first and second salient poles having the same width, disposed on an outer peripheral surface of a magnetic rotor at both ends thereof and being spaced from each other at regular intervals of the same angle, where n is a positive integer greater than or equal to three;

6n slots disposed at regular intervals on an inner peripheral surface of a cylindrical first fixed armature;

No. 1-, No. 2- and No. 3-phase armature coils being associated with said 6n slots and disposed to have a mutual phase difference of 120 degrees from one another;

a second fixed armature having substantially the same construction as said first fixed armature, slots of said second fixed armature being associated with No. 4-, No. 5- and No. 6-phase armature coils;

means for arranging an opposing position between said slots of said first fixed armature and said first salient poles by offsetting by 180-degree electric angle from an opposing position between said slots of said second fixed armature and said second salient poles;

a position detecting device detecting rotational positions of said first salient poles and generating No. 1-phase position detecting signals having 120-degree width and spaced from each other at regular intervals of 240 degrees in term of electric angle, No. 2-phase position detecting signals being delayed 120 degrees from said No. 1-phase position detecting signals, and No. 3-phase position detecting signals being delayed 120 degrees from said No. 2-phase position detecting signals, and further generating No. 4-phase position detecting signals being delayed 180 degrees from said No. 1-phase position detecting signals, No. 5-phase position detecting signals being delayed 180 degrees from said No. 2-phase position detecting signals, and No. 6-phase position detecting signals being delayed 180 degrees from said No. 2-phase position detecting signals;

semiconductor switching elements connected in series with said No. 1-, No. 2- No. 3-, No. 4-, No. 5-, and No. 6-phase armature coils;

a DC electric power source supplying electric power to said armature coils and said semiconductor switching elements being connected in series with said armature coils;

a current supply control circuit supplying current to said No. 1-, No. 2- No. 3-, No. 4-, No. 5-, and No. 6-phase armature coils by turning on corresponding semiconductor switching elements connected in series to said No. 1-, No. 2- No. 3, No.4-, No.5-, and No.6-phase armature coils in response to said No. 1-, No. 2- No. 3-, No. 4,- No.5-, and No.6-phase position detecting signals by an amount of signal width of each position detecting signal;

a first electric circuit transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

a second electric circuit discharging electrostatic energy stored in said small-capacitance capacitor into the armature could being next activated to quickly build up exciting current at the time when said armature coil is activated in response to said position detecting signal after said magnetic rotor rotates a predetermined angle;

an armature current detecting circuit detecting armature currents of said No. 1-, No. -2 and No. 3-phase armature coils to obtain detected signals;

a first chopper circuit deactivating the semiconductor switching elements when armature currents exceed the predetermined value, while activating said semiconductor switching elements to maintain the armature currents to predetermined value when the currents decrease to the predetermined value due to the discharge of magnetic energy in the armature coils, in response to said detection signal; and a second chopper circuit having substantially the same construction as said first chopper circuit for maintaining armature current of said No. 4-, No. 5-, and No. 6-phase armature coils at a predetermined value.

* * * * *

UNITED STATES PATENT AND TRADEMARK OFFICE
CERTIFICATE OF CORRECTION

Page 1 of 2

PATENT NO. : 5,485,047
DATED : January 16, 1996
INVENTOR(S) : Itsuki Bahn

It is certified that error appears in the above-indentified patent and that said Letters Patent is hereby corrected as shown below:

Col. 4, line 16, change "," to --.--.

Col. 7, line 61, change "No. 1-, No. 2-, and No." to --No. 1-, No. 2- and No.--;
line 62, change "3-" to --3--.

Col. 8, line 9, change "No. 1-" to --No.1--;
line 11, change "No. 2-" to --No. 2--;
line 13, change "No. 3-" to --No. 3--;
line 17, change "No. 1-, No. 2-, and No." to --No. 1-, No. 2- and No.--;
line 18, change "3-" to --3--;
line 23, change "No. 1-, No. 2-, and No. 3-" to --No. 1-, No. 2- and No. 3--;
line 26, change "No. 1-, No. 2-, and No. 3-" to --No. 1-, No. 2- and No. 3--;
line 27, change "No. 1-, No. 2-" (second occurrence) to --No. 1-, No. 2--;
line 28, change "No. 3-" to --No. 3--;
line 52, change "No. 1-, No. 2-, and No. 3-" to --No. 1-, No. 2- and No. 3--.

Col. 15, line 10, change "ec,ed" to --6c,6d--.

Col. 40, line 32, change "28a" to --26a--.

Col. 41, line 62, change "317a" to --37a--.

Col. 42, line 9, change "44ah" to --44a--;

line 30, change "30a" to --36a--.

UNITED STATES PATENT AND TRADEMARK OFFICE
CERTIFICATE OF CORRECTION

PATENT NO. : 5,485,047
DATED : January 16, 1996
INVENTOR(S) : Itsuki Bahn

It is certified that error appears in the above-indentified patent and that said Letters Patent is hereby corrected as shown below:

Col. 45, line 7, change "No. 1-, No. 2-, No. 3-" to --No. 1-, No. 2-, No. 3--;
line 13, change "No." (second occurrence) to --No.--;
line 14, change "1" to --1--;
line 15, change "No. 2" (second occurrence) to --No. 2--;
line 16, change "No. 3" (second occurrence) to --No. 3--;
line 20, change "No. 1-, No. 2-, No. 3-" to --No. 1-, No. 2-, No. 3--;
line 23, change "No." to --No.--;
line 24, change "1-, No. 2-, No. 3-" to --1-, No. 2-, No. 3--;
line 26, change "No. 1" (second occurrence) to --No. 1--;
line 27, change "No. 2" (second occurrence) to --No. 2--;
line 28, change "No. 3" (second occurrence) to --No. 3--.

Col. 57, lines 64-67, delete these lines in their entirety;

Col. 58, line 1-4, delete these lines in their entirety.

Signed and Sealed this

Seventh Day of May, 1996

Attest:

BRUCE LEHMAN

Attesting Officer

Commissioner of Patents and Trademarks